United States Patent [19]

Salazar et al.

[11] Patent Number: 4,630,210

[45] Date of Patent: Dec. 16, 1986

[54] MICROPROCESSOR CONTROLLED D.C. MOTOR FOR CONTROLLING A LOAD

[75] Inventors: Edilberto I. Salazar, Brookfield; Wallace Kirschner, Trumbull, both of Conn.

[73] Assignee: Pitney Bowes Inc., Stamford, Conn.

[21] Appl. No.: 657,695

[22] Filed: Oct. 4, 1984

[51] Int. Cl.[4] ........................ G06F 15/20; H02P 5/06; H02K 37/00

[52] U.S. Cl. .................................... 364/464; 364/174; 318/604; 318/696; 318/327; 101/91

[58] Field of Search ........................ 364/466, 464, 174; 340/680; 101/91, 235; 318/604, 696, 327

[56] References Cited

U.S. PATENT DOCUMENTS

| | | | |
|---|---|---|---|
| 4,016,467 | 4/1977 | Hallenbeck | 318/604 |
| 4,023,489 | 5/1977 | Beery | 101/235 |
| 4,156,170 | 5/1979 | Strunc | 318/696 |
| 4,226,546 | 10/1980 | Hoffman | 400/144.2 |
| 4,234,830 | 11/1980 | Cannon | 318/39 |
| 4,250,544 | 2/1981 | Alley | 364/110 |
| 4,283,721 | 8/1981 | Eckert et al. | 340/680 |
| 4,287,825 | 9/1981 | Eckert, Jr. et al. | 101/91 |
| 4,301,507 | 11/1981 | Soderberg et al. | 364/464 |
| 4,340,848 | 7/1982 | Hanagata | 318/561 |
| 4,506,201 | 3/1985 | Tsuneki | 318/696 X |
| 4,525,785 | 6/1985 | Soderberg et al. | 364/464 |
| 4,584,647 | 4/1986 | Eckert | 364/464 |

*Primary Examiner*—Edward J. Wise

*Attorney, Agent, or Firm*—Donald P. Walker; Melvin J. Scolnick; David E. Pitchenik

[57] ABSTRACT

Apparatus is provided for controlling the velocity of a portion of a load in accordance with a trapazoidal-shaped velocity versus time profile. The apparatus includes a d.c. motor having an output shaft for driving the load; instrumentalities for sensing angular displacement of the motor output shaft; a microprocessor including a clock for generating successive sampling time periods, means for providing first counts respectively representative of successive desired angular displacements of the motor output shaft during successive sampling time periods to cause the load portion to be moved in accordance with a predetermined trapezoidal-shaped velocity versus time profile, means responsive to the sensing means for providing second counts respectively representatiave of actual angular displacements of the motor output shaft during successive sampling time periods, and means for compensating for the difference between the first and second counts during each successive sampling time period and generating a pulse width modulated control signal for controlling the d.c. motor, the motor control signal causing the actual angular displacement of the motor output shaft to substantially match the desired angular displacement of the motor output shaft during successive sampling time periods, whereby the load portion is moved substantially in accordance with the predetermined trapezoidal-shaped velocity versus time profile; and a signal amplifying device for operably coupling the motor control signal to the d.c. motor.

25 Claims, 31 Drawing Figures

| MOTOR ROTATION | Q1 | Q2 | Q3 | Q4 | T1 | T2 | T3 | T4 | A | B | C | D | 302 | 304 |
|---|---|---|---|---|---|---|---|---|---|---|---|---|---|---|
| CW | ON | OFF | OFF | ON | ON | OFF | OFF | ON | HIGH | LOW | LOW | HIGH | + | – |
| CCW | OFF | ON | ON | OFF | OFF | ON | ON | OFF | LOW | HIGH | HIGH | LOW | – | + |

FIG. 12

(a) $$H_1(S) = ZOH\,(K_v)\,(K_a)\,\frac{K_m}{S\left(\frac{S}{f_1}+1\right)\left(\frac{S}{f_2}+1\right)}\,K_p$$

(b) $$H_2(S) = ZOH\,(K_v)\,(K_a)\,\frac{K_m}{S\left(\frac{S}{f_1}+1\right)\left(\frac{S}{f_2}+1\right)}\,(K_p)\,(K_c)$$

$$= \frac{e^{S\frac{T}{2}}\,(K_v)\,(K_a)\,(K_m)\,(K_p)\,(K_c)}{S\left(\frac{S}{f_1}+1\right)\left(\frac{S}{f_2}+1\right)}$$

$$= \frac{K_0\, e^{S\frac{T}{2}}}{S\left(\frac{S}{f_1}+1\right)\left(\frac{S}{f_2}+1\right)} = \frac{400\, e^{-0.001\frac{S}{2}}}{S\left(\frac{S}{48}+1\right)\left(\frac{S}{733}+1\right)}$$

FIG. 13

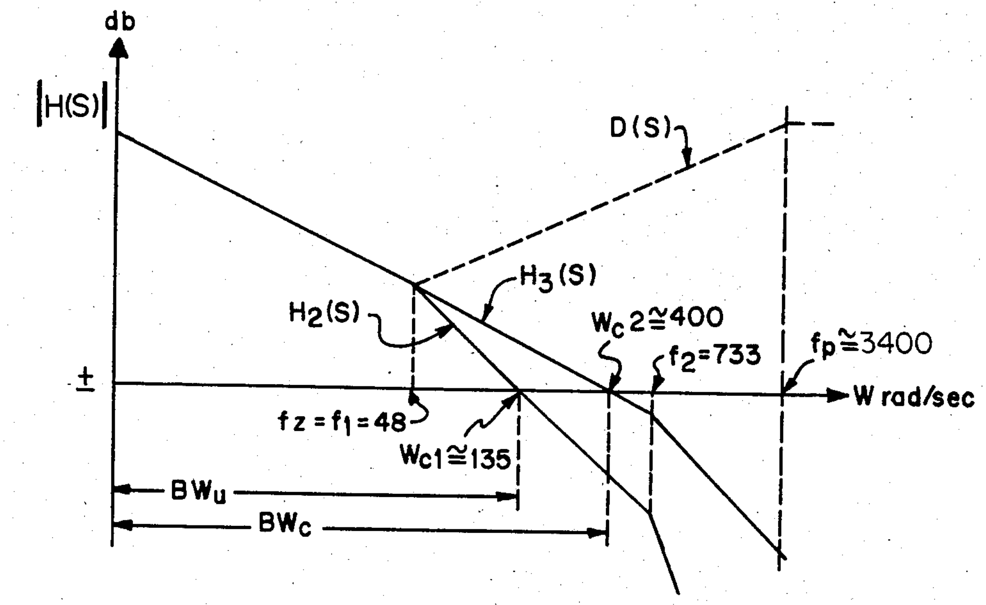

FIG. 14

$$D(S) = K_C \frac{\left(\frac{S}{f_z}+1\right)}{\left(\frac{S}{f_p}+1\right)}$$

$$= 13.64 \frac{\frac{S}{48}+1}{\frac{S}{3400}+1} = 966 \frac{(S+48)}{(S+3400)}$$

FIG. 15

(a) $d_f = \theta m \frac{\pi}{360^\circ}$ (b) $O_S = 100 \frac{e^{\frac{\pi}{d_f}}}{\sqrt{1-d_f^2}}$ (c) $tx = \frac{1}{d_f}(Wn) \approx \frac{1}{d_f}(W_C)$ (d) $t_s \approx 5\,tx$

FIG. 16

$$S = \frac{2}{T} \times \frac{Z-1}{Z+1}$$

FIG. 17

$$D(Z) \approx 366 \left(\frac{Z-0.953}{Z+0.259}\right)$$

$$= 366 \left(\frac{1-0.953Z^{-1}}{1+0.259Z^{-1}}\right)$$

FIG. 18

(a) $D(Z) = \frac{G(Z)}{E(Z)} = 366 \left(\frac{1-0.953Z^{-1}}{1+0.259Z^{-1}}\right)$ (b) $G(Z) = 366E(Z) - 348E(Z)Z^{-1} - 0.259G(Z)Z^{-1}$

FIG. 19

$$G(Tn) = 366E(Tn) - 348E(Tn-1) - 0.259G(Tn-1)$$

$$= K_1 E(Tn) - K_2 E(Tn-1) - K_3 G(Tn-1)$$

MICROPROCESSOR CONTROLLED D.C. MOTOR FOR CONTROLLING A LOAD

BACKGROUND OF THE INVENTION

The present invention is generally concerned with postage meters and mailing machines, and more particularly with improvements therein including apparatus for driving a postage meter drum.

In U.S. Pat. No. 4,287,825 issued Sept. 8, 1981 to Eckert, et al and assigned to the assignee of the present there is disclosed a postage value selection mechanism for selecting postage values which are to be printed by a rotary postage printing drum in a microcomputer controlled postage meter having a keyboard. The drive shaft of the drum includes a plurality of selectable racks, each of which is slidably movable in engagement with a print wheel within the drum for selectively rotating the print wheel for disposing one of its print elements at the outer periphery of the drum for printing purposes. The value selection mechanism includes a first stepper motor which is operable for selecting the respective racks, and a second stepper motor which is operable for actuating the selected rack for selectively rotating its associated print wheel. The microcomputer, which is coupled to the keyboard for processing postage value entries by an operator, selectively drives the respective stepper motors in response to keyboard entries.

In U.S. Pat. No. 2,934,009 issued Apr. 26, 1960 to Bach, et al and assigned to the assignee of the present invention there is described a postage meter which includes a drive mechanism comprising a single revolution clutch and a drive train for connecting the clutch to the postage meter drum. The clutch rotates the drum from a home position and into engagement with a letter fed to the drum. And the drum prints the pre-selected postage value on the letter while feeding the same downstream beneath the drum as the drum returns to the home position. Each revolution of the single revolution clutch and thus the drum, is initiated by the letter engaging a trip lever to release the helical spring of the single revolution clutch. The velocity versus time profile of the periphery of the drum approximates a trapezoidal configuration, having acceleration, constant velocity and deceleration portions, fixed by the particular clutch and drive train used in the application. This being the case, the throughput rate of any mailing machine associated with the meter is dictated by the cycling speed of the postage meter rather than by the speed with which the individual mailpieces are fed to the postage meter. Further, although the single revolution clutch structure has served as the workhorse of the industry for many years it has long been recognized that it is a complex mechanism which is relatively expensive to construct and maintain, does not precisely follow the ideal trapezoidal velocity vs. time motion profile which is preferred for drum motion, tends to be unreliable in high volume applications, and is noisy and thus irritating to customers. Accordingly:

An object of the invention is to replace the value selection mechanism of the prior art with a rotary value selection mechanism, having rotary rack selection means and rotary print element selection means, a stepper motor which selectively engages the respective rack and print element selection means, a D.C. motor, and a computer, wherein the computer is programmed for controlling the stepper motor to alternately select the rack or print element selection means, and for controlling the D.C. motor to drive the selected selection means in accordance with data representative of a desired trapezoidal-shaped velocity versus time profile;

Another object is to provide a D.C. motor, adapted to be coupled to any one of a plurality of loads, which is controlled by a computer which is programmed for driving the respective loads in accordance with various desired trapezoidal-shaped velocity versus time profiles of angular displacement of the motor shaft which are each representative of a desired linear displacement versus time profile of motion of a portion of a load;

Another object of the invention is to replace the postage meter drum drive mechanism of the prior art with the combination of a D.C. motor and a computer, and program the computer for causing the D.C. motor to drive the drum in accordance with an ideal trapezoidal-shaped velocity versus time profile which is a function of the input velocity of a mailpiece; and Another object is to replace the trip lever as the drive initiating device and utilize in its place a pair of spaced apart sensing devices in the path of travel of a mailpiece fed to the postage meter, and program the computer to calculate the input velocity of a mailpiece, based upon the time taken for the mailpiece to traverse the distance between the sensing devices, and adjust both the time delay before commencing acceleration of the drum and the drum's acceleration, to cause the drum to timely engage the leading edge of the mailpiece.

SUMMARY OF THE INVENTION

Apparatus for controlling the velocity of a portion of a load in accordance with a trapazoidal-shaped velocity versus time profile, comprising: a D.C. motor including an output shaft for driving the load; means for sensing angular displacement of the motor output shaft; a microprocessor comprising clock means for generating successive sampling time periods, means for providing first counts respectively representatiave of successive desired angular displacements of the motor output shaft during successive sampling time periods to cause the load portion to be moved in accordance with a predetermined trapezoidal-shaped velocity versus time profile, means responsive to the sensing means for providing second counts respectively representative of actual angular displacements of the motor output shaft during successive sampling time periods, and means for compensating for the difference between first and second counts during each successive sampling time period and generating a pulse width modulated control signal for controlling the D.C. motor, the motor control signal causing the actual angular displacement of the motor output shaft to substantially match the desired angular displacement of the motor output shaft during successive sampling time periods, whereby the load portion is moved substantially in accordance with the predetermined trapezoidal-shaped velocity versus time profile; and signal amplifying means for operably coupling the motor control signal to the D.C. motor.

BRIEF DESCRIPTION OF THE DRAWINGS

As shown in the drawings wherein like reference numerals designate like or corresponding parts throughout the several views:

FIG. 12 shows the equations for calculating the overall gain of the closed loop servo system of FIG. 10 before (FIG. 2*a*) and after (FIG. 2*b*) including a gain factor corresponding to the system friction at motor start up;

FIG. 13 is a bode diagram including plots for the closed loop servo system before and after compensation to provide for system stability and maximization of the system's bandwidth;

FIG. 14 shows the equation for calculating, in the frequency domain, the value of the system compensator;

FIG. 15 shows the equation for calculating the damping factor, overshoot and settling time of the servo controlled system;

FIG. 16 shows the equation for the laplace operator expressed in terms of the Z-transform operator;

FIG. 17 shows the equation for calculating the value of the system compensator in the position domain;

FIG. 18 shows the equations for converting the system compensator of FIG. 17 to the position domain;

FIG. 19 shows the equation of the output of the system compensator in the time domain;

FIG. 22 (including FIGS. 22*a*-1, 22*a*-2, 22*b*-1 and 22*b*-2) is a block diagram of the computer according to the invention.

DESCRIPTION OF THE PREFERRED EMBODIMENTS

Figure 1:
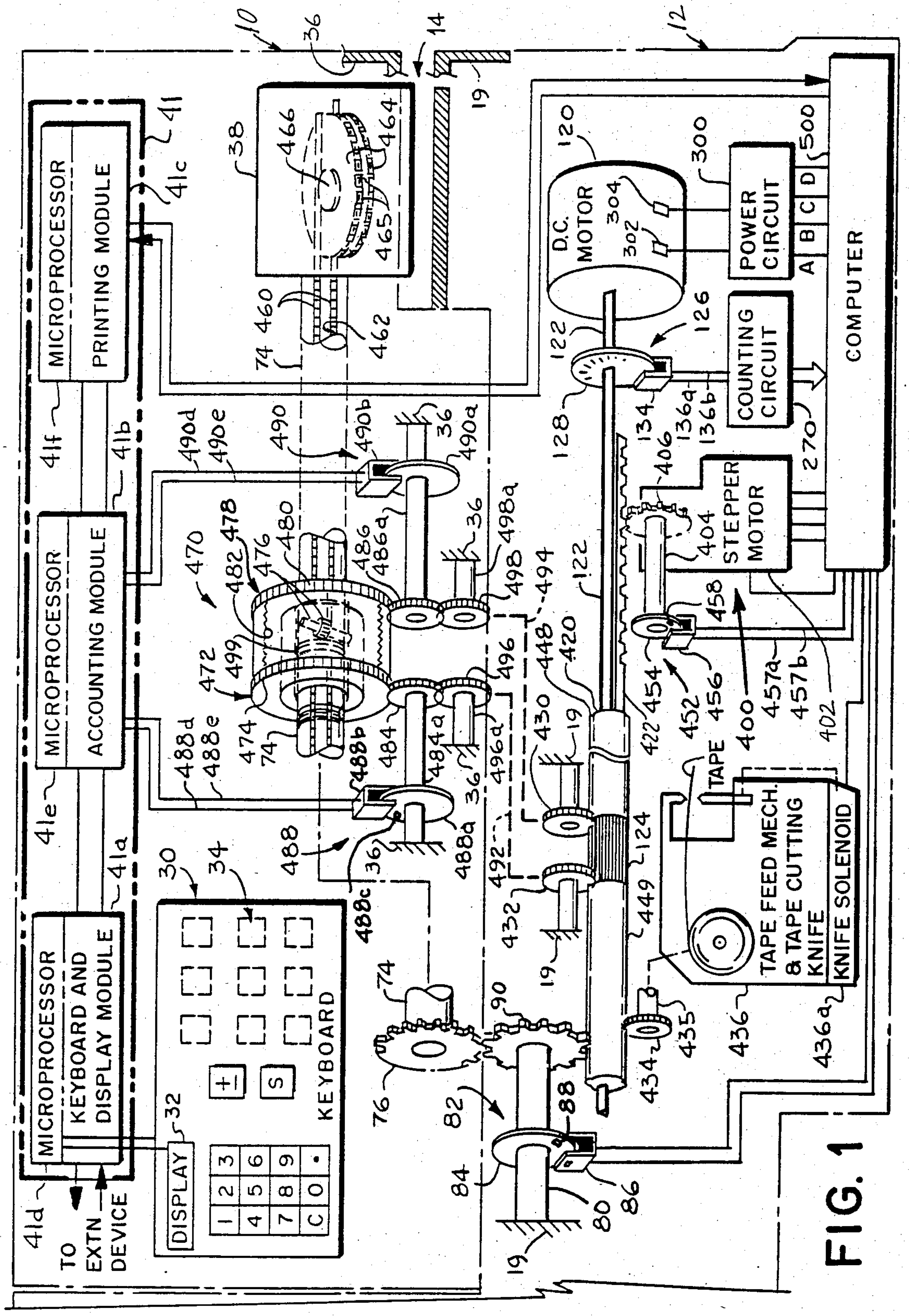
FIG. 1 is a schematic view of a postage meter mounted on mailing machine in accordance with the invention.

As shown in FIG. 1, the apparatus in which the invention may be incorporated generally includes an electronic postage meter 10 which is suitably removably mounted on a conventional mailing machine 12, so as to form therewith a slot 14 (FIG. 2) through which sheets, including mailpieces 16, such as envelopes, cards or other sheet-like materials, may be fed in a downstream path of travel 18.

The postage meter 10 (FIG. 1) includes a keyboard 30 and display 32. The keyboard 30 includes a plurality of numeric keys, labeled 0–9 inclusive, a clear key, labeled "c" and a decimal point key, labeled ".", for selecting postage values to be entered; a set postage key, labeled "s", for entering selected postage values; and an arithmetic function key, labeled "=", for adding subsequently selected charges (such as special delivery costs) to a previously selected postage value before entry of the total value. In addition, there is provided a plurality of display keys, designated 34, each of which are provided with labels well known in the art for identifying information stored in the meter 10, and shown on the display 32 in response to depression of the particular key 34, such as the "postage used", "postage unused", "control sum", "piece count", "batch value" and "batch count" values. A more detailed description of the keys of the keyboard 30 and the display 32, and their respective functions may be found in U.S. Pat. No. 4,283,721 issued Aug. 11, 1981 to Eckert, et al. and assigned to the assignee of the present invention.

In addition, the meter 10 (FIG. 1) includes a casing 36, on which the keyboard 30 and display 32 are conventionally mounted, and which is adapted by well known means for carrying a cyclically operable, rotary, postage printing drum 38. The drum 38 (FIG. 2) is conventionally constructed and arranged for feeding the respective mailpieces 16 in the path of travel 18, which extends beneath the drum 38, and for printing entered postage on the upwardly disposed surface of each mailpiece 16.

The postage meter 10 (FIG. 1) additionally includes a computer 41 which is conventionally electrically connected to the keyboard 30 and display 32. The computer 41 generally comprises a conventional, microcomputer system having a plurality of microcomputer modules including a control or keyboard and display module, 41*a*, an accounting module 41*b* and a printing module 41*c*. The control module 41*a* is both operably electrically connected to the accounting module 41*b* and adapted to be operably electrically connected to an external device via respective two-way serial communications channels, and the accounting module 41*b* is operably electrically connected to the printing module 41*c* via a corresponding two-way serial communication channel. In general, each of the modules 41*a*, 41*b* and 41*c* includes a dedicated microprocessor 41*d*, 41*e* or 41*f*, respectively, having a separately controlled clock and programs. And two-way communications are conducted via the respective serial communication channels utilizing the echoplex communication discipline, wherein communications are in the form of serially transmitted single byte header-only messages, consisting of ten bits including a start bit followed by an 8 bit byte which is in turn followed by a stop bit, or in the form of a multi-byte message consisting of a header and one or more additional bytes of information. Further, all transmitted messages are followed by a no error pulse if the message was received error free. In operation, each of the modules 41*a*, 41*b* and 41*c* is capable of processing data independently and asynchronously of the other. In addition, to allow for compatibility between the postage meter 10 and any external apparatus, all operational data transmitted to, from and between each of the three modules 41*a*, 41*b* and 41*c*, and all stored operator information, is accessible to the external device via the two-way communication channel, as a result of which the external apparatus (if any) may be adapted to have complete control of the postage meter 10 as well as access to all current operational information in the postage meter 10. In addition, the flow of messages to, from and between the three internal modules 41*a*, 41*b* and 41*c* is in a predetermined, hierarchical direction. For example, any command message from the control module 41*a* is communicated to the accounting module 41*b*, where it is processed either for local action in the accounting module 41*b* and/or as a command message for the printing module 41*c*. On the other hand, any message from the printing module 41*c* is communicated to the accounting module 41*b* where it is either used as internal information or merged with additional data and communicated to the control module 41*c*. And, any message from the accounting module 41*b* is initially directed to the printing module 41*c* or to the control module 41*a*. A more detailed description of the various prior art modules 41*a*, 41*b* and 41*c*, and various modifications thereof, may be found in U.S. Pat. Nos. 4,280,180; 4,280,179; 4,283,721 and 4,301,507; each of which patents is assigned to the assignee of the present invention.

The mailing machine 12 (FIG. 2), which has a casing 19, includes a A.C. power supply 20 which is adapted by means of a power line 22 to be connected to a local source of supply of A.C. power via a normally open main power switch 24 which may be closed by the operator. Upon such closure, the mailing machine's D.C. power supply 26 is energized via the power line 28. In addition, the mailing machine 12 includes a conventional belt-type conveyor 49, driven by an A.C. motor 50, which is connected for energization from the A.C. power supply 20 via a conventional, normally open solid state, A.C. motor, relay 52. Further, the mailing machine 12 includes a computer 500 which is conventionally programmed for timely operating the relay 52 to close and open the relay 52. Upon such closure the A.C. motor 50 drives the conveyor 49 for feeding mailpieces 16 to the drum 38. To facilitate operator control of the switch 24, the mailing machine preferably includes a keyboard 53 having a "start" key 53*a* and a "stop" key 53*b*, which are conventionally coupled to the main power switch 24 to permit the operator to selectively close and open the switch 24. In addition, the keyboard 53 preferably includes a tape key 53*c*, which is conventionally coupled to the computer 500 to permit the operator to selectively cause the computer 500 to commence controlling operation of the conventional tape feeding mechanism hereinafter discussed. And other keys of the keyboard, shown by the dashed lines, may be conventionally coupled to the computer to permit the operator to selectively cause the computer 500 to initiate and control the operation of other conventional apparatus of the mailing machine 12. Assuming the computer 500 has timely closed the relay 52, the A.C. motor 50 is energized from the A.C. power supply 20. Whereupon the conveyor 49 transports the individual mailpieces 16, at a velocity corresponding to the angular velocity of the motor 50, in the path of travel 18 to the postage printing platen 54.

According to the invention, the machine 12 includes first and second sensing devices respectively designated 56 and 58, which are spaced apart from each other a predetermined distance $d_1$, i.e., the distance between points A and B in the path of travel 18. Preferably, each of the sensing devices 56 and 58, is an electro-optical device which is suitably electrically coupled to the computer 500; sensing device 56 being connected via communication line 60 and sensing device 58 being connected via communication line 62. The sensing devices 56, 58 respectively respond to the arrival of a mailpiece 16 at points A and B by providing a signal to the computer 500 on communication line 60 from sensing device 56 and on communication line 62 from sensing device 58. Thus, the rate of movement or velocity V1 of any mailpiece 16 may be calculated by counting the elapsed time $t_v$ (FIG. 3) between arrivals of the mailpiece 16 at points A and B, and dividing the distance $d_1$, by the elapsed time $t_v$. To that end, the computer 500 is programmed for continuously polling the communications lines 60 and 62 each time instant $T_n$ at the end of a predetermined sampling time period, T, preferably $T=1$ millisecond, and to commence counting the number of time instants $T_n$ when the leading edge of a given mailpiece 16 is detected at point A, as evidenced by a transition signal on communication line 60, and to end counting the time instants Tn when the given mailpiece 16 is detected at point B, as evidenced by a transition signal on communication line 62. Since the distance $d_1$, is a mechanical constant of the mailing machine 12, the velocity of the mailpiece may be expressed in terms of the total number $N_t$ of time instants $T_n$ which elapse as the given mailpiece traverses the distance $d_1$. For example, assuming a maximum velocity of 61 inches per second, $d_1=2.75$ inches and $T=1$ millisecond; the total number $N_t$ of elapsed time instants $T_n$ may be found by dividing $d_1=2.75$ inches by $V1=61$ inches per second to obtain $N_t=45$, i.e., the total number of time instants $T_n$ which elapse between arrivals of the mailpiece at points A and B. Thus, the number $N_t=45$ corresponds to and is representative of a mailpiece velocity of $V1=61$ inches per second.

Assuming normal operation of the transport system and calculation of the value of V1 having been made, the time delay $t_d$ (FIG. 3) before arrival of the mailpiece 16 at point C may be calculated by dividing the distance $d_2$ between points B and C by the mailpiece's velocity V1, provided the distance $d_2$ is known. Since the integral of the initial, triangularly-shaped, portion of the velocity versus time profile is equal to one-half of the value of the product of $T_a$ and $V_1$, and is equal to the arc $d_3$ described by point E on the drum 38, as the drum 38 is rotated counter-clockwise to point D, the distance between points C and D is equal to twice the arcuate distance $d_3$. Accordingly, $d_2$ may be conventionally calculated, as may be the time delay $t_d$ for the maximum throughput velocity. Assuming rotation of the drum 38 is commenced at the end of the time delay $t_d$ and the drum 38 is linearly accelerated to the velocity V1 to match that of the mailpiece 16 in the time interval $T_a$ during which point E on the drum 38 arcuately traverses the distance $d_3$ to point D, Ta may be conventionally calculated. In addition, assuming commencement of rotation at the end of the time delay $t_d$ and that the drum 38 is linearly accelerated to the velocity V1 during the time interval Ta, the mailpiece 16 will arrive at point D coincident with the rotation of point E of the outer periphery 73 of the drum 38 to point D, with the result that the leading edge 73*a* of the drum's outer periphery 73, which edge 73*a* extends transverse to the path of travel 18 of the mailpiece 16, will engage substantially the leading edge of the mailpiece for feeding purposes and the indicia printing portion 73*b* of the periphery 73 will be marginally spaced from the leading edge of the mailpiece 16 by a distance $d_4$ which is equal to the circumferential distance between points E and F on the drum 38. Since the circumferential distance $d_5$ on the drum 38 between points E and G is fixed, the time interval Tc during which the drum 38 is rotated at the constant velocity V1 may also be calculated. When point G on the drum 38 is rotated out of engagement with the mailpiece 16, the drum 38 commences deceleration and continues to decelerate to rest during the time interval Td. The distance $d_6$ which is traversed by point G, as the drum 38 is rotated to return point E to its original position of being spaced a distance $d_3$ from point D, is fixed, and, Td may be chosen to provide a suitable deceleration rate for the drum, preferably less than Ta. In addition, a reasonable settling time interval Ts is preferably added to obtain the overall cycling time Tct of the drum 38 to allow for damping any overshoot of the drum 38 before commencing the next drum cycle. For a typical maximum drum cycle time period Tct of 234 milliseconds and a maximum mailpiece transport rate of 61 inches per second, typical values for the acceleration, constant velocity, deceleration and settling time intervals are Ta=37 milliseconds, $T_c$=124 milliseconds, Td=24 milliseconds and Ts=234-185=49 milliseconds. Utilizing these values, the required acceleration and deceleration values for the drum 38 during the time intervals Ta and Td may be conventionally calculated. In addition, since the integral of the velocity versus time profile is equal to the distance traversed by the circumference of the drum 38 during a single revolution of the drum 38, the desired position of the drum 38 at the end of any sampling time period of T=1 millisecond may be calculated. For target velocities V1 which are less than the maximum throughput velocity, it is preferably assumed that integral of, and thus the area under, the velocity versus time profile remains constant, and equal to the area thereof at the maximum throughput velocity, to facilitate conventional calculation of the values of the time delay $t_d$, the time intervals Ta, Tc and Td, and the acceleration and deceleration values for each of such lesser velocities V1.

For computer implementation purposes, the computer 500 is programmed to continously poll the communication lines 60 and 62, from the sensing devices 56 and 58, respectively, each time interval $T_n$, and count the time intervals $T_n$ between arrivals of the mailpiece 16 at points A and B as evidenced by a transition signals on lines 60 or 62. Further, the computer 500 is programmed to calculate the current velocity of the mailpiece 16 in terms of the total number $N_t$ of the counted time intervals $T_n$, store the current velocity and, preferably, take an average of that velocity and at least the next previously calculated velocity (if any) to establish the target velocity V1. In addition, it is preferable that precalculated values for the time delay td, acceleration and deceleration corresponding to each of a plurality of target velocities be stored in the memory of the computer 500 for fetching as needed after calculation of the particular target velocity. In this connection it is noted that the velocity at any time "t" of the drum 38 may be expressed by adding to the original velocity $V_o$ each successive increment of the product of the acceleration and time during each time period of T=1 millisecond, each successive increment of constant velocity and each successive increment of the product of the deceleration and time during each time period T. Preferably, the acceleration and deceleration values are each stored in the form of an amount corresponding to a predetermined number of counts per millisecond square which are a function of the actual acceleration or deceleration value, as the case may be, and of the scale factor hereinafter discussed in connection with measuring the actual angular displacement of the motor drive shaft 122; whereby the computer 500 may timely calculate the desired angular displacement of the motor drive shaft 122 during any sampling time interval T. In this connection it is noted that the summation of all such counts is representative of the desired linear displacement of the circumference of the drum 38, and thus of the desired velocity versus time profile of drum rotation for timely accelerating the drum 38 to the target velocity V1, maintaining the drum velocity at V1 for feeding the particular mailpiece 16 and timely decelerating the drum 38 to rest.

The postage meter 10 (FIG. 1) additionally includes a conventional, rotatably mounted, shaft 74 on which the drum 38 is fixedly mounted, and a conventional drive gear 76, which is fixedly attached to the shaft for rotation of the shaft 74.

According to the invention, the mailing machine 12 (FIG. 1) includes an idler shaft 80 which is conventionally journaled to the casing 19 for rotation, and, operably coupled to the shaft 80, a conventional home position encoder 82. The encoder 82 includes a conventional circularly-shaped disc 84, which is fixedly attached to the shaft 80 for rotation therewith, and an optical sensing device 86, which is operably coupled to the disc 84 for detecting an opening 88 formed therein and, upon such detection, signalling the computer 500. The machine 12, also includes an idler gear 90 which is fixedly attached to the shaft 80 for rotation therewith. Further, the machine 12 includes a D.C. motor 120, which is suitably attached to the casing 19 and has a drive shaft 122. The machine 12 also includes a pinion gear 124, which is preferably slidably attached to the drive shaft 122 for rotation by the shaft 122. As hereinafter discussed in greater detail, the gear 124 may be slidably disposed in driving engagement with the idler gear 90. Assuming such engagement, rotation of the motor drive shaft 122 in a given direction, results in the same direction of rotation of the drum drive shaft 76 and thus the drum 38. Preferably, the pinion gear 124 has one-fifth the number of teeth as the drum drive gear 76, whereas the idler gear 90 and drum drive gear 76 each have the same number of teeth. With this arrangement, five complete revolutions of the motor drive shaft 122 effectuate one complete revolution of the drum 38, whereas each revolution of the gear 90 results in one revolution of the gear 76. Since there is a one-to-one relationship between revolutions, and thus incremental angular displacements, of the drum shaft 74 and idler shaft 90, the encoder disc 84 may be mounted on the idler shaft 90 such that the disc's opening 88 is aligned with the sensing device 86 when the drum 38 is disposed in its home position to provide for detection of the home position of the drum shaft 74, and thus a position of the drum shaft 74 from which incremental angular displacements may be counted.

Figure 2:
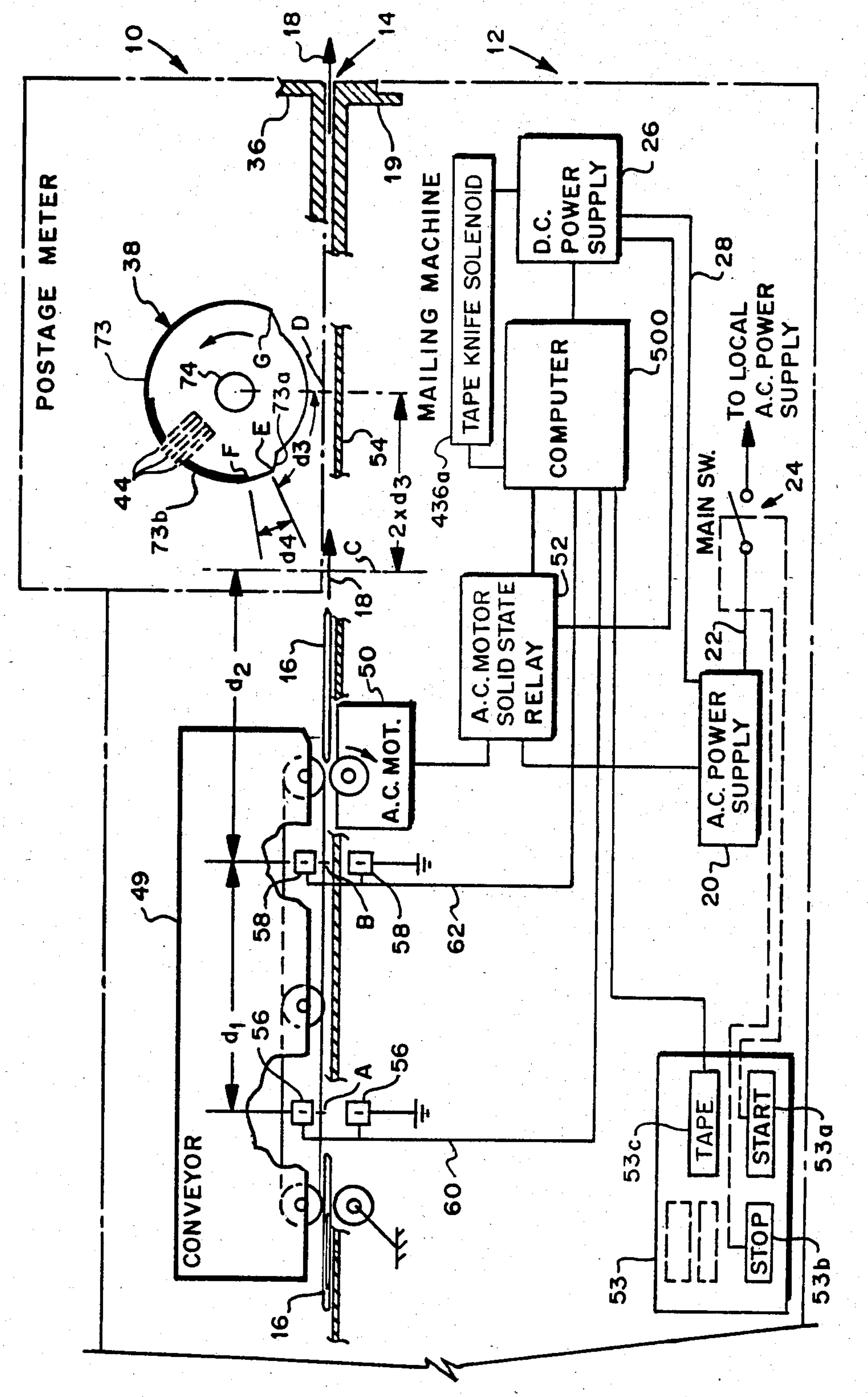
FIG. 2 is a schematic view of the mailing machine of FIG. 1, showing the location of the mailpiece sensors relative to the postage meter drum.
Figure 4:
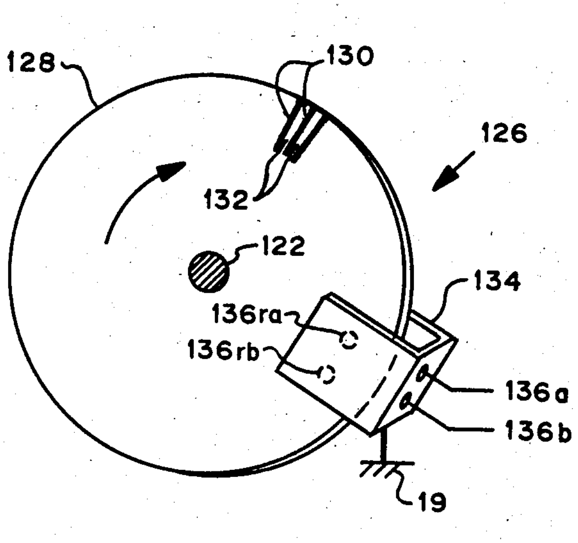
FIG. 4 is a perspective view of the quadrature encoder mounted on a D.C. motor drive shaft.
Figure 5:
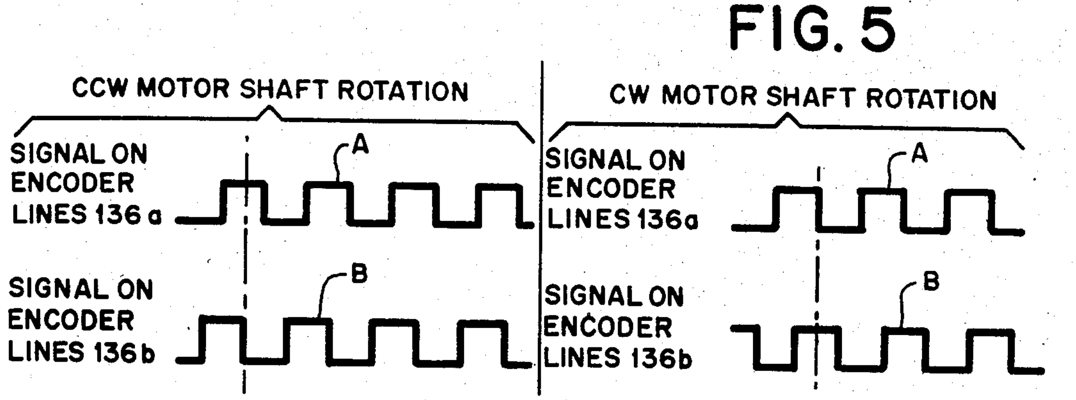
FIG. 5 shows the output signals from the quadrature encoder of FIG. 4 for clockwise and counter-clockwise rotation of the D.C. motor drive shaft.

For sensing actual incremental angular displacements of the motor drive shaft 122 (FIG. 1) from a home position, and thus incremental angular displacements of the drum 38 from its rest or home position as shown in FIG. 2, there is provided a quadrature encoder 126 (FIG. 1). The encoder 126 is preferably coupled to the motor drive shaft 122, rather than to the drum shaft 74, for providing higher mechanical stiffness between the armature of the d.c. motor 120 and the encoder 126 to avoid torsional resonance effects in the system, and to provide for utilization of a single encoder 126 for indirectly sensing the angular displacement and direction of rotation of the shaft 122 for a plurality of different loads. The encoder 126 includes a circularly-shaped disc 128, which is fixedly attached to the motor drive shaft 122 for operably connecting the encoder 126 to the motor 120. The disc 128 (FIG. 4) which is otherwise transparent to light, has a plurality of opague lines 130 which are formed on the disc 128 at predetermined, equidistantly angularly-spaced, intervals along at least one of the dics's opposed major surfaces. Preferably the disc 128 includes one hundred and ninety-two lines 130 separated by a like number of transparent spaces 132. In addition, the encoder 126 includes an optical sensing device 134, which is conventionally attached to the casing 19 and disposed in operating relationship with respect to the disc 128, for serially detecting the presence of the respective opaque lines 130 as they successively pass two reference positions, for example, positions **136*ra* and 136*rb*, and for responding to such detection by providing two output signals, one on each of communications lines 136*a* and 136*b*, such as signal A (FIG. 5) on line 136*a* and signal B on line 136*b*. Since the disc 128 (FIG. 4) includes 192 lines 130 and the gear ratio of the drum drive gear 76 (FIG. 1) to the motor pinion gear 124 is five-to-one, nine hundred and sixty signals A and B (FIG. 5) are provided on each of the communications lines 136*a* and 136*b* during five revolutions of the motor drive shaft 122, and thus, during each cycle of rotation of the drum 38. Since the angular distance between successive lines 130 (FIG. 4) is a constant, the time interval between successive leading edges (FIG. 5) of each signal A and B is inversely proportional to the actual velocity of rotation of the motor drive shaft (FIG. 1) and thus of the drum 38. The encoder 126 is conventionally constructed and arranged such that the respective reference positions 136*a* and 136*b* (FIG. 4) are located with respect to the spacing between line 130 to provide signals A and B (FIG. 5) which are 90 electrical degrees out of phase. Accordingly, if signal A lags signal B by 90° (FIG. 5) the D.C. motor shaft 122 (FIG. 1), and thus the drum 38, is rotating clockwise, whereas if signal A leads signal B by 90° (FIG. 5) the shaft 122 and drum 38 are both rotating counter-clockwise. Accordingly, the angular displacement in either direction of rotation of the drum 38** (FIG. 1) from its home position may be incrementally counted by counting the number of pulses A or B, (FIG. 5) as the case may be, and accounting for the lagging or leading relationship of pulse A (FIG. 5) with respect to pulse B.

Figure 6:
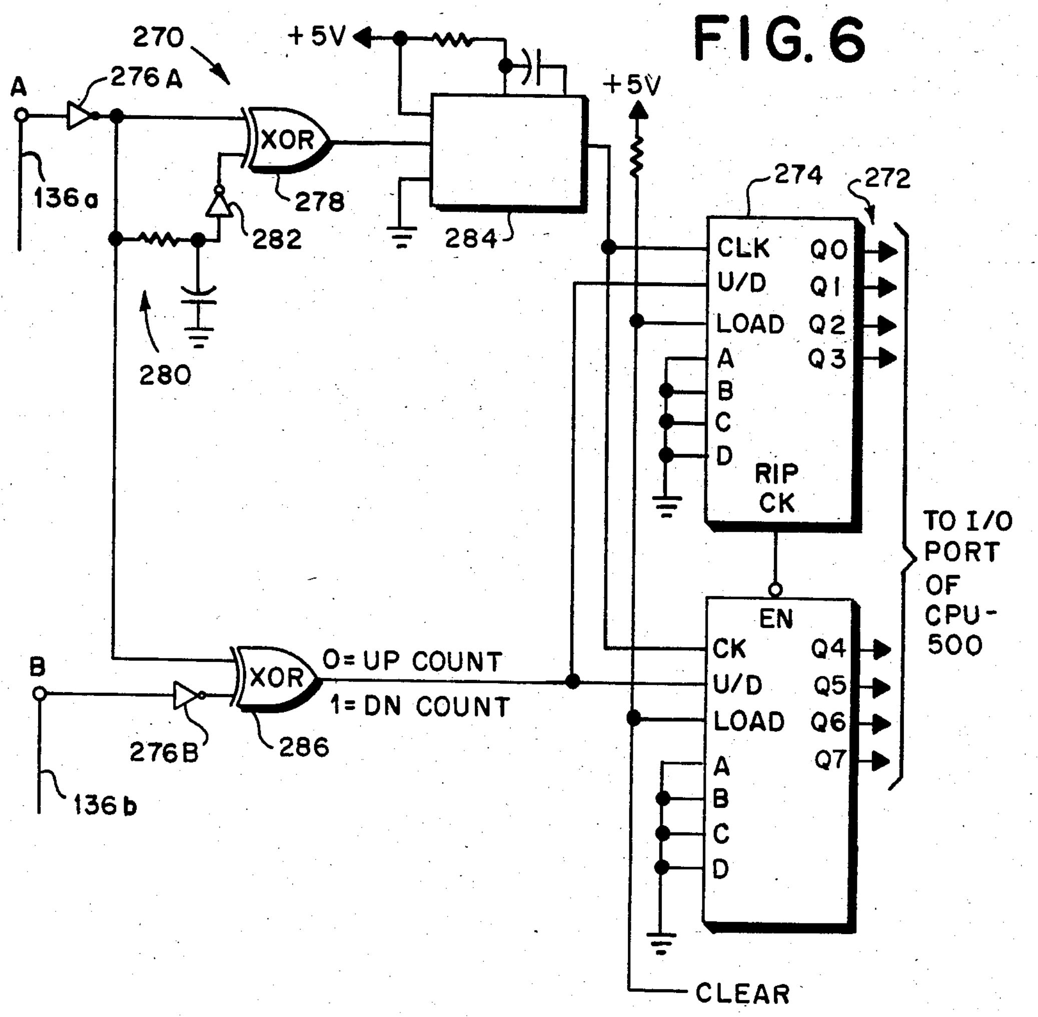
FIG. 6 is a schematic diagram of a preferred counting circuit for providing an eight bit wide digital signal for the computer which numerically represents the direction of rotation, and angular displacement, of the motor drive shaft, and thus the drum, from its home position.

The quadrature encoder communication lines, **136*a* and 136*b* (FIG. 1), may be connected either directly to the computer 500 for pulse counting thereby or to the computer 500 via a conventional counting circuit 270 (FIG. 6), depending on whether or not the internal counting circuitry of the computer 500 is or is not available for such counting purposes in consideration of other design demands of the system in which the computer 500 is being used. Assuming connection to the computer 500 via a counting circuit 270, the aforesaid communications lines, 136*a* and 136*b* are preferably connected via terminals A and B, to the counting circuit 270**.

In general, the counting circuit 270 (FIG. 6) utilizes the pulses A (FIG. 5) to generate a clock signal and apply the same to a conventional binary counter 274 (FIG. 6), and to generate an up or down count depending on the lagging or leading relationship of pulse A (FIG. 5) relative to pulse B and apply the up or down count to the binary counter 274 (FIG. 6) for counting thereby. More particularly, the pulses A and B (FIG. 5) which are applied to the counting circuit terminals A and B (FIG. 6) are respectively fed to Schmidt trigger inverters 276A and 276B. The output from the inverter 276A is fed directly to one input of an XOR gate 278 and additionally via an R-C delay circuit 280 and an inverter 82 to the other input of the XOR gate 278. The output pulses from the XOR gate 278, which acts as a pulse frequency doubler, is fed to a conventional one-shot multivibrator 284 which detects the trailing edge of each pulse from the XOR gate 278 and outputs a clock pulse to the clock input CK of the binary counter 274 for each detected trailing edge. The output from the Schmidt trigger inverters 276A and 276B are respectively fed to a second XOR gate 286 which outputs a low logic level signal (zero), or up-count, to the up-down pins U/D of the binary counter 274 for each output pulse A (FIG. 5) which lags an output pulses B by 90 electrical degrees. On the other hand the XOR gate 286 (FIG. 6) outputs a high logic level (one) or down-count, to the up-down input pins of the binary counter 274 for each encoder output pulse A (FIG. 5) which leads an output pulse B by 90° electrical degrees. Accordingly, the XOR gate 286 (FIG. 6) provides an output signal for each increment of angular displacement of the encoded shaft 122 (FIG. 1) and identifies the direction, i.e., clockwise or counter-clockwise, of rotation of the encoded shaft 122. The binary counter 274 (FIG. 6) counts the up and down count signals from the XOR gate 286 whenever any clock signal is received from the multivibrator 284, and updates the binary output signal 272 to reflect the count.

Accordingly, the counting circuit 270 converts the digital signals A and B, which are representative of incremental angular displacements of the drive shaft 122 in either direction of rotation thereof, to an eight bit wide digital logic output signal 272 which corresponds to a summation count at any given time, of such displacements, multiplied by a factor of two, for use by the computer 500. Since the angular displacement of the shaft 122 from its home position is proportional to the angular displacement of the drum 38 from its home position, the output signal 272 is a count which is proportional to the actual linear displacement of the outermost periphery of the drum 38 at the end of a given time period of rotation of the drum 38 from its home position. For a typical postage meter drum 38, having a circumference, i.e., the arc described by the outermost periphery of the drum 38 in the course of revolution thereof, of 9.42 inches, which is connected to the motor drive shaft 122 via a mechanical transmission system having a 5:1 gear ratio between the motor 120 and drum 38, wherein the encoder disc 128 has 192 lines; the counting circuit 270 will provide an output of $2\times192=384$ counts per revolution of the shaft 122, and $5\times384=1920$ counts per revolution of the drum 38 which corresponds to 203.82 counts per inch of linear displacement of the periphery of the drum. Accordingly, the maximum mailpiece transport velocity of $V1=61(10^{-3})$ inches per millisecond may be multiplied by a scale factor of 203.82 counts per inch to express the maximum transport velocity in terms of counts per millisecond, or, counts per sampling time period T where T=1 millisecond; i.e., $61(10^{-3})$ inches per millisecond times 203.82 counts per inch=12.43 counts per sampling time period T. Similarly, any other target velocity V1, or any acceleration or decceleration value, may be expressed in terms of counts per sampling time interval T, or counts per square millisecond, as the case may be, by utilization of the aforesaid scale factor.

For energizing the D.C. motor 120 (FIG. 1) there is provided a power amplifying circuit 300. The power amplifying circuit 300 (FIG. 7) is conventionally operably connected to the motor terminals 302 and 304 via power lines 306 and 308 respectively. The power amplifying circuit 300 preferably comprises a conventional, H-type, push-pull, control signal amplifier 301 having input leads A, B, C and D, a plurality of optical-electrical isolator circuits 303 which are connected on a one-for-one basis between the leads A-D and four output terminals of the computer 500 for coupling the control signals from the computer 500 to the input leads A, B, C, and D of the amplifier 301, and a plurality of conventional pull-up resistors 305 for coupling the respective leads A-D to the 5 volt source. The amplifier 301 includes four conventional darlington-type, pre-amplifier drive circuits including NPN transistors T1, T2, T3 and T4, and four, conventional, darlington-type power amplifier circuits including PNP transistors Q1, Q2, Q3 and Q4 which are respectively coupled on a one-for-one basis to the collectors of transistors T1, T2, T3 and T4 for driving thereby. The optical-electrical isolator circuits 303 each include a light emitting diode D1 and a photo-responsive transistor T5. The cathodes of D1 are each connected to the 5 volt source, the emitters of T5 are each connected to ground and the collectors of T5 are each coupled, on a one-for-one basis, to the base of one of the transistors T1, T2, T3 and T4. With respect to each of the opto-isolator circuits 303, when a low logic level signal is applied to the anode of D1, D1 conducts and illuminates the base of T5 thereby driving T5 into its conductive state; whereas when a high logic level signal is applied to the anode of D1, D1 is non-conductive, as a result of which T5 is in its non-conductive state. With respect to each of the combined amplifier circuits, T1 and Q1, T2 and Q2, T3 and Q3, and T4 and Q4, when the lead A, B, C or D, as the case may be, is not connected to ground via the collector-emitter circuit of the associated opto-isolator circuit's transistor T5, the base of T1, T2, T3 or T4, as the case may be, draws current from the 5 volt source via the associated pull-up resistor 305 to drive the transistor T1, T2, T3 or T4, as the case may be, into its conductive state. As a result, the base of transistor Q1, Q2, Q3 or Q4, as the case may be, is clamped to ground via the emitter-collector circuit of its associated driver transistor T1, T2, T3 or T4, thereby driving the transistor Q1, Q2, Q3 or Q4, as the case may be, into its conductive state. Contrariwise, the transistor pairs T1 and Q1, T2 and Q2, T3 and Q3, and T4 and Q4 are respectively biased to cut-off when lead A, B, C or D, as the case may be, is connected to ground via the collector-emitter circuit of the associated opto-isolator circuit's transistor T5. As shown in the truth table (FIG. 8) for clockwise motor rotation, Q1 and Q4 are turned on and Q2 and Q3 are turned off; whereas for counter-clockwise motor rotation, Q2 and Q3 are turned on and Q1 and Q4 are turned off. Accordingly, for clockwise motor rotation: terminal 302 (FIG. 7) of the motor 120 is connected to the 30 volt source via the emitter-collector circuit of Q1, which occurs when Q2 is turned off and the base of Q1 is grounded through the emitter-collector circuit of T1 due to the base of T1 drawing current from the 5 volt source in the presence of a high logic level control signal at input terminal A; and terminal 304 of the motor 120 is connected to ground via the emitter-collector circuit of Q4, which occurs when Q3 is turned off and the base of Q4 is grounded through the emitter-collector circuit of T4 due to the base of T4 drawing current from the 5 volt source in the presence of a high logic level signal at the input terminal D. On the other hand, for counter clockwise rotation of the motor 120: terminal 302 of the motor 120 is connected to ground via the emitter-collector circuit of Q2, which occurs when Q1 is turned off and the base of Q2 is grounded through the emitter-collector circuit of T2 due to the base of T2 drawing current from the 5 volt source in the presence of a high logic level control signal at the input terminal B; and terminal 304 of the motor 120 is connected to the 30 volt source via the emitter-collector circuit of Q3, which occurs when Q4 is turned off and the base of Q3 is grounded through the emitter-collector of T3 due to the base of T3 drawing current from the 5 volt source in the presence of a high logic level control signal at the input terminal C. For turning off the respective powers transistors Q1-Q4, on a two at a time basis, low level control signals are applied on a selective basis to the two terminals B and C, or A and D, as the case may be, to which high logic control level signals are not being applied; which occurs when the opto-isolator circuit's transistors T5 associated with the respective leads B and C or A and D are driven to their conductive states. When this occurs the bases of the transistors T2 and T3, or T1 and T4, as the case may be, are biased to open the emitter-collectors circuits of the transistors T2 and T3, or T1 and T4, as the case may be, as a result of which the bases of the transistors Q2 and Q3, or Q1 and Q4, as the case may be, are biased to open the emitter-collector circuits of transistors Q2 and Q3, or Q1 and Q4, as the case may be.

The velocity of the motor 120 (FIG. 7) is controlled by modulating the pulse width and thus the duty cycle of the high logic level, constant frequency, control signals, i.e., pulse width modulated (PWM) signals, which are timely applied on a selective basis to two of the leads A-D, while applying the low level logic signals to those of leads A-D which are not selected. For example, assuming PWM signals (FIG. 9) having a 50% duty cycle are applied to leads A and D (FIG. 7), and low level logic signals are applied to leads B and C, for clockwise rotation of the motor 120, the velocity of the motor 120 will be greater than it would be if high logic level PWM signals (FIG. 9) having a 25% duty cycle were similarly applied and will be less than it would be if high logic level PWM signals having a 75% duty cycle were similarly applied. Accordingly, assuming rotation of the motor 120 (FIG. 7) is commenced by utilizing high logic level PWM signals having a given duty cycle percentage, the velocity of the motor 120 may be decreased or increased, as the case may be, by respectively decreasing or increasing the duty cycle percentage of the applied high logic level PWM signals.

Further, assuming the motor 120 is rotating clockwise due to PWM signals having a selected positive average value being applied to leads A and D, in combination with low level logic signals being applied to leads B and C, the motor 120 may be dynamically braked by temporarily applying high level PWM signals having a selected duty cycle corresponding to a given positive average value to leads B and C, in combination with low logic signals being applied to leads A and D. To avoid damage to the power transistors Q1, Q2, Q3 and Q4 which might otherwise result, for example, due to current spikes accompanying back emf surges which occur in the course of switching the circuit 301 from one mode of operation to the other, the emitter-collector circuits of the power transistors Q1, Q2, Q3 and Q4 are respectively shunted to the 30 volt source by appropriately poled diodes, D1, D2, D3 and D4 connected across the emitter-collector circuits of Q1, Q2, Q3 and Q4.

As shown in FIG. 1, according to the invention, the D.C. motor 120 is utilized for driving a plurality of different loads. To that end, the motor 120 includes a splined, preferably triangularly-shaped, output shaft 122 on which the encoder disc 128 is fixedly mounted and to which the drive gear 124 is slidably attached. In addition, the mailing machine 12 includes mode selection apparatus 400 for slidably moving the drive gear 124 lengthwise of the shaft and selectively into engagement with one of a plurality of mechanical loads. The mode selection apparatus 400 includes a stepper motor 402 which is conventionally coupled to the computer 500 for operation thereby. The stepper motor 402 has an output shaft 404 on which a pinion gear 406 is fixedly mounted for rotation by the shaft 404. In addition, the apparatus 400 includes a carriage 420, which is conventionally slidably mounted on the motor output shaft 122. The drive gear 124 is conventionally rotatably attached to the carriage 420 and slidably moveable therewith along the shaft 122. Thus, the drive gear 124 may be located at various positions lengthwise of the shaft 122 by moving the carriage 420. To that end, the mode selection apparatus 400 includes a rack 422 which is fixedly attached to the carriage 420, extends parallel to the motor output shaft 122 and is disposed in meshing engagement with the stepper motor's pinion gear 404. In response to signals received by the stepper motor 402 from the computer 500, the stepper motor pinion gear 406 indexes the rack 422, and thus the carriage 420 to carry the pinion gear 124 into meshing engagement with the drum drive gear 90,·both of the postage value selection gears 430 and 432, either of the postage value selection gears 430 or 432, or any other power transfer gear 434. For example, the power transfer gear 434 may be mounted on a shaft 435 and utilized for driving a conventional tape feeding mechanism and tape cutting knife 436, operable under the control of the computer 500 in response to actuation of the key 53*c* (FIG. 2) for feeding tape to the drum and, after the tape is fed by the drum 38 and the computer 500 operates the solenoid 436*a* of the knife to cut off a pre-determined length of tape, feeding back the remaining tape from the path of travel 18. For the purposes of this disclosure, the tape feeding mechanism 436 (FIG. 1) is intended to be representative of that particular load or any other operator selectable, conventional load, for example, in a mailing machine 12 or postage meter 10.

To lock the non-selected power transfer gears of the group of gears 90, 430, 432 and 434 against rotation when the selected one or more of gears 90, 430, 432 and 434 are being driven by the motor drive gear 124, the carriage 420 additionally includes a first projecting tooth 448, extending parallel to the motor drive shaft 122, which is dimensioned for meshing engagement with each of the gears 90,430 and 432 and a second projecting tooth 449, extending parallel to the motor drive shaft 122, which is dimensioned for meshing engagement with the gear 434. Of course, if gear 434 were located for engagement by tooth 448 rather than tooth 449 the projecting tooth 449 would be superfluous. Accordingly, in the context of this disclosure the carriage 420 includes at least one, and may include more than one, projecting tooth 448 or 449, or both. Assuming the stepper motor 402 is energized to cause the carriage 420 to index the motor drive gear 124 into engagement with the transfer gear 90 for driving the drum 38, the projecting tooth 448 is concurrently indexed into engagement with gears 430 and 432, and the projecting tooth 449 is concurrently indexed into engagement with the gear 434, thereby locking gears 430, 432 and 434 against rotation. Further, assuming the stepper motor 402 is energized to cause the carriage 420 to index the motor drive gear 124 into engagement with both of the gears 430 and 432 for concurrently driving the gears 430 and 432, the projecting tooth 448 is concurrently indexed into engagement with the drum drive transfer gear 90, whereas the projecting tooth 449 is concurrently driven into engagement with the gear 434, for locking the gears 90 and 434 against rotation. Thus, in general, when at least one (or more) of the gears of the group 90, 430, 432, 434, is (or are) engaged for rotation by the motor output gear 124 the remaining one (or more) gears of the group of 90, 430, 432, 434 is (or are) locked against rotation by the carriage 420. In this connection it is noted that any of the gears 90, 430, 432 and 434 and other power transfer gears may be located for engagement by either of the projecting teeth 448 and 449, and that the axial length of the gear 124 may be either expanded or contracted to facilitate engaging one or more of such gears without departing from the spirit and scope of this disclosure.

The mode selection apparatus 400 also preferably includes a quadrature encoder sensing device 452 for coupling the computer 500 to the stepper motor output shaft 404. The encoder 452, which is preferably substantially the same as the encoder 126, includes a disc 454 which is fixedly attached to the shaft 404 and a sensor 456 which is electrooptically coupled to the disc 454 to provide the computer 500 with input signals A and B (FIG. 5) which are representative of the magnitude and direction of angular displacement of the motor output shaft 404 (FIG. 1) from a home position. The signals A and B (FIG. 5) from the sensor 456 may be coupled either directly to the computer 500 (FIG. 1) or indirectly thereto via a counting circuit 270. In any event the signals A and B from the sensor 456 are respectively coupled via communications lines 457*a* and 457*b*. The home position may be identified by means of an opening 458, formed in the encoder disc 454, which is sensed by the sensor 456 when the motor drive gear 128 is located in its home position, which, by definition, is preferably when the gear 124 is located in a neutral position, i.e., a predetermined position out of engagement with any of the transfer gears 90, 430, 432, or 434.

As shown in FIG. 1, the postage meter 10 conventionally includes a plurality of racks 460 which are suitably slidably mounted in a channel 462, formed in the drum drive shaft 74, and a plurality of print wheels 464 which are conventionally rotatably mounted within the postage meter's drum 38. In addition, the meter 10 includes a plurality of pinion gears 466 (one of which is shown), which are conventionally connected, on a one-for-one basis, with each of the print wheels 464 and disposed in meshing engagement, on a one-for-one basis, with each of the racks 460. Accordingly, lengthwise movement of a given rack 460 results in rotation of the associated print wheel 464 for selectively locating a given one of the print wheel's print elements 465, one of which is shown and each of which corresponds to a different one of the numerals of the numeric keys (0–9 inclusive) or the decimal point "." of the decimal point key of the keyboard 30, at the outer periphery of the drum 38 to effectuate printing a selected postage value on a mailpiece 16 when the drum 38 is rotated into engagement with the mailpiece 16.

In the preferred embodiment the D.C. motor 120 is utilized for driving a conventional rotary postage value selection mechanism 470 (FIG. 1) of the type shown in U.S. Pat. No. 4,580,493 issued in the name of P. Sette and assigned to the assignee of the present invention. The rotary value selection mechanism 470 generally comprises an annularly-shaped rack selection member 472, having external gear teeth 474, which is conventionally rotatably mounted on the drum drive shaft 74. In addition the mechanism 470 includes a pinion gear 476, which is conventionally rotatably connected internally to the member 472. Rotation of the annular member 472 thus carries the pinion gear 476 into meshing engagement with any one of the respective racks 460 for selection thereof. Further, the mechanism 470 includes an annularly-shaped digit, or print element, selection member 478 having external gear teeth 480, which is conventionally rotatably mounted on the member 472. The selection member 478 includes internal, helically threaded, gear teeth 482, which are disposed in meshing engagement with the pinion gear 476. Rotation of the selection member 478 thus rotates the pinion gear 476 for lengthwise moving the selected rack 460 to rotate its associated print wheel 464 for selecting the print element 465 thereof which is to be utilized for printing purposes. The drive train of the rotary value selection mechanism may include transfer gears 484 and 486 which are respectively disposed in meshing engagement with gear teeth 474 and 478 and are respectively mounted on shafts 484*a* and 486*a*. The shafts 484*a* and 486*a* are each suitably rotatably attached to the casing 36 of the postage meter 10. For counting increments of angular displacement of the respective shafts, 484*a* and 486*a*, and thus the angular displacement of the respective selection members 472 and 478, the shafts 484*a* and 486*a* respectively have connected thereto quadrature encoder sensing devices 488 and 490 for coupling the postage meter's computer 41 to the postage value selection mechanism 470 to permit the computer 41 to verify postage value selections. The respective encoders 488 and 490 are preferably substantially the same as the encoder 126. The encoder 488 includes a disc 488*a*, which is fixedly attached to the shaft 484*a*, and a sensor 488*b* which is electro-optically coupled to the disc 488*a* to provide the computer 41 with input signals A and B which are representative of the magnitude and direction of angular displacement of the rack selection member 472 from a home position. Correspondingly, the encoder 490 includes a disc 490*a*, which is fixedly attached to the shaft 486*a*, and a sensor 490*b* which is electro-optically coupled to the disc 490*a* to provide the computer 41 with input signals A and B (FIG. 5) which are representative of the magnitude and direction of rotation of the print element selection member 478 from a home position. The home position of the encoder discs 488*a* and 490*a* may be identified, in the case of the disc 488*a* by means of and opening 488*c* formed in the disc 488*a*, and in the case of the disc 490*a* by means of the encoder line of the disc 490*a* which is being sensed by the sensor 490*b* at the time of commencement of rotation of the shaft 486*a*. The signals A and B (FIG. 5) from the sensor 488*b* are respectively coupled to the computer 41 (FIG. 1) via the communications lines 488*d* and 488*e*; whereas the signals A and B from the sensor 490*b* are respectively coupled to the computer 41 via the communications lines 490*d* and 490*e*. However, it is within the scope of this disclosure to couple the sensors 488*b* and 490*b* to the computer 41 via a counting circuit 270, for the reasons hereinbefore discussed in connection with coupling the sensor 134 to the computer 500. For the selection member 472 the home position may, by definition, be any position in which the pinion gear 476 is located out of engagement with any of the racks 460; whereas for the selection member 478 the home position is by definition, a floating position corresponding to its location at the time of commencement of actuation of a given rack 460.

For driving the selection members 474 and 478, the gears 484 and 486 may respectively be located in meshing engagement with the transfer gears 432 and 430, or, alternatively, conventional transmission systems 492 and 494 may be respectively be provided between gear 432 and gear 484, and between gear 430 and gear 486. For example, the transmission system 492 may include an idler gear 496 which is located in the postage meter 10 and disposed in meshing engagement with gears 484 and 432, and the transmission system 494 may include an idler gear 498 which is located in the postage meter 10 and disposed in meshing engagement with gears 486 and 430. Assuming the latter arrangement, the idler gear 496 may be suitably mounted on a shaft 496*a* which is conventionally attached to the postage meter's frame 36 and the idler gear 498 may be suitably mounted on a shaft 498*a* which is conventionally attached to the frame 36. In operation the selection members 472 and 478 are preferably concurrently driven when indexing the pinion gear 476 from rack 460 to rack 460 and out of engagement with any of the racks 460, to avoid binding between the pinion gear 476, racks 460 and selection member 478. And, to locate the pinion gear 476 out of engagement with any of the racks 460 the drum drive shaft 74 is preferably relieved, for example, by means of teeth 499 having the same spacing as the teeth of the racks 460. Accordingly, the D.C. motor drive gear 124 is preferably indexed into engagement with the transfer gear 430 alone and in combination with the transfer gear 432 for postage value selection purposes.

A more detailed description of the mechanical structure of the rotary value selection mechanism 470 (FIG. 1) and alternate embodiments and improvements of the same may be found in the aforesaid U.S. patent of P. Sette.

To control the motion of the drum 38 (FIG. 1) during each cycle of drum rotation, the D.C. motor 120 and its shaft encoder 126 are respectively connected to the computer 500 via the power amplifier circuit 300 and the counting circuit 270. And the computer 500 is preferably programmed to calculate the duration of and timely apply PWM control signals to the power amplifier circuit 300 after each sampling time instant Tn, utilizing an algorithm based upon a digital compensator D(s) derived from analysis of the motor 120, motor load 38, 74, 76, 90 and 124 amplifying circuit 300, encoder 126, counting circuit 270, and the digital compensator D(s) in the closed-loop, sampled-data, servo-control system shown in FIG. 10.

Figure 10:
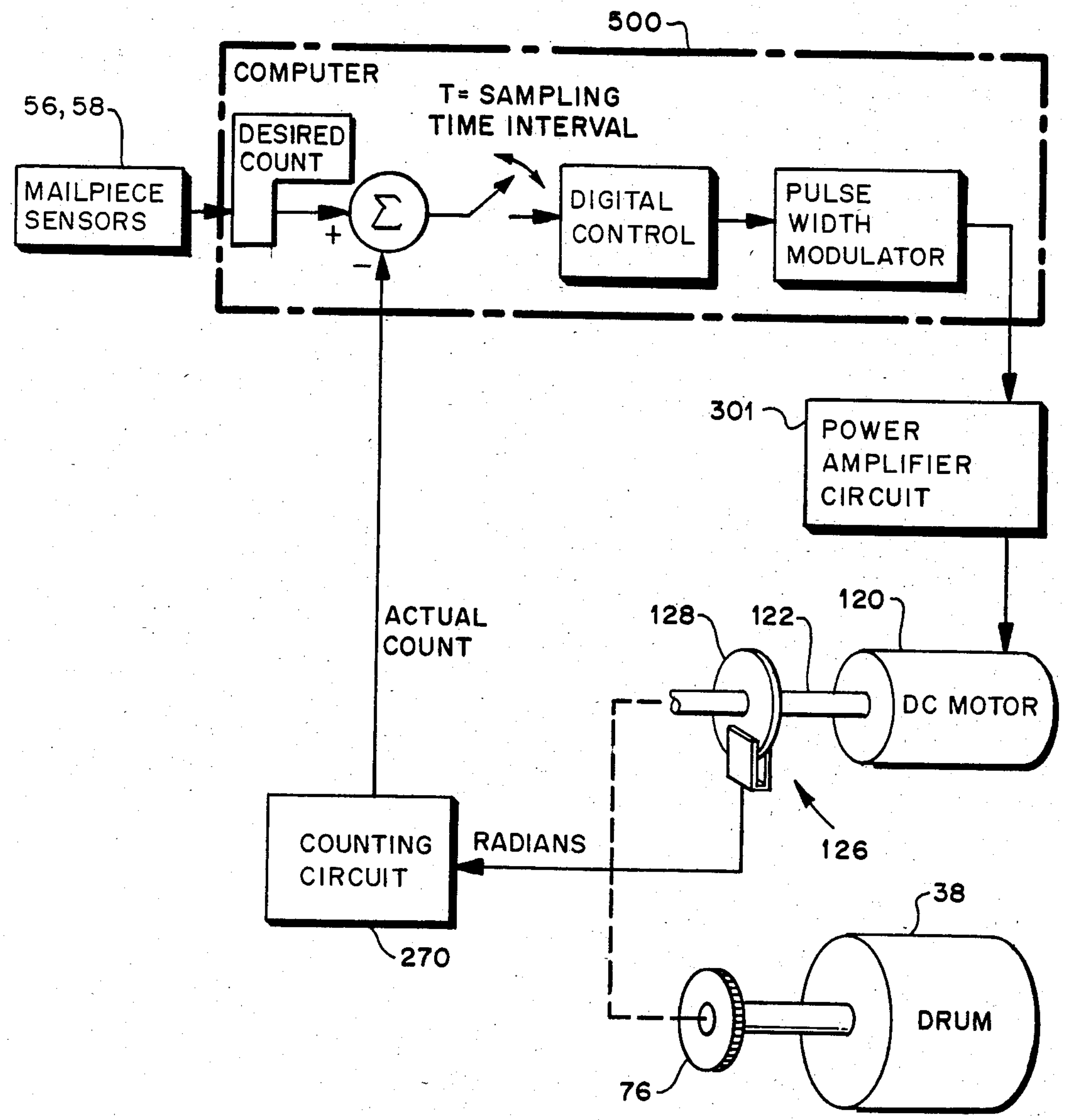
FIG. 10 shows a closed-loop servo system including the D.C. motor and computer.

With reference to FIG. 10, in general, at the end of each predetermined sampling time period of T=1 millisecond, the eight bit wide count representing the angular displacement of the motor drive shaft 122, and thus the drum 38, from its home position is sampled by the computer 500 at the time instant Tn. Under the control of the program of the computer 500 (FIG. 10), a summation is taken of the aforesaid actual count and the previously calculated count representing the desired position of the motor drive shaft 122, and thus the drum 38, at the end of the time period T, and, under control of the computer program implementation of the algorithm, a PWM control signal which is a function of the summation of the respective counts, or error, is applied to the power amplifier circuit 301 for rotating the motor drive shaft 122 such that the error tends to become zero at the end of the next sampling time period T.

Figure 11:
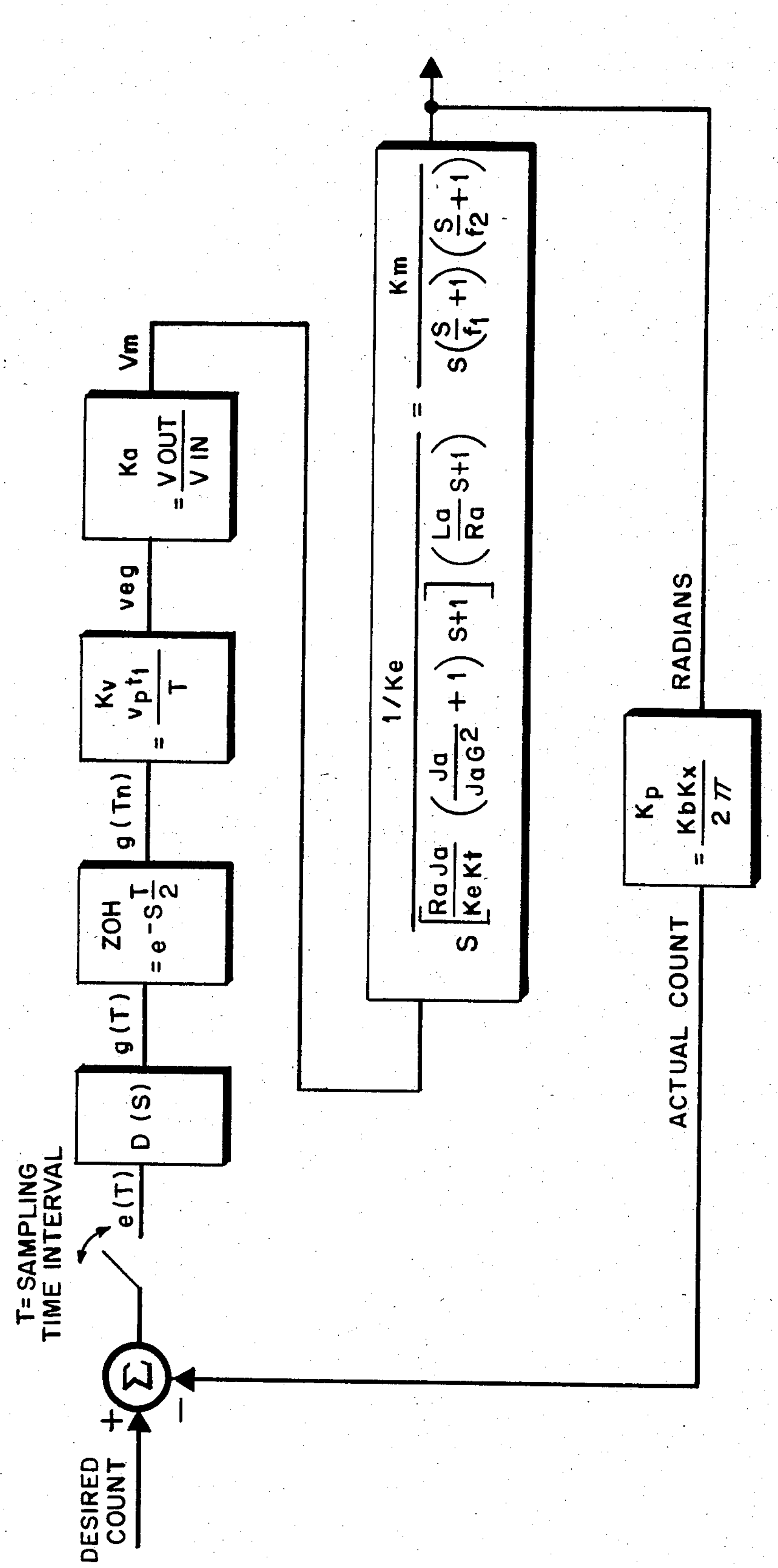
FIG. 11 is a block diagram portraying the laplace transform equations of the closed-loop servo system shown in FIG. 10.

To derive the algorithm, the servo-controlled system of FIG. 10 is preferably analyzed in consideration of its equivalent Laplace transformation equations shown in FIG. 11, which are expressed in terms of the following Table of Parameters and Table of Assumptions.

TABLE I

Parameters

| Parameter | Symbol | Value and/or Dimension |
|---|---|---|
| Zero-Order-Hold | ZOH | None |
| Laplace Operator | S | jw |
| Sampling Interval | T | Milliseconds |
| PWM D.C. Gain | $K_v$ | Volts |
| PWM Pulse Amplitude | $V_p$ | 5 Volts |
| PWM Pulse Width | $t_1$ | $10^{-6}$ Micro-seconds |
| Power Switching Circuit Gain | $K_a$ | None |
| Motor back e.m.f. Constant | $K_e$ | 0.63 Volts/radian/second |
| Motor Armature Resistance | $R_a$ | 1.65 Ohms |
| Motor Armature Moment of Inertia | Ja | 2.12 $(10^{-5})$ Kilograms (meters$^2$) |
| Motor Torque Constant | $K_t$ | 0.063 Newton-Meters/amp |
| Drum Moment of Inertia | $J_1$ | 70.63 $(10^{-5})$ Kilograms (meters$^2$) |
| Gear Ratio, Motor to Load | G | 5:1, None |
| Motor Armature Inductance | $L_a$ | 2.76 Millihenrys |
| Motor Shaft Encoder Gain | $K_p$ | Counts/radian |
| Motor Shaft Encoder Constant | $K_b$ | 192 Lines/revolution |
| Counting Circuit Multiplier | $K_x$ | 2, None |
| Motor Gain | $K_m$ | 16, None |
| Poles in frequency domain | $f_1;f_2$ | 48;733 Radians/second |
| Starting Torque Gain | $K_c$ | None |
| System Overall Gain | $K_o$ | None |

TABLE II

Assumptions

| | |
|---|---|
| ZOH: | Since the output and input are held constant during each sampling period a zero-order-hold is assumed to approximate the analog time function being sampled. |
| Veq.: | Since the integral of the voltage in time is assumed equal to the area under the PWM pulse, the output from the PWM is linear. |

With reference to FIG. 10, D(S) is the unknown transfer function of an open loop compensator in the frequency domain. Due to a key factor for providing acceptably fast motor response being the system's resonance between the motor and load, the derivation of the transfer function D(S) for stabilization of the system is preferably considered with a view to maximizing the range of frequencies within which the system will be responsive, i.e., maximizing the system's bandwidth, BW. For calculation purposes a sampling period of T=1 millisecond was chosen, due to having chosen a Model 8051 microprocessor, available from Intel Corporation, Palo Alto Calif. for control purposes, and inasmuch as the Model 8051 microprocessor equipped with a 12 MHz crystal for providing a clock rate of 12 MHz, is able to conveniently implement a 1 KHz sampling rate and also implement application software routines, after control algorithm iterations, during the sampling period of T=1 millisecond. However, other sampling periods and other conventional microprocessors may be utilized without departing from the spirit and scope of the invention.

The open loop system gain $H_1(S)$ without compensation, of the servo-loop system of FIG. 10 is shown in FIG. 12(*a*). To tolerate inaccuracies in the transmission system between the motor and drum load, such as backlash, it was considered acceptable to maintain a steady-state count accuracy of plus or minus one count. To reflect this standard, the gain equation of FIG. 12(*a*) was adjusted to provide a corrective torque $C_t$ with a motor shaft movement, in radians per count, equivalent to the inverse expressed in radians per count, of the gain $K_p$ of the encoder counting circuit transform. Since the corrective torque $C_t$ is primarily the friction of the transmission system which has to be overcome by the motor at start-up, the value of $C_t$ may be assumed to be substantially equal to a maximum estimated numerical value based on actual measurements of the starting friction of the system, i.e., 35 ounce-inches, as a result of which a numerical value of the starting voltage $V_s$ may be calculated from the expression $V_s=(C_t)R_a/K_t$, i.e., $V_s=6.5$ volts, which, in turn, permits calculation of a numerical value for the minimum overall system gain $K_o$, at start-up, from the equation $K_o=V_s/K_p$, i.e., $K_o=397$ volts per radian, or for simplication purposes, 400 volts/radian. Accordingly, the open-loop uncompensated gain $H_1(S)$ may be rewritten as $H_2(S)$ as shown in FIG. 12(*b*), in which a gain factor of $K_c$ has been included, to account for the torque $C_t$ and the value of $K_o$ is substituted for the overall D.C. gain, i.e., $(K_v)(K_m)(K_p)(K_a)(K_c)=K_o$. Although the numerical value of $K_c$ may also be calculated, it is premature to do so, since it has not as yet been established that $K_o$, which has been adjusted by the value of $K_c$ to provide a minimum value of $K_o$, is acceptable for system stability and performance purposes. Otherwise stated, $K_o$ may not be the overall system gain which is needed for system compensation for maximizing the system bandwidth BW, as a result of which it is premature to conclude that $K_c$ will be equivalent to the D.C. gain of the system compensator D(S).

At this juncture, the Bode diagram shown in FIG. 13, may be constructed due to having calculated a minimum value for $K_o$. As shown in FIG. 13, the absolute value of $H_2(S)$, in decibels, has been plotted against the frequency W in radians per second, based on the calculated minimum value of $K_o$, the selected value of T and calculated values of the poles $f_1$ and $f_2$. From the Bode diagram, a numerical value of the crossover over frequency $W_{cl}$ of the Bode plot of $H_2(S)$ may be determined, i.e., $W_{cl}$ was found to be substantially 135 radians per second. And, since the value of $W_{cl}$ is substantially equal to the bandwidth $BW_u$ of the uncompensated open-loop system $H_2(S)$, a calculation may be made of the phase margin $\theta_m$ of the uncompensated system from the expression $\phi_m=180°-\theta$ [H(S)] at $W_{cl}$, or, otherwise stated: $\phi_m=180°-\tan^{-1}(W_{c1})-\tan^{-1}(W_{c1}/f_1)-\tan^{-1}(W_{c1}/f_2)-\tan^{-1}(W_{c1}T/2)$. From this calculation, there was obtained a phase margin value which was much, much, less (i.e., 5°) than 45°, which, for the purposes of the calculations was taken to be a minimum desirable value for the phase margin $\phi_m$ in a position-type servo system. Accordingly, it was found that the uncompensated system $H_2(S)$ was unstable if not compensated. Since an increase in phase lead results in an increase in bandwidth BW, and the design criteria calls for maximizing the bandwidth BW and increasing the phase margin to at least 45°; phase lead compensation was utilized.

Figure 3:
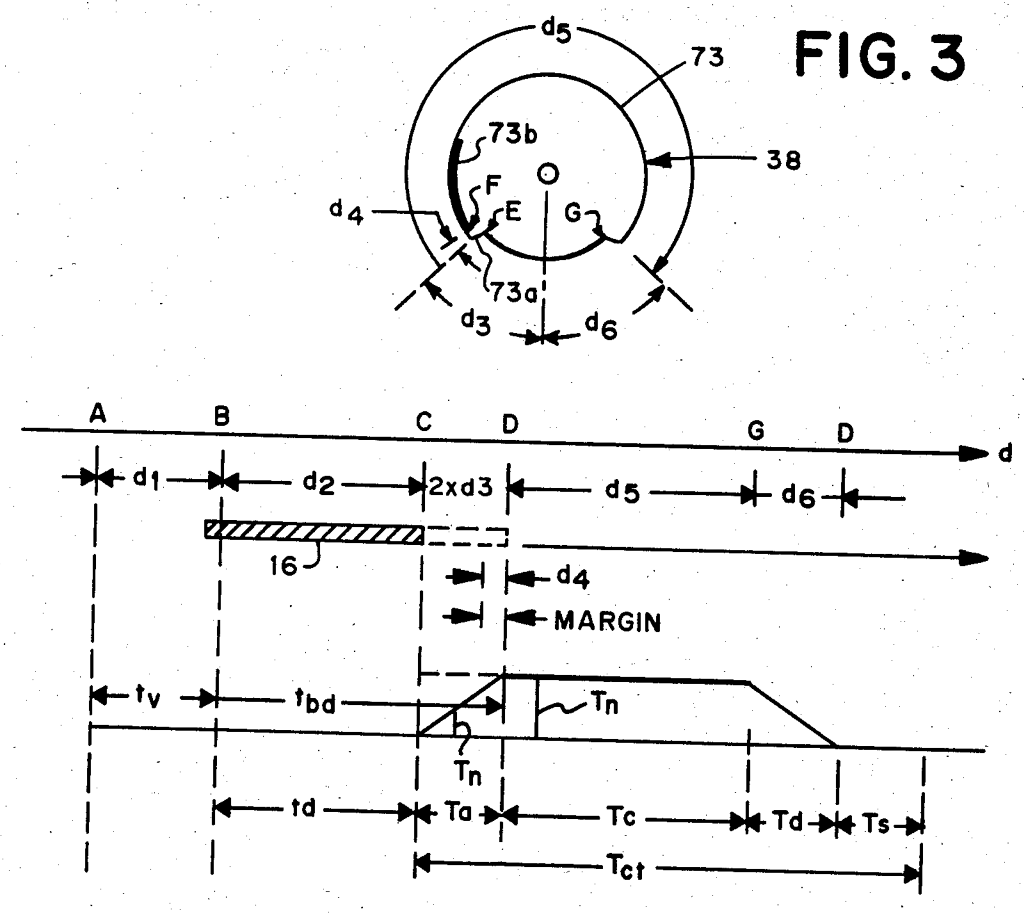
FIG. 3 shows the relationship between the position of a sheet and the postage meter drum as a function of time, and an ideal velocity versus time profile of the periphery of the drum.

By definition, a phase lead compensator D(S) has the Laplace transform shown in FIG. 14, wherein $K_c$ is the phase lead D.C. gain, and $f_z$ and $f_p$ are respectively a zero frequency and a pole frequency. Adding the transfer function of the phase lead compensator D(S) to the Bode plot of the uncompensated system's transfer function $H_2(S)$, results in the Bode plot of the compensated system transfer function $H_3(S)$, if the zero frequency $f_z$ of the phase lead compensator D(S) is chosen to be equivalent to $f_1$ in order to cancel the lag due to the mechanical time constant of the uncompensated transfer function $H_2S$. As shown in FIG. 3, the cross-over frequency $W_{c2}$ for the compensated system $H_3(S)$ may be read from the Bode diagram, i.e., $W_{c2}$ was found to be substantially equal to 400 radians per second. And, since by definition the crossover frequency $W_{c2}$ lies at the geometric mean of $f_p$ and $f_2$, the value of the $f_p$ may be established by doubling, from $f_z$, the linear distance between $W_{c2}$ and to $f_z$, as measured along the logarithmic frequency axis, W, and reading the value of $f_p$ from the Bode diagram, i.e., $f_p$ was found to be substantially equal to 3,400 radians per second. Since numerical values may thus be assigned to both $W_{c2}$ and $f_p$ from the Bode diagram, the compensated phase margin $\phi_{mc}$, i.e., the phase margin for the phase lead compensated system $H_3(S)$ in which $f_z$ has been equated to $f_1$, may be found from the expression $\phi_{mc}=180°-90°-\tan^{-1}(W_{c2}/f_2)-\tan^{-1}(W_{c2}T/2)$. Upon calculating the compensated phase margin $\phi_{mc}$ it was found to be 50° and, therefore, greater than the minimum phase margin criteria of 45°. In addition, the value of $W_{c2}$ for the compensated system $H_3(S)$ was found to be substantially three times that of the uncompensated system $H_2(S)$, as a result of which the bandwidth BW of the system H(S) was increased by a factor of substantially three to $BW_c$.

At this juncture, the compensated system $H_3(S)$ is preferably analyzed with reference to the system's overshoot $O_s$ and settling time $t_s$ based on a calculation of the system damping factor $d_f$ and the assumption that the system will settle in five times constants, i.e., $t_s=5t_x$. The relevant values may be calculated or estimated, as the case may be, from the expressions, for $d_f$, $o_s$, $t_x$ and $t_s$ shown in FIG. 15. In connection with this analysis, reference is also made to the typical mailing machines hereinbefore described, wherein a maximum drum cycle time period $T_{ct}$ (FIG. 3) of 234 milliseconds and a maximum mailpiece transport speed (FIG. 2) of 61 inches per second are typical values. Assuming the velocity profile of FIG. 3, and, as previously discussed an acceleration time period of $T_a=37$ milliseconds, a constant velocity time period of $T_c=124$ milliseconds and deceleration time period of $T_d=24$ milliseconds, the longest permissible settling time for the system was calculated, i.e., $T_{ct}-(T_a+T_c+T_d)=234-185=49$ milliseconds. For analysis purposes a series of calculations of the aforesaid system characteristics and phase margin were performed, assuming incremental increases in the overall system gain $K_o$, while holding $f_z=f_1$. The results of such calculations are shown in the following Table III.

TABLE III

| | | $H_3(S)$ with $f_z = f_1$ | | |
|---|---|---|---|---|
| $K_o$ = system gain | $W_c$ = BW (rad./sec.) | $\theta_m$ = phase Margin (deg.) | $O_s$ = overshoot (percent) | $t_s$ = settling time (MS.) |
| 400 | 400 | 50 | 28 | 28.67 |
| 447 | 450 | 46 | 31 | 27.78 |
| 501 | 500 | 42 | 34 | 27.50 |
| 562 | 550 | 38 | 38 | 27.41 |

As shown in Table III, the system bandwidth BW may be maximized at 450 radians per second while maintaining a phase margin $\phi_m$ of at least 45° the two design criteria discussed above. Although this results in an increase in system overshoot $O_s$ accompanied by a negligible decrease in the settling time $t_s$, the settling time $t_s$ is well within the maximum allowable settling time, $T_s=49$ milliseconds. On the other hand, if a bandwidth of 400 radians per second is acceptable, it is desirable to reduce the percentage of overshoot $O_s$, and increase the phase margin to $\theta_{mc}=50$ to provide for greater system stability than would be available with a phase margin value (i.e., 46°) which is substantially equal to the design criteria minimum of 45°; in which instance it is preferable to choose the bandwidth of BW=400 radians per second, overshoot of $O_s=28\%$ and compensated phase margin of $\theta_{mc}=50°$. For the example given, a compensated Bandwidth of $BW_c=400$ radians per second is acceptable inasmuch as worst case load conditions were assumed. In this connection it is noted that the foregoing analysis is based on controlling a postage meter drum, which has a high moment of inertia, contributes high system friction, and calls for a cyclical start-stop mode of operation during which the load follows a predetermined displacement versus time trajectory to accommodate the maximum mailpiece transport speed in a typical mailing machine. Accordingly, the compensated system bandwidth $BW_c=400$ radians per second may be chosen, as a result of which the overall system gain $K_o$ may be fixed at $K_o=400$, and the value of $K_c$ may be calculated from the expression $K_c=K_o/(K_v)(K_a)(K_p)$. Since $f_z=f_1$, and $f_1$ and $f_p$ are also known, the Bode plot of the compensator D(S), FIG. 14, may be added to the Bode diagram (FIG. 13) wherein the system compensator D(S) is shown as a dashed line.

Since the analog compensator D(S) was derived in the frequency domain, D(S) was converted to its Z-transform equivalent D(Z) in the sampled data domain for realization in the form of a numerical algorithm for implementation by a computer. Of the numerous well-known techniques for transforming a function in the frequency domain to a function in the sampled-data domain, the bi-linear transformation may be chosen. For bi-linear transformation purposes the Laplace operator S is defined by the expression shown in FIG. 16. Using the values $K_c=13.64$, $f_z=f_1=48$, and $f_p=3{,}400$ in the expression for D(S) shown in FIG. 14, and substituting the bi-linear transformation expression for S shown in FIG. 16 and the sampling interval T=1 millisecond, in the expression shown in FIG. 14 results in the expression for D(Z) shown in FIG. 17. As shown in FIG. 11, D(T)=output/input=g(T)/e(T), which, in the sampled data domain is expressed by the equation D(Z)=G(Z)/E(Z). Accordingly, the expression for D(Z) shown in FIG. 17 may be rewritten as shown in FIG. 18(*a*). Cross-multiplying the equivalency of FIG. 18(*a*) results in the expression shown in FIG. 18(*b*), which defines the output G(Z) in the sampled data domain of the system compensator D(S). Taking the inverse Z-transform of the expression shown in FIG. 18(*b*), results in the expression shown in FIG. 19 which defines the output $G(T_n)$ in the time domain of the system compensator D(S), and is a numerical expression of the algorithm to be implemented by the computer for system compensation purposes. As shown by the expression in FIG. 19 and in the following Table IV the output of the digital compensator for any current sampling instant $T_n$ is a function of the position error at the then current sampling time instant $T_n$, is a function of the position error at the end of the next previous sampling time instant $T_{n-1}$ and is a function of the algorithm output at the end of the next previous sampling time instant $T_{n-1}$.

TABLE IV

| Function | Definition |
|---|---|
| $G(T_n)$ | Algorithm output for current sampling time instant $T_n$ |
| $E(T_n)$ | Position error for current sampling time instant $T_n$ |
| $G(T_{n-1})$ | Algorithm output for next previous sampling time instant $T_{n-1}$ |
| $E(T_{n-t})$ | Position error for next previous sampling time instant $T_{n-1}$ |
| $K_1$, $K_2$ & $K_3$ | Constants of the compensated system which are a function of the parameters of the motor load and system friction for a sampling time period of T = 1 millisecond. |

Accordingly, the algorithm which is to be implemented by the computer 500 for system compensation purposes is a function of a plurality of historical increments of sampled data for computing an input value for controlling a load to follow a predetermined position trajectory in a closed loop sampled-data servo-control system.

Inasmuch as the compensation algorithm was derived with a view to maximizing the closed-loop system bandwith for controlling the D.C. motor to drive the postage meter's worst case load, i.e., the postage meter's drum, the same compensation algorithm may be utilized for controlling the rotary value selection mechanism, or any other apparatus having mechanical, electro-mechanical or electrical loading characteristics of substantially the same magnitude as, or of lesser magnitude than the loading characteristics of the postage meter drum and associated drive transmission system at start-up, in a closed-loop, sampled data servo-control system. For example, as distinguished from controlling the drum 38 as a function of the sampled velocity of a mailpiece 16, the rack and print element selection members 472 and 478 of the rotary value selection mechanism 470 may each be controlled as a function of amounts representative of a predetermined, trapezoidal-shaped velocity versus time profile stored in the computer 500. Thus, a group of acceleration, decceleration and constant velocity constants may be conventionally stored in the computer 500 and fetched for calculating counts representative of the desired angular displacement of the motor output shaft 122 during each sampling time period T, for comparison with the counts representative of the actual angular displacement of the motor output shaft 122 during each sampling time period T. Correspondingly, any other group of acceleration, decceleration and constant velocity constants representative of any other trapezoidal-shaped velocity versus time profile of angular displacement of the motor drive shaft may be stored in the memory of the computer for use in controlling the linear displacement during each successive time period T of any portion of a given load, such as the pinion gear, a rack or print element, the periphery of the drum, or a given portion of the tape feeding mechanism or any other load.

Figure 20:
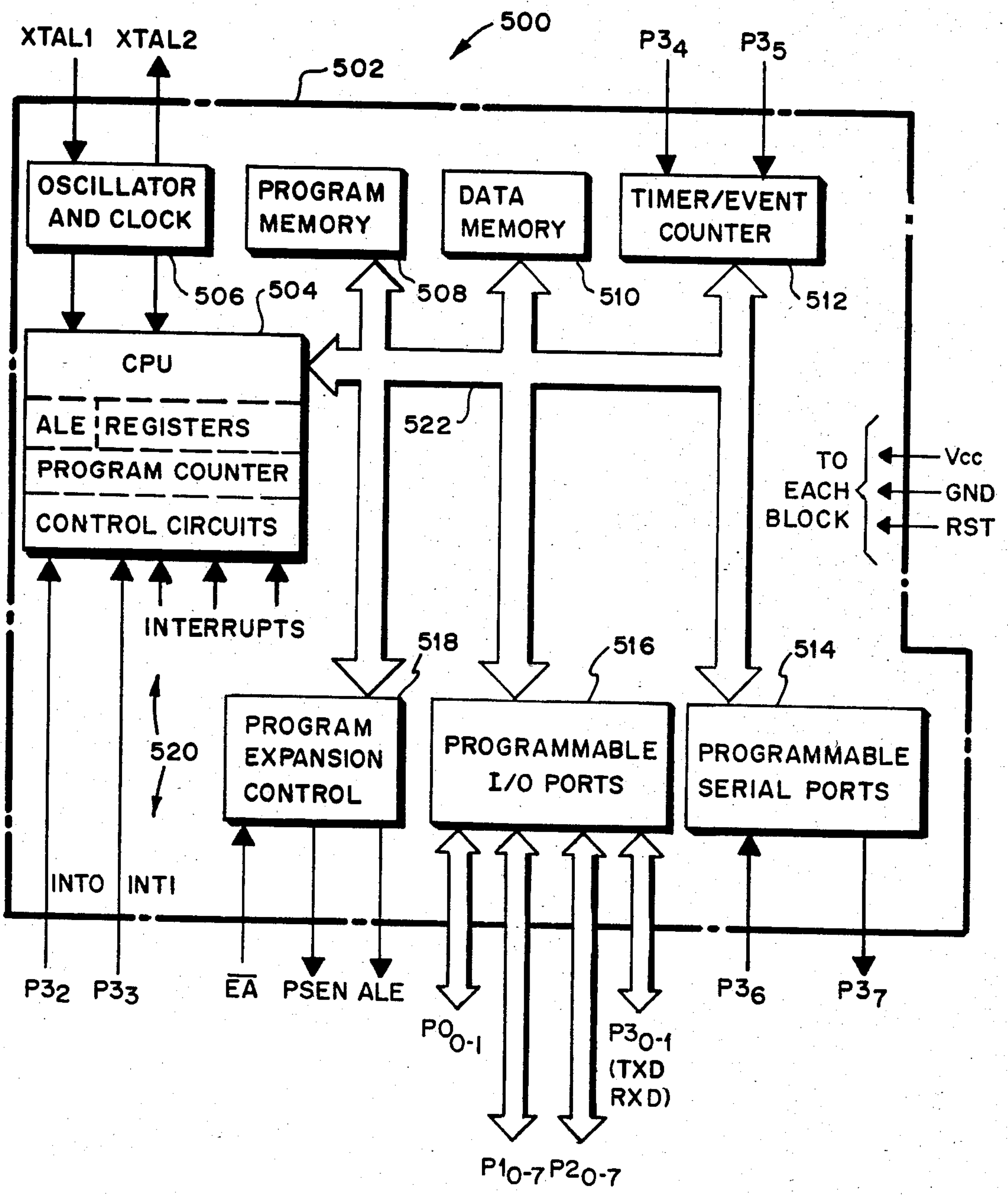
FIG. 20 is a block diagram of a preferred microprocessor for use in controlling the D.C. Motor.

As shown in FIG. 20 the computer 500 preferably includes a conventional, inexpensively commercially available, high speed microprocessor 502, such as the Model 8051 single chip microprocessor commercially available from Intel Corporation, 3065 Bowers Avenue, Santa Clara, Calif.95051. The microprocessor 502, generally comprises a plurality of discrete circuits, including those of a control processor unit or CPU 504, an oscillator and clock 506, a program memory 508, a data memory 510, timer and event counters 512, programmable serial ports 514, programmable I/O ports 516 and control circuits 518, which are respectively constructed and arranged by well known means for executing instructions from the program memory 508 that pertain to internal data, data from the clock 506, data memory 510, timer and event counter 512, serial ports 514, I/O ports 514 interrupts 520 and/or bus 522 and providing appropriate outputs from the clock 506, serial ports 514, I/O ports 516 and timer 512. A more detailed discussion of the internal structural and functional characteristics and features of the Model 8051 microprocessor, including optional methods of programming port 3 for use as a conventional bi-directional port, may be found in the Intel Corporation publication entitled MCS-51 Family of Single Chip Microcomputers Users Manual, dated January 1981.

For implementing the sampling time period of T=1 millisecond, one of the microprocessor's timer and event counters 512 (FIG. 20) is conventionally programmed as a sampling time period clock source. To that end, a timer 512 is programmed for providing an interrupt signal each 250 microseconds, and each successive fourth interrupt signal is utilized as a clock signal for timing the commencement of successive sampling time periods of T=1 millisecond.

Figure 21:
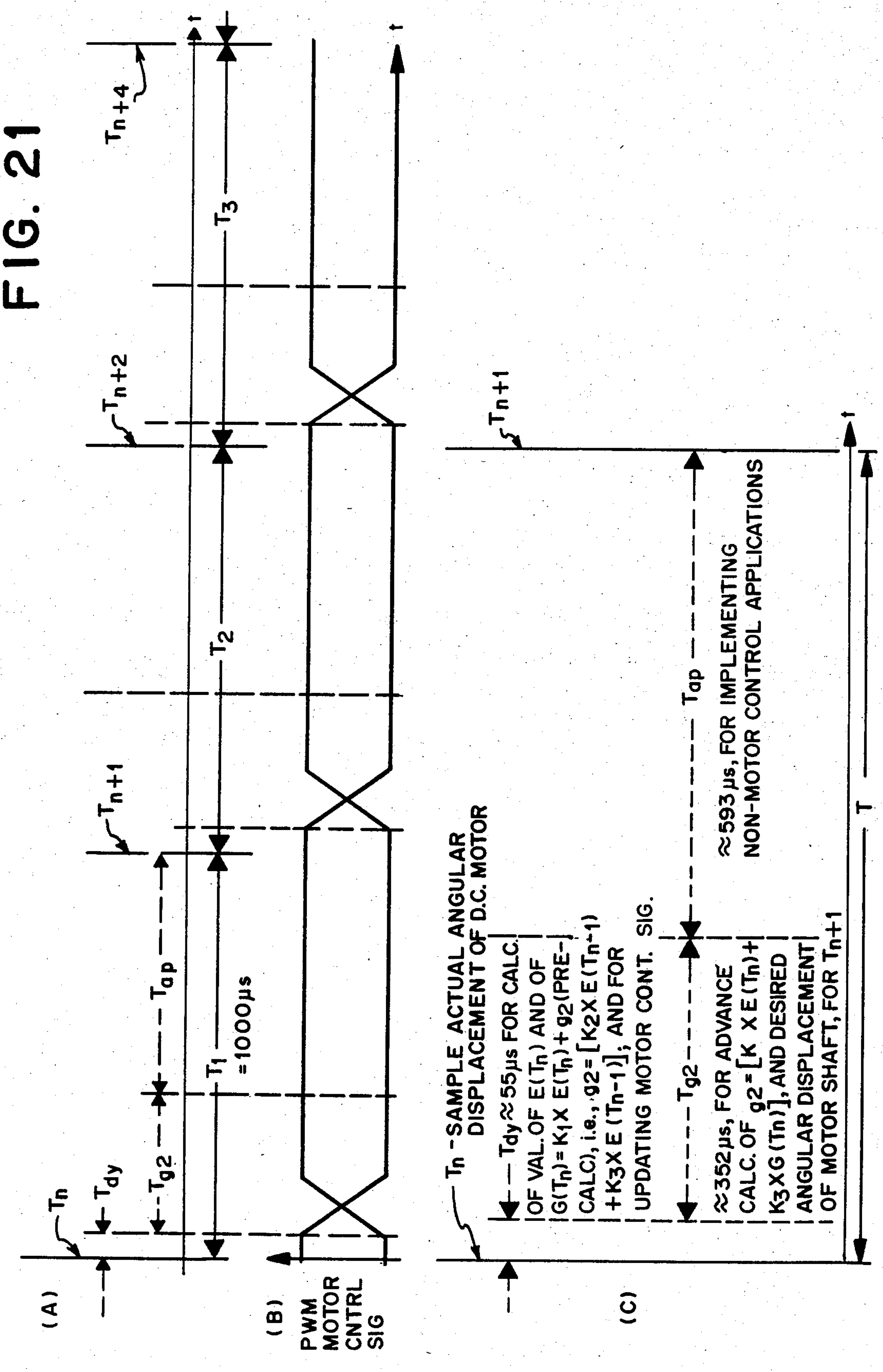
FIG. 21 shows the time intervals during which the motor control signal and its separable components are calculated to permit early application of the signal to the motor.
Figures 1, 22A:
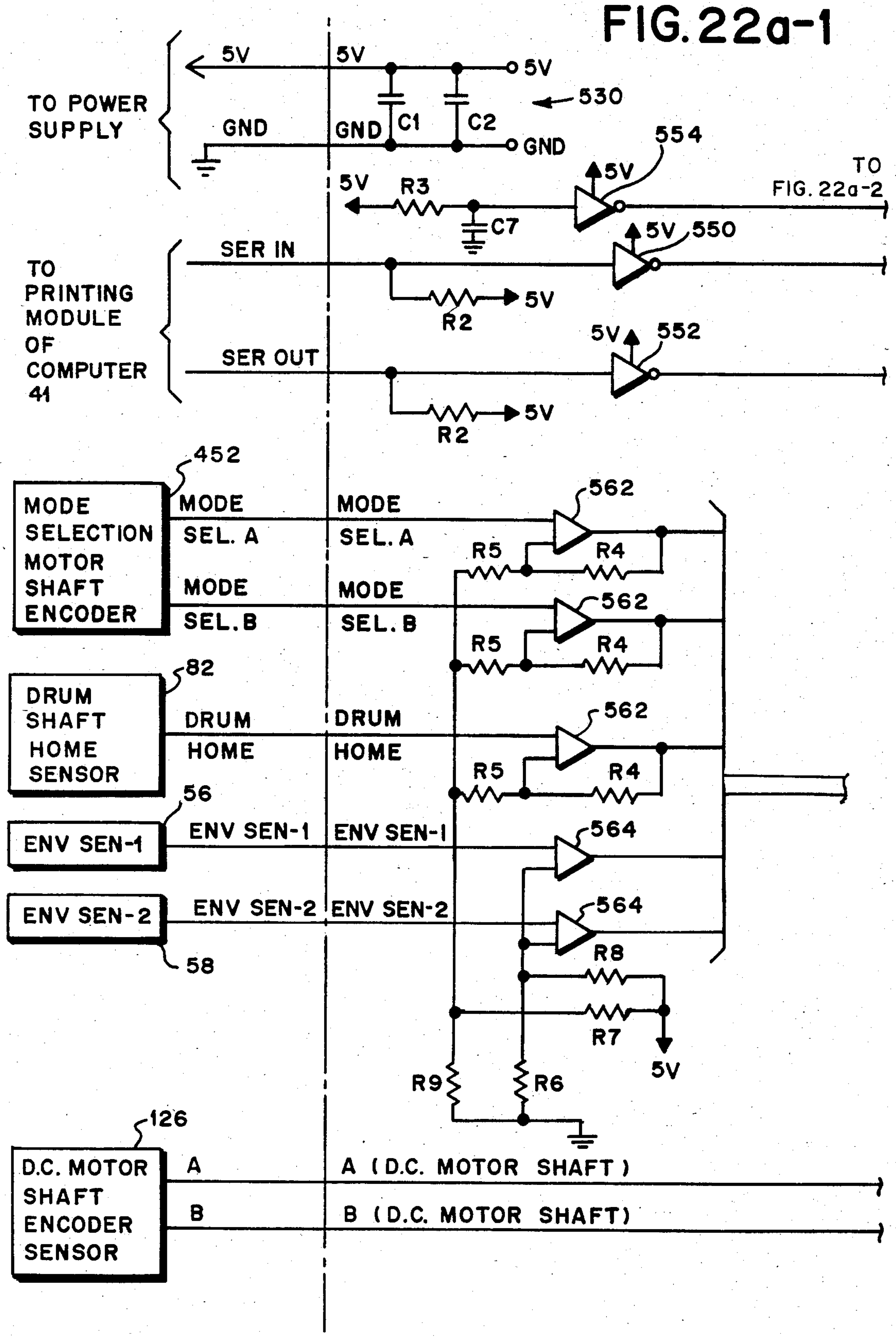
Figures 2, 22A:
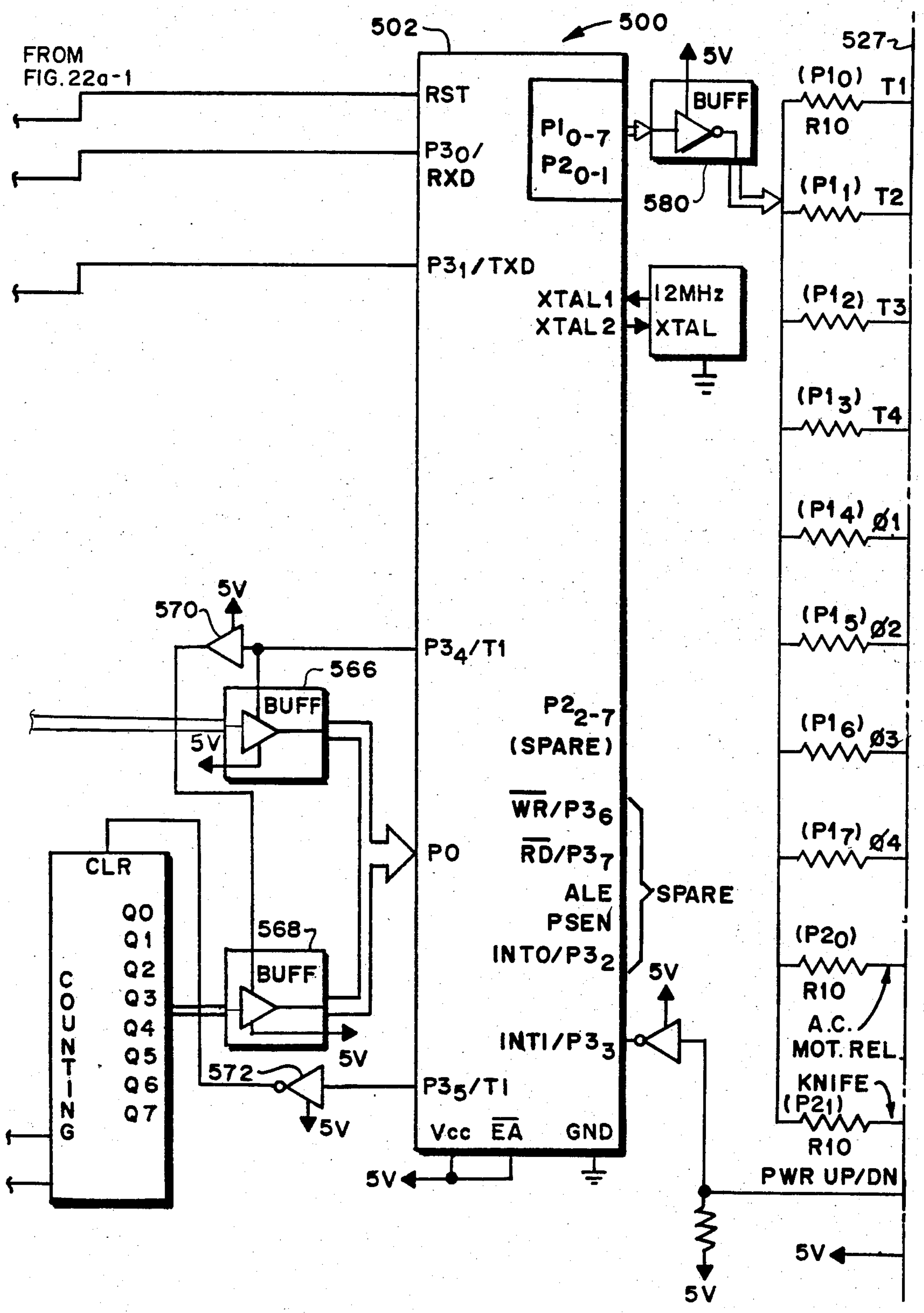
Figures 1, 22B:
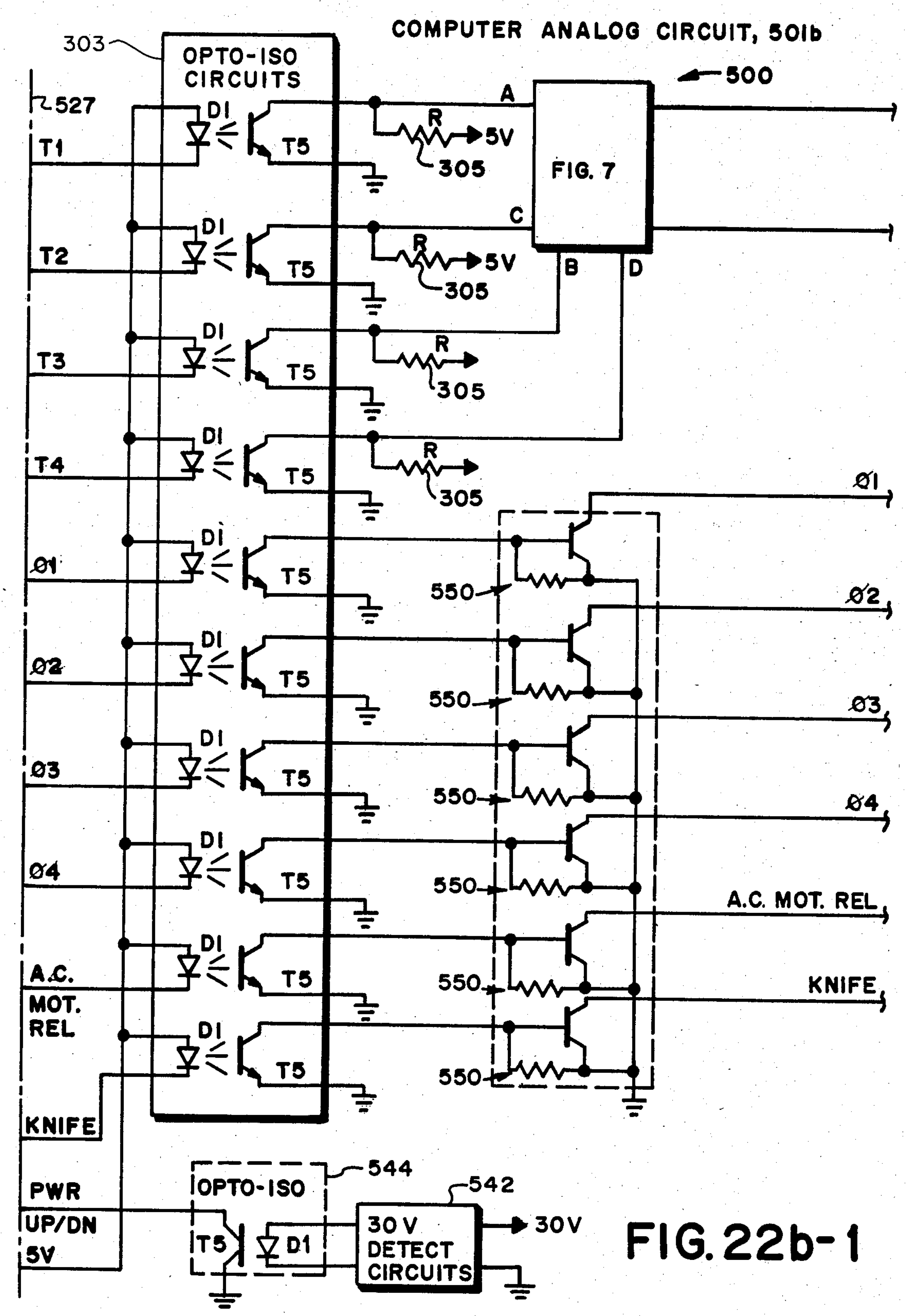
Figures 2, 22B:
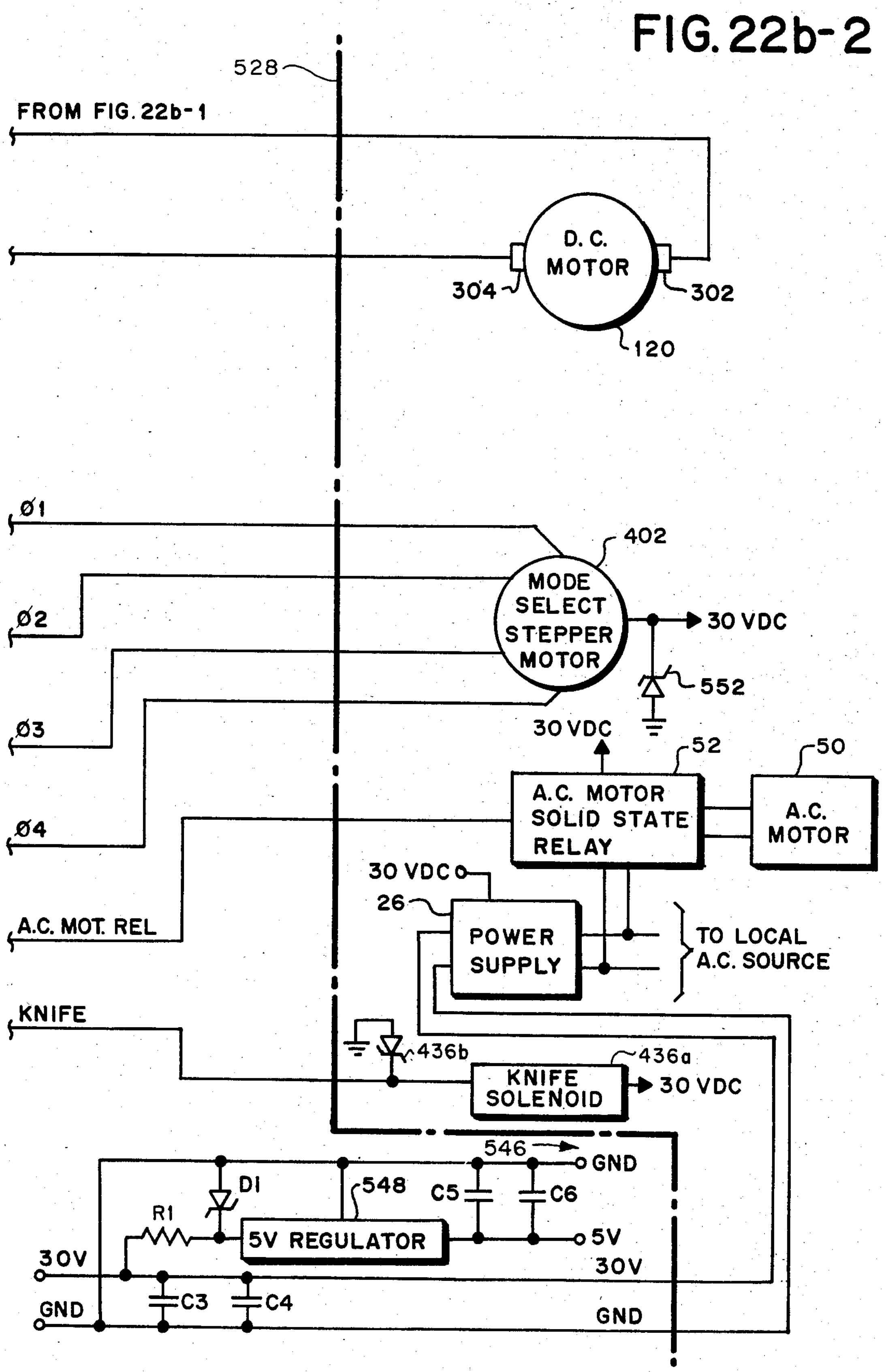

In general, as shown in FIG. 21, at the commencement of each sampling time period of T=1 millisecond, during the sampling instant $T_n$, a sample is taken of the count representative of the actual angular displacement of the motor drive shaft and, substantially immediately thereafter, the actual count is summed with the count representative of the desired angular displacement of the motor drive shaft which was calculated during the next preceeding time period T in order to obtain the then current error value $E(T_n)$ for calculating the then current compensation algorithm output value $G(T_n)$. Due to the recursive mathematical expression for $G(T_n)$

[FIG. 19] being a function of the then current error value $E(T_n)$, the next previous error value $E(T_{n-1})$ and the next previous compensation algorithm output value $G(T_{n-1})$, the expression for $G(T_n)$ is preferably separated into two components for calculation purposes, i.e., $G(T_n)=g_1+g_2$; wherein $g_1=K_1\times E(T_n)$, and wherein $g_2=-[K_2\times E(T_{n-1})+K_3\times G(T_{n-1})]$, to permit calculation of the value of $g_2$ in advance of the time period T when it is to be added to the value of $g_1$ for calculating the value of $G(T_n)$, thereby reducing to a negligible value (in view of the time period T) the time delay $T_{dy}$ before completion of sampling the actual displacement of the motor drive shaft at the instant $T_n$ and applying the PWM motor control signal to the output ports of the microprocessor. For example, when calculating the value of $G(T_n)$ based upon the first error value resulting from the summation of the counts representing the desired and actual angular displacements of the motor drive shaft, the value of $g_2$ is by definition equal to zero since the error signal $E(T_{n-1})$ is equal to zero, due to the desired and actual angular displacement values during the next previous sampling time period T having been equal to each other. Accordingly, upon obtaining the value of the first error signal $E_1(T_n)$, the value of $G_1(T_n)$ may be calculated as being equivalent to $g_1$, i.e., $G_1(T_n)=g_1=K_1\times E_1(T_n)$. And, upon calculating $G_1(T_n)$ the value of $g_2$ for use in calculating the next successive compensation algorithm output value $G(T_{n+1})$ may be calculated for subsequent use, since $g_2(T_{n+1})=-[K_2\times E_1(T_n)+K_3\times G_1(T_n)]$, and $K_2$, $K_3$, $E_1(T_n)$ and $G_1(T_n)$ are all known values. In addition, during any given time period T, a calculation may be made of the desired angular displacement of the motor drive shaft for the next subsequent time period T. Preferably, the microprocessor is programmed for implementation of the aforesaid calculation process to facilitate early utilization of the compensation algorithm output value $G(T_n)$ for driving the D.C. motor. Accordingly, the microprocessor is preferably programmed for: during the first sampling time period $T_1$, sampling the count representative of the actual angular displacement of the motor drive shaft at the time instant $T_n$, then taking the summation of that count and the previously calculated value of the desired angular displacement of the motor drive shaft to obtain the first error value $E_1(T_n)$, then calculating the first compensation algorithm output value $G_1(T_n)=K_1\times E_1(T_n)+g_2$, wherein $g_2=0$, and generating a PWM motor control signal representative of $G_1(T_n)$, then calculating the value of $g_2$ for the next sampling time period, i.e., $g_2=-[K_2\times E_1(T_n)+K_3\times G_1(T_n)]$, and then calculating the count representing the desired angular displacement of the motor drive shaft for use during the next sampling time period $T_2$; during the second sampling time period $T_2$, sampling the count representative of the actual angular displacement of the motor drive shaft and taking the summation of that count and the previously calculated desired count to obtain the error value $E_2(T_{n+1})$, calculating the compensation algorithm output value $G_2(T_{n+1})=K_1\times E_2(T_{n+1})+g_2=K_1\times E_2(T_{n+1})-K_2\times E_1(T_n)-K_3\times G_1(T_n)$, and generating a PWM motor control signal representative thereof, then calculating the value of $g_2$ for the next sampling time period $T_3$, i.e., $g_2-[K_2\times E_2(T_{n+1})+K_3\times G_2(T_{n+1})]$, and then calculating the count representative of the desired angular displacement of the motor drive shaft for use during the time period $T_3$; and so on, during each successive sampling time period.

Accordingly, as shown in FIG. 21, the microprocessor is programmed for immediately after calculating the then current compensation algorithm output value $G(T_n)$, and thus while the calculation of the value of $g_2$ for the next sampling time period is in progress, generating a motor control signal for energizing the power amplifier. For this purpose, the relative voltage levels of motor control signal are determined by the sign, i.e., plus or minus, of the compensation algorithm output value $G(T_n)$, and the duty cycle of the control signal is determined by the absolute value of the compensation algorithm output value $G(T_n)$. Preferably, for timing the duration of the motor control signal, the other timer and event counter 512, i.e., the timer 512 which was not used as a sampling time period clock source, is utilized for timing the duration of the duty cycle of the motor control signal. For example, by loading the absolute value of the $G(T_n)$ into the other timer 512, commencing the count, and timely invoking an interrupt for terminating the duty cycle of the control signal. As shown in FIG. 21(*c*), the time delay $T_{dy}$ from commencement of the time period T to updating the PWM motor control signal at the output ports of the microprocessor is substantially 55 microseconds, and the time interval allocated for calculating the value of $g_2$ and the count representative of the desired angular displacement of the motor drive shaft for use during the next time period is substantially 352 microseconds. As a result, substantially 593 microseconds of microprocessor calculation time is available during any given sampling time period T=1 millisecond for implementing non-motor control applications.

As shown in FIG. 22 the computer 500 is preferably modularly constructed for segregating the components of the logic circuit 501*a* and analog circuit 501*b* of the computer 500 from each other. To that end, the respective circuits 501*a* and 501*b* may be mounted on separate printed circuit boards which are electrically isolated from each other and adapted to be interconnected by means of connectors located along the respective dot-dash lines 516, 527 and 528. In any event, the components of the logic circuit 521*a* and analog circuit 521*b* are preferably electrically isolated from each other. To that end, the logic circuit 501*a* preferably includes 5V and ground leads from the mailing machine's power supply for providing the logic circuit 501*a* with a local 5 volt source 530 having 5V and GND leads shunted by filter capacitors C1 and C2. And the analog circuit 501*b* includes 30 volt and ground return leads from the mailing machine's power supply for providing the analog circuit 501*b* with a local 30 volt source 536 including 30V and GND leads shunted by filter capacitors C3 and C4. In addition, the analog circuit 501*b* includes a conventional 30 volt detection circuit 542 having its input conventionally connected to the analog circuit's 30 volt source 536, and its output coupled to a power up/down lead from the analog circuit via a conventional optical-electrical isolator circuit 544. Further, to provide the analog circuit 501*b* with a local 5 volt source 546, the analog circuit 501*b* is equipt with a conventional regulated power supply having its input appropriately connected to the analog circuit's 30 volt source 536 via a series connected resistor R1 and a 5 volt, voltage regulator 548. A zener diode D1, having its cathode shunted to ground and having its anode connected to the input of the 5V regulator 548 and also connected via the resistor R1 to the 30 volt terminal line, is provided for maintaining the input to the 5V regulator 548 at substantially a 5 volt level. In addition, a pair of capacitors C5 and C6 are provided across the output of the regulator 548 for filtration purposes.

To accommodate interfacing the postage meter's computer 41 (FIG. 1) with the computer 500, any two available ports of the computer 41 may be programmed for two-way serial communications purposes and conventionally coupled to the computer 500. For example, the postage meter's printing module 41c may be conventionally modified to include an additional two-way serial communications channel for communication with the computer 500. Assuming the latter arrangement, serial input communications to the computer 500 (FIG. 22) are received from the postage meter computer's printing module 41c via the serial input lead to the logic circuit 501a (FIG. 22), which is operably coupled to port $P3_0$ of the microprocessor 502 by means of a conventional inverting buffer circuit 550. Accordingly, port $P3_0$ is preferably programmed for serial input communications, and the input to the buffer circuit 550 is resistively coupled to the logic circuit's 5 volt source 530 via a conventional pull-up resistor R2. Serial output communications from the microprocessor 502 are transmitted from port $P3_1$. Accordingly, port $P3_1$ is preferably programmed for serial output communications, and is operably coupled to the input of a conventional inverting buffer 552, the output of which is resistively coupled to the logic circuit's 5V source 530 via a suitable pull-up resistor R2 and is additionally electrically connected to the serial output lead from the logic circuit 501a.

Since it is preferable that the microprocessor 502 be reset in response to energization of the logic circuit 501a, the logic circuit's 5V source 530 is connected in series with an R-C delay circuit and a conventional inverting buffer circuit 554 to the reset pin, RST, of the microprocessor 502. The R-C circuit includes a suitable resistor R3 which is connected in series with the logic circuit's local 5V source 530 and a suitable capacitor C7 which has one end connected between the resistor R3 and the input to the buffer circuit 554, and the other end connected to the logic circuit's ground return.

In addition to the VCC and (i.e., VSS) terminals of the microprocessor 502 being respectively conventionally connected to the logic circuit's 5 volt source and ground, since the microprocessor 502 does not utilize an external program memory, the $\overline{EA}$ terminal is connected to the logic circuit's 5V source. And, since no other external memory is used, the program storage enable and address latch enable terminals, PSEN and ALE are not used. In addition to the $\overline{EA}$ terminal being available for future expansion, ports $P2_2$–$P2_7$, the read and write terminals, $\overline{RD}$ and $\overline{WR}$, and one of the interupt terminals INTO/$P3_2$ are also available for future expansion.

In general, the microprocessor 502 is programmed for receiving input data from the postage meter drum's home position encoder 82 each of the envelope sensors 56, 58, the mode selection stepper motor's output shaft encoder 452 and the D.C. motor shaft encoder 126, and, in response to a conventional communication from the postage meter's printing module 41c, timely energizing the mode selection stepper motor 402 the D.C. motor and knife solenoid under control of the microprocessor 502. Port P0 is programmed for receiving a signal representative of the disposition of the postage meter's drum 38 at its home position; transition signals from the envelope sensors 56 and 58 which represent detection of the leading edge of a mailpiece or other sheet 16 being fed to the drum 38 to permit calculation by the computer 500 of the velocity of the mailpiece and desired angular displacement of the D.C. motor shaft 122 and thus the drum 38; transition signals representative of the disposition of the D.C. motor drive gear 124; and a count representative of the actual angular displacement of the D.C. motor shaft 122. Preferably, port P0 is multiplexed to alternately receive inputs from groups of the various sensors, under the control of an output signal from Port $P3_4$ of the microprocessor 502. The stepper motor shaft encoder 452, which is utilized for sensing the home position of the output shaft 402 of the mode selection stepper motor 402, and thus the home position of the D.C. motor drive gear 124, and also for sensin9 the relative position of the drive gear 124 with respect to the various power transfer gears 90, 430, 432 and 434, is coupled to the computer 500 via the respective mode select leads A and B of the logic circuit, which, in turn, are each connected to one input of another differential amplifier 562, the output of which is connected to the other input of the differential amplifier 562 via a feedback resistor R4. Correspondingly, the shaft encoder 82, which is utilized for sensing the home position of the postage meter drum 38, is coupled to the computer 500 via the drum home position lead. The aforesaid other input to each of the amplifiers 562 are each resistively coupled, by means of a resistor R5, to the mid-point of a voltage divider circuit including resistors R6 and R7. Resistors R6 and R7 are connected in series with each other and across the logic circuit's 5V source and ground return leads. The LED sensors 56 and 58, which are utilized for successively sensing the leading edges of each envelope being fed by the letter transport, are separately coupled to the computer 500 via the envelope sensor-1 and envelope sensor-2 input leads of the logic circuit 501a. In the logic circuit 501a, the envelope sensor-1 and sensor-2 leads are connected on a one-for-one basis to one of the inputs of a pair of conventional amplifiers 564, the other inputs of which are connected together and to the mid-point of a voltage divider including resistors R8 and R9. Resistors R8 and R9 are connected in series with each other and across the logic circuit's 5V source and ground return leads. Further, the five output signals from the three differential amplifiers 562 and the two amplifiers 564 are connected on a one-for-one basis to the five input ports $P0_{0-4}$ of the microprocessor 502, each via a conventional tristate buffer circuit 566, one of which is shown. The input signals A and B from the D.C. motor shaft encoder 126 are coupled to the logic circuit 501a by means of leads A and B, which are conventionally electrically connected to the counting circuit 270 to provide the microprocessor 502 the the count representative of the actual angular displacement of the motor shaft 122 from its home position. The counting circuit's leads Q0–Q7 are electrically connected on a one-for-one basis to Ports $P0_0$–$P0_7$ of the microprocessor 502 via one of eight conventional tri-state buffer circuits 568, one of which is shown, having their respective control input leads connected to each other and to the output of a conventional inverting buffer circuit 570, which has its input conventionally connected port $P3_4$ of the microprocessor 502. Thus, either the five input signals, i.e., two from the shaft encoder of the mode selection stepper motor, one from the drum home position sensor and two from the envelope position sensors, are operably electrically coupled to ports $P0_0$–$P0_4$ of the microprocessor 502, or the eight input signals Q0–Q7 from the counter circuit 270 are operably electrically coupled to ports $P0_0$–$P0_7$ of the microprocessor 502, for scanning purposes, in response to an appropriate control signal being applied to the respective buffer circuits 566 and 568 from port $P3_4$ of the microprocessor 502. In operation, assuming a low logic level signal is required for activating either of the sets of buffers 566 or 568; when the microprocessor 502 applies such a signal to port $P3_4$, the buffer circuits 566 operate, whereas since the buffer circuit 570 inverts this signal to a high logic level signal before applying the same to the buffer circuit 568, the latter is inoperative. Conversely, a high logic level signal from port $P3_4$ will operate buffer circuits 568 and not operate the buffer circuits 566. Accordingly, depending upon the level, high or low, of the signal from port $P3_4$ of the microprocessor 502, the eight bit input to one or the other buffer circuits 566 or 568 will be made available to port PO for scanning purposes. Aside from the foregoing, to permit the microprocessor 502 to clear the counter 270 for any reason in the course of execution of the program, port $P3_5$ is connected to the clear pin CLR of the counter 270 via a conventional inverting buffer 572, and the microprocessor 502 is programmed for timely applying the appropriate signal to port $P3_5$ which, when inverted, causes the counting circuit 270 to be cleared.

Figure 7:
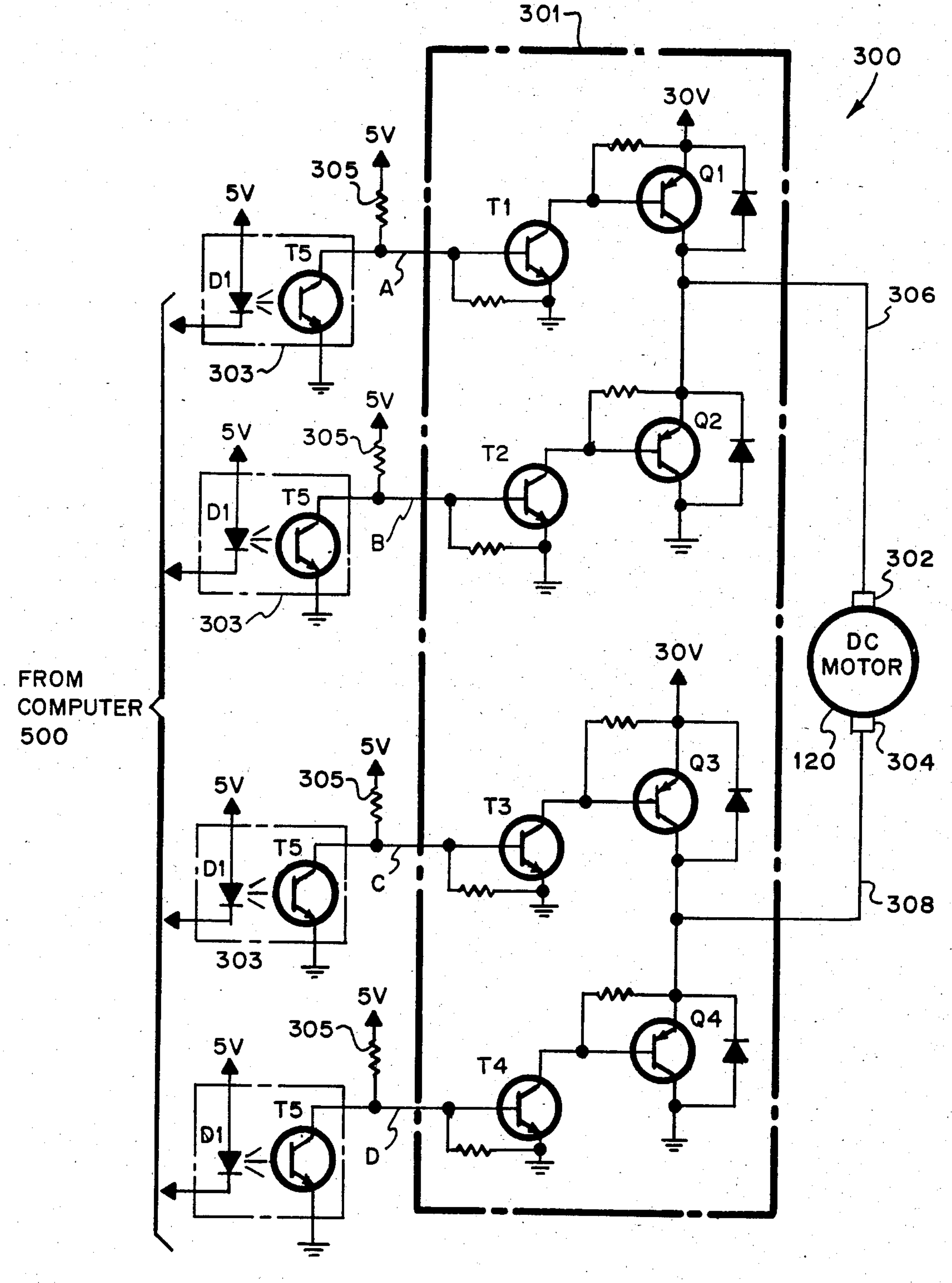
FIG. 7 shows a power amplifier circuit for coupling the computer to the D.C. motor.
Figures 8, 9:
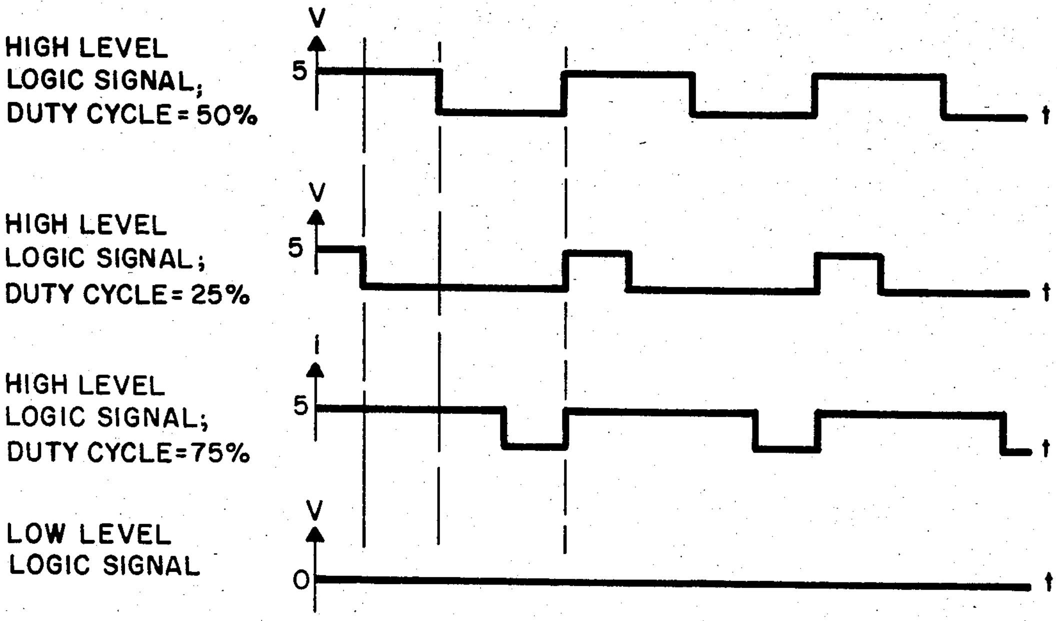
FIG. 8 is a truth table showing the status of the transistors in the power amplifying circuit for clockwise and counter-clockwise rotation of the D.C. motor.
FIG. 9 shows the relationship between the encoder output signals for various D.C. motor duty cycles.

In general, ports $P1_0$–$P1_3$ are utilized by the microprocessor 502 for providing pulse width modulated (PWM) motor control signals for controlling energization of the D.C. motor 120, ports $P1_4$–$P1_7$ are utilized for providing stepper motor control signals for controlling energization of the mode selection stepper motor 402, port $P2_0$ is utilized for controlling energization of the solid state, A.C. motor, relay 52 and thus operation of the mailpiece conveyor 49, and port $P2_1$ is utilized for timely operating the knife solenoid 436*a*. To that end, ports $P1_0$–$P1_7$ and port $P2_0$ of the microprocessor 502 are each conventionally electrically connected on a one-for-one basis to the input of a conventional inverting buffer circuit 580, one of which is shown. The outputs of each of the buffer circuits 580 are connected on a one-for-one basis, via a conventional resistor R10, to output leads from the logic circuit 501*b*, one of which is designated solid state, A.C. motor, relay, four of which are designated ϕ1, ϕ2, ϕ3 and ϕ4 to correspond to the four phases of the stepper motor 402, and four of which are respectively designated T1, T3, T2 and T4, since, as shown in FIG. 7, the four preamplifier stages of the power amplifier utilized for driving the D.C. motor 120 include the transistors T1–T4. Thus, one nibble of the signal from port P1 is utilized for controlling energization of the D.C. motor, the other nibble from port P1 controls energization of the mode selector stepper motor 402, a one bit signal from port $P2_0$ controls energization of the solid state, A.C. motor, relay 52 and thus the A.C. motor 50, and a one bit signal from port $P2_1$ controls operation of the knife solenoid 436*a*. In the analog circuit 501*b*, each of the leads T1, T2, T3, T4, ϕ1, ϕ2, ϕ3, ϕ4, relay and solenoid leads from the logic circuit 501*a*, is electrically connected on a one-for-one basis to the anode of the light emitting diode D1 of ten, conventional, photo-transistor type, optical-electrical isolator circuits 303. Since the cathodes of the light emitting diodes D1 of the opto-isolator circuits 303 are connected to each other and to the 5 volt lead from the analog circuit 501*b* which extends to the 5 volt source of the logic circuit 501*a*, the motor control signals are isolated from the power system of the analog circuit 501*b* to avoid having spurious noise signals in the analog circuit 501*b* and its components interfere with the control signals generated by the microprocessor 502. The analog circuit 501*b* also includes a lead, designated power up/down, which extends from the analog circuit 501*b* to the logic circuit 501*a* and is connected to the microprocessor's interrupt INTI, port $P3_3$, to provide the microprocessor 502 with an appropriate input signal when the power is turned on, off or fails. In the analog circuit 501*b*, the power up/down lead from the logic circuit 501*a* is coupled to the thirty volt detect circuit 542 by means of a conventional opto-isolator 544, the power up/down lead being electrically connected to ground through collector-emitter circuit of the opto-isolator's phototransistor when the light emitting diode D1 is lit in response to the D.C. supply voltage level matching the internal reference voltage level, e.g., 30 volts, of the 30 volt detection circuit.

In the analog circuit 501*b* each of the four outputs from the photo-transistors of each of the opto-isolators 303 associated with the D.C. motor control leads T1, T2, T3 and T4 are resistively coupled to the analog circuits 5V source by means of a conventional pull-up resistor 305, and the emitters of the photo-transistors T5 are connected to the analog circuit's ground system. In addition, the collectors of the photodiodes of the opto-isolators 303, which are utilized for transmitting the D.C. motor control signals from ports $P1_0$–$P1_3$ of the microprocessor 502 are connected on a one-for-one basis to the appropriate input leads A, B, C and D of the power amplifiers shown in FIG. 7, the outputs of which are connected to the D.C. motor 120. Further, each of the four onputs from the photo-transistor of each of the opto-isolators 303 associated with the stepper motor control leads ϕ1, ϕ2, ϕ3, and ϕ4 are respectively connected to the input lead a conventional darlington-type power amplifier 550, the resepctive outputs of which are connected on a one-for-one basis via the appropriate phase, i.e., ϕ1, ϕ2, ϕ3, or ϕ4 of the mode selector stepper motor 402 to the mailing machine's 30 volt D.C. source, which is preferably conventionally shunted to ground by means of an appropriately poled zener diode 552 to provide a sink for excess current from the stepper motor phase coils. In addition, the respective collectors of the photodiodes of the opto-isolators 303 utilized for transmitting the signals from ports $P2_0$ and $P2_1$ for controlling the relay 52 and solenoid 436*a* are each connected to the input lead of other conventional darlington-type power amplifiers 550, the outputs of which are each conventionally connected to the mailing machine's 30 volt D.C. source via the relay 52 or solenoid 436*a*. In addition, a zener diode 436*b* is provided for dissipating the reverse current of the solenoid 436*a*.

Figure 23A:
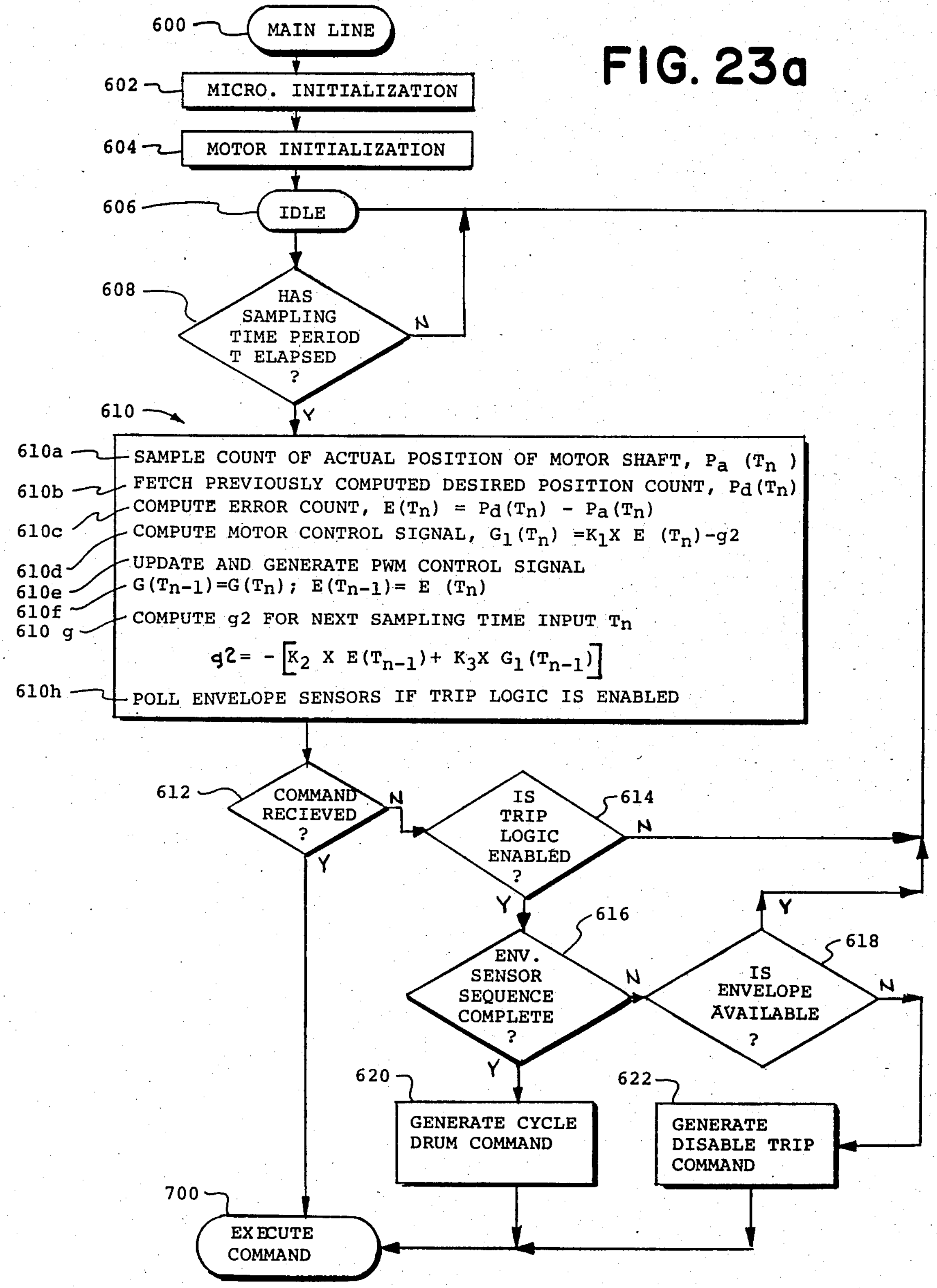
FIG. 23 (including FIGS. 23*a*, 23*b*-1, 23*b*-2, 23*c*, 23*d* and 23*e*) shows the flow charts portraying the processing steps of the computer.
Figures 1, 23B:
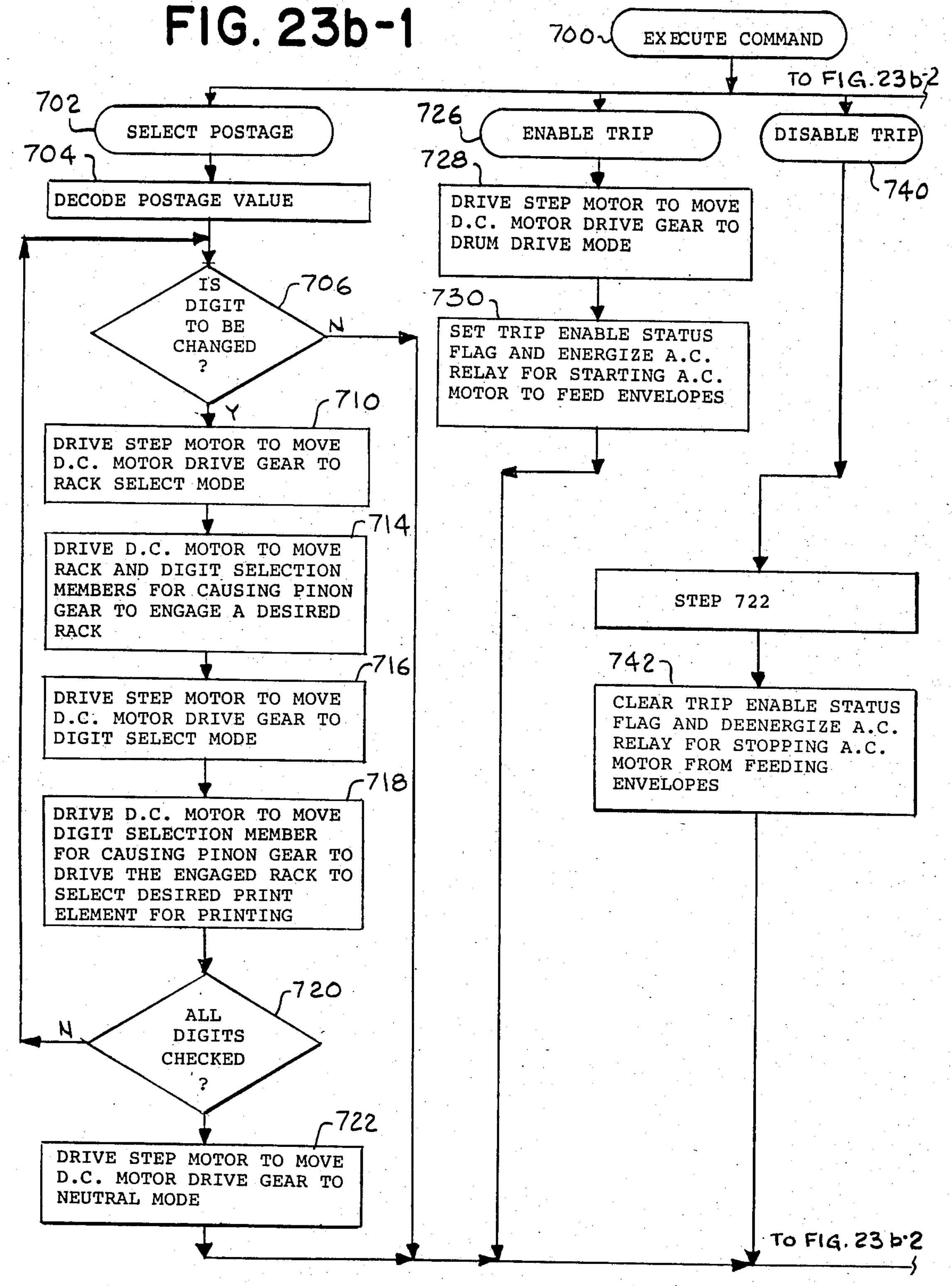
Figures 2, 23B:
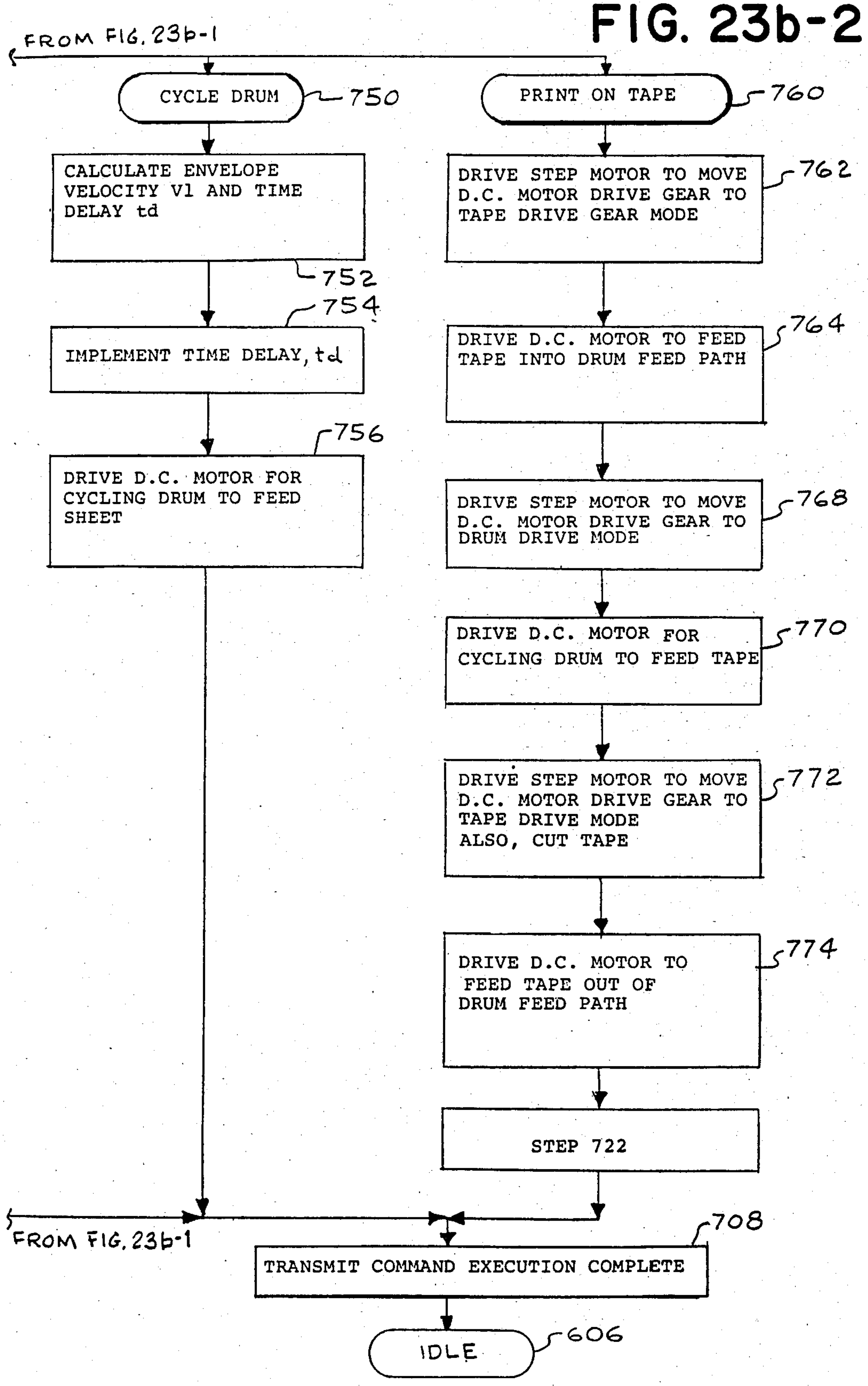
Figure 23C:
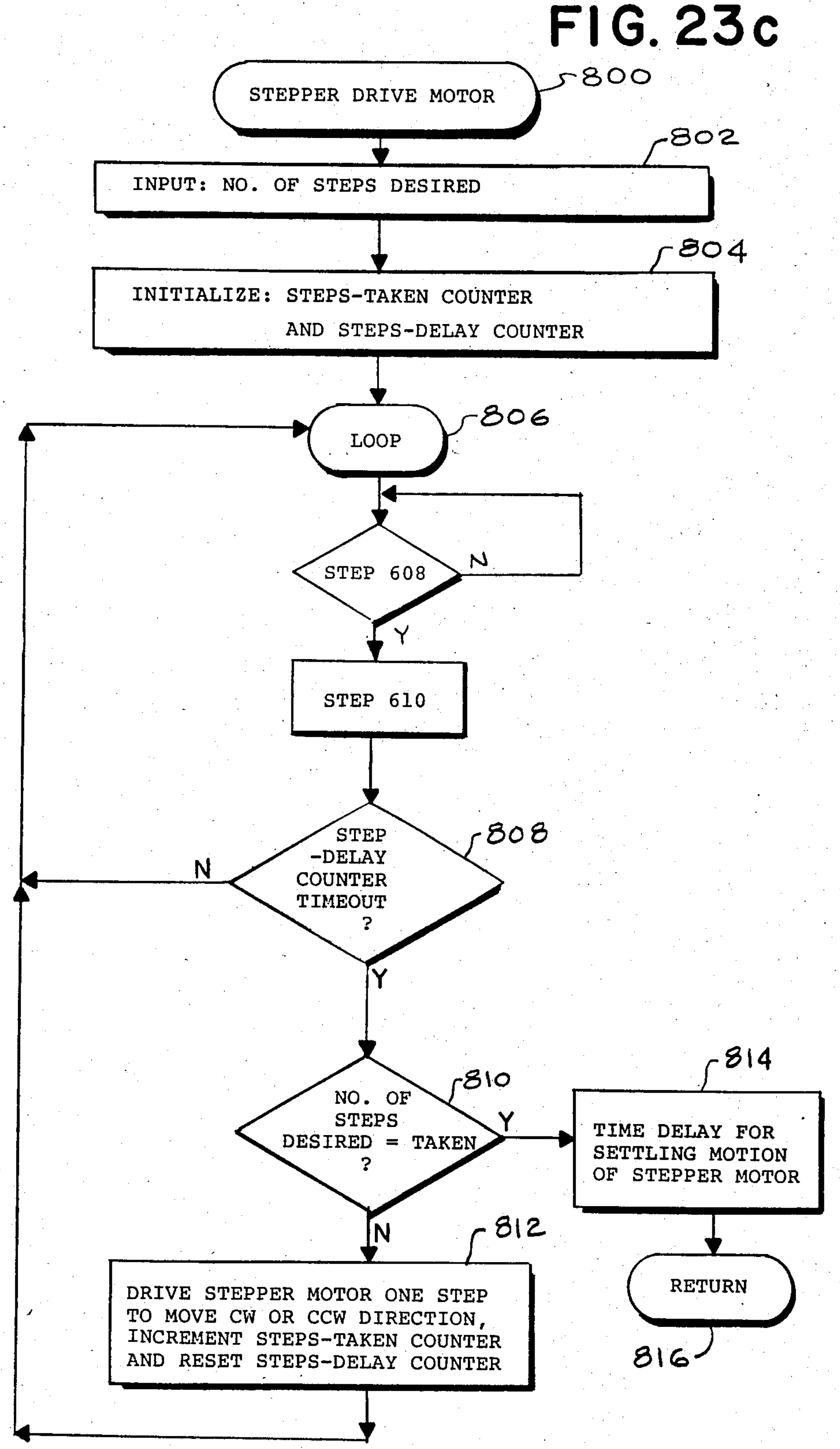
Figure 23D:
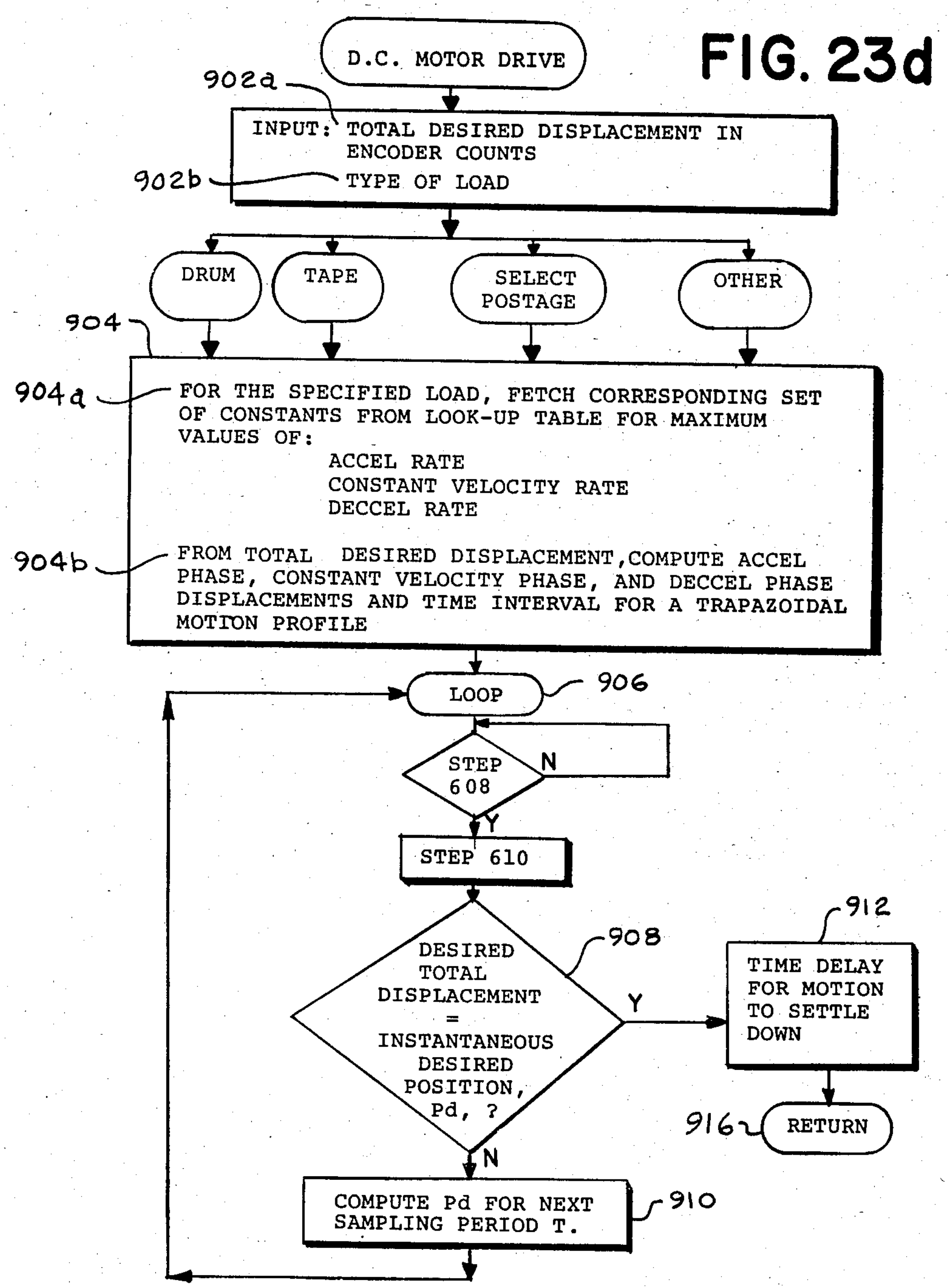
Figure 23E:
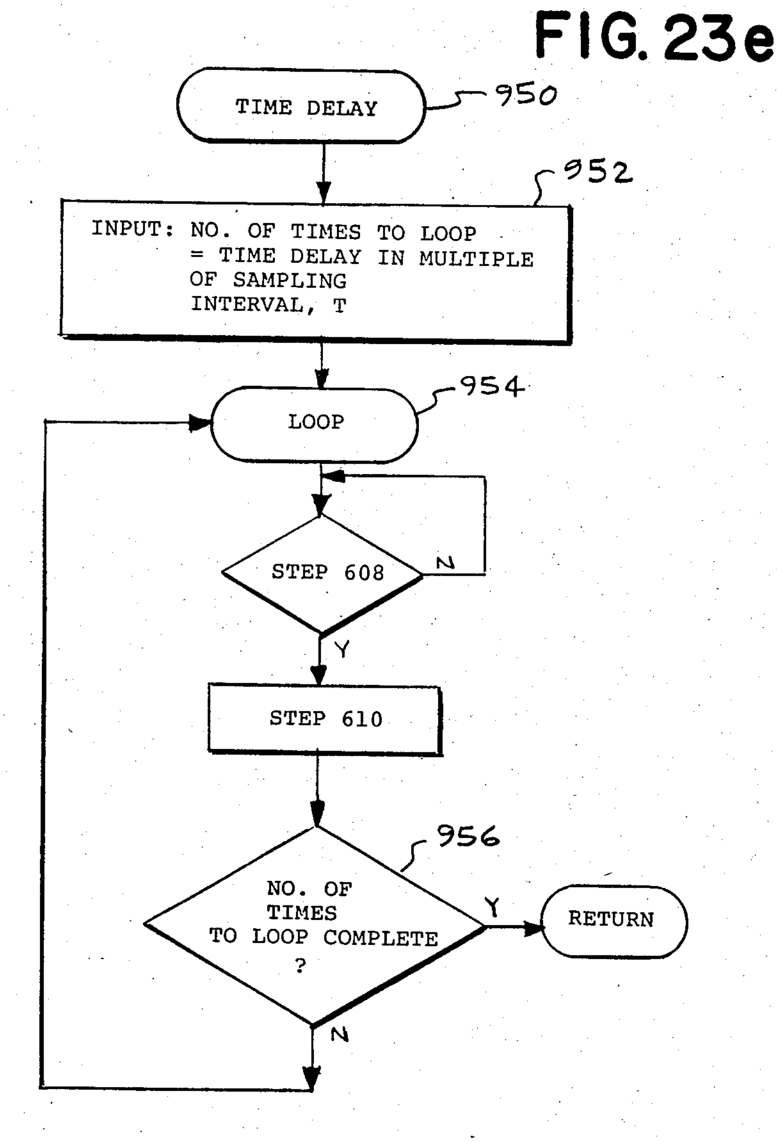

In general, the computer 500 includes five software programs, including a main line program, FIG. 23*a*, a command execution program, FIG. 23*b*, a stepper motor drive subroutine, FIG. 23*c*, a d.c. motor drive subroutine, FIG. 23*d*, and a time delay subroutine, FIG. 23*e*. When the mailing machine 10 is energized by actuation of the main power switch 24, the resulting low level logic signal from D.C. supply is applied to the reset terminal RST of the computer's microprocessor 502, thereby enabling the microprocessor 502. Whereupon, as shown in FIG. 23*a*, the microprocessor 502 commences execution of the main line program 600.

The main line program 600 (FIG. 23a) commences with the step of conventionally initializing the microprocessor 602, which generally includes establishing the initial voltage levels at the microprocessor's ports, and interrupts, and setting the timers and counters. Thereafter, the mode selector stepper motor and D.C. motor drive unit are initialized 604. Step 604 entails scanning the microprocessor's input port $P0_0$, to determine whether or not the mode selector stepper motor and D. C. motor shafts, 122 and 404 are located in their respective home positions and, if not, driving the same to their respective home positions. Assuming the motor shafts 122 and 404 are so located, either before or after the initialization step 604, the program then enters an idle loop routine 606.

In the idle loop routine 606, a determination is initially made as to whether or not the sampling time period of T=1 millisecond has elapsed, step 608, it being noted that each successive sample is taken at the time instant $T_n$ immediately after and in response to the fourth 250 millisecond interrupt generated by the timer utilized for implementing the sampling time period T. Assuming the time period T has not elapsed, the program loops to idle 606. On the other hand, assuming the time period T has elapsed, the microprocessor 502 updates the servo-control system, step 610. For the purpose of explaining step 610 it will be assumed that the desired location of the motor drive shaft 122 is the home position. Step 610 includes the successive steps 610a and 610b, respectively, of sampling the count of the actual position Pa of the motor drive shaft 122 at the sampling time instant $T_n$, and fetching the previously computed count representing the desired position Pd of the shaft 122 at the same sampling time instant $T_n$. If for any reason the motor drive shaft 122 is not located in its home position when the value of the desired position count $Pd(T_n)$ is representative of the home position location, then the values of $Pa(T_n)$ and $Pd(T_n)$ will be different. On the other hand, if the motor drive shaft 122 is located in its home position when the desired position count $Pd(T_n)$ is representative of the home position location, then the values of $Pa(T_n)$ and $Pd(T_n)$ will be the same. Accordingly, computation of the error count, 610c, may or may not result in an error count value $E(T_n)$ of zero. Further, independently of the computed value of $E(T_n)$, the computed value $G(T_n)$ of the motor control signal, step 601d, may or may not result in a value of $G(T_n)$ of zero; it being noted that although step 610c results in a computed value of $E(T_n)=0$, the value of g2 may not be eqtal to zero due to the computed value of the error for the next previous sampling time instant $E(T_{n-1})$ having resulted in a non-zero value, step 610g. Assuming steps 610c and 610d both result in zero value computations, then, upon updating and generating the PWM motor control signal, step 610e, no motor control signal will be generated. Under any other circumstances, step 610e will result in generating a PWM motor control signal for driving the D.C. motor 120, and thus the drum 38, to its home position. Thereafter, as shown in step 610f, the computed values of $E(T_n)$ and $G(T_n)$ are utilized as the values of $E(T_{n-1})$ and $G(T_{n-1})$ respectively for pre-calculating the value of g2 for the next subsequent time instant $T_n$.

Thereafter, as shown in step 610h, the envelope sensors 56 and 58 are polled if the trip logic is enabled, i.e., if an envelope 16 is to be fed to the drum 38. However for the purpose of this discussion it will be assumed that an envelope is not being fed, as a result of which the trip logic is not enabled and, therefore, the envelope sensors 56 and 58 are not polled, step 610h. As shown by the next, step 612, a determination is then made as to whether or not a command has been received. Assuming a command has not been received, step 612, since trip logic is not enabled, processing returns to idle 606. Thus, until a command is received from the postage meter's computer 41, the main line program will continuously loop through steps 608, 610, 612 and 614 and drive the motor drive shaft 122 to its home position, against any force tending to move the shaft 122 out of the home position.

At this juncture, it will be assumed that a command is received, as a result of which the inquiry of step 612 (FIG. 23a) is answered affirmatively, and the execute command routine 700 (FIG. 23b) is invoked.

Assuming the command to be executed is to select postage, the select postage routine 702 (FIG. 23b) is invoked. Processing thus commences with the step, 704, of decoding the postage value, followed by an inquiry as to whether or not a digit is to be changed, step 706, in order to print the selected postage value. Assuming none if the print wheels 464 (FIG. 1 and FIG. 23b) are to be rotated in order to locate a different print element 465 at the periphery of the psotage meter's drum 38, then the inquiry of step 706 is answered negatively, and an appropriate message is transmitted to the postage meters computer 41 to indicate completion of execution of the command, step 708 before the select postage routine 702 loops to idle 606 (FIG. 23a). On the other hand, if any print element 465 of any print wheel 464 is to be changed in order to print the selected postage value, the inquiry of step 706 is affirmatively answered. Whereupon the mode selector stepper motor 402 is energized under the control of the computer 500 to move the D.C. motor's drive gear 124 to the rack select mode of operation, step 710, wherein the gear 124 is disposed in meshing engagement with both of the transfer gears 430 and 432. Step 710 generally includes the step of calling up and executing the steps of the stepper motor drive subroutine 800 (FIG. 23c).

The stepper motor drive subroutine 800 (FIG. 23c), which is called up by the execute command routine 700 whenever the stepper motor 402 is to be driven, includes the initial step, 802, of fetching a count corresponding to the number of steps through which the stepper motor 402 is to be driven in order to move the d.c. motor's drive gear 124 from its then current position to the desired drive position for command execution purposes which, in the case of execution of the select postage command calls for initially positioning the drive gear 124 in the rack select mode and thus in engagement with the transfer gears 430 and 432. Thereafter processing proceeds to the step, 804, of initializing a steps-taken counter, for counting the number of steps through which the stepper motor 402 is driven, and of initializing a step-delay counter, which acts as a clock for providing a fixed time delay, i.e., a multiple of the sampling time period T, between each step through which the stepper motor 402 is driven, in view of the performance specifications of the stepper motor being utilized. Thereafter, the microprocessor 502 executes the steps of the loop 806, including the initial steps of waiting for the next elapse of a sampling time period T, step 608 as previously discussed, updating the d.c. motor servo control drive system, step 610 and then inquiring as to whether or not the step-delay counter has timed out, step 808. Assuming the step-delay counter has not timed out, processing of steps 608, 610 and 808 of the loop 806 is continuous until the step-delay counter times out, step 808. Whereupon the microprocessor 502 implements the step, 810, of inquiring whether or not the number of steps through which the stepper motor 402 has been driven is equal to the desired number of steps. Assuming that the number of steps taken is not equal to the desired number of steps, then, the microprocessor 502 updates the stepper motor drive, step 812, which includes the steps of driving the stepper motor 402 through one step, either clockwise or counter-clockwise depending on the then current position of the d.c. motor drive gear 124 relative to the position to which it is to be driven, incrementing the steps-taken counter by one count and resetting the step-delay counter. Thereafter, processing continuously loops through steps 608, 610, 808, 810 and 812 as hereinbefore discussed until the inquiry of step 810 is affirmatively answered. Whereupon a time-delay is implemented, step 814, to allow for settling the motion of the stepper motor 402 before the subroutine 800 is exited, step 816, by returning processing to the execute command step which originally called up the stepper motor drive subroutine 800, for example, step 710 (FIG. 23*b*).

After stepping the d.c. motor drive gear 124 to the rack select mode, step 710 (FIG. 23*b*) the d.c. motor is driven, step 714, to drive the transfer gears 430 and 432 (FIG. 1) for rotating the rack and digit selection members 472 and 478 to carry the pinion gear 476 into engagement with the desired rack 460. Step 714 (FIG. 23*b*) generally includes the step of calling up and executing the steps of the d.c. motor drive subroutine 900 (FIG. 23*d*).

The d.c. motor drive subroutine 900 (FIG. 23*d*), which is called up by the execute command routine 700 whenever the d.c. motor 120 is driven, includes the initial step 902 of fetching an amount, corresponding to the total number of counts the encoder 126 will count during the total desired displacement of a given portion of a load, e.g., the pinion gear 476, members 472 and 478, gears 484 and 486, or the encoded shafts 484*a* and 486*a*. Thus, step 902 includes the steps of identifying the type of load, stop 902*b*, which is being driven, i.e., the drum, tape feed, postage selection, or other load, and fetching the amount representing the desired number of encoder counts which are to be counted during displacement of the load portion. Thereafter the microprocessor 502 processes step 904 for the particular load. Step 904 includes the step 904*a*, of fetching the group or set of acceleration, deceleration and constant velocity constants from a look-up table, for the particular load being driven. Preferably the constants for each of the loads are specified with a view to maximizing the acceleration, deceleration and constant velocity of the d.c. motor for driving the particular load; the respective acceleration and deceleration constants being amounts which are representative of a number of counts per square sampling time period T, and the constant velocity constant being an amount which is representative of a number of counts per sampling time period T. In addition, step 904 includes the step 904*b* of utilizing the total desired displacement, and the acceleration, deceleration and constant velocity constants for computing the total displacement and time duration of the respective acceleration, deceleration and constant velocity phases for driving the particular load in accordance with a desired trapezoidal-shaped velocity versus time profile. Thereafter, processing proceeds to execution of the steps of the loop 906, including the initial steps of waiting for the next elapse of a sampling time period T, step 608 as previously discussed, then updating the d.c. motor drive servo control system, step 610 as previously discussed but excluding the assumption that the d.c. motor drive shaft 122 is to be located in its home position, then inquiring, step 908, as to whether or not the total displacement of the particular load is equal to the instantaneous desired position Pd. Assuming the inquiry of step 908 is negative, processing proceeds to the step, 910, of computing the desired position Pd for the next sampling time period T and thereafter continuously looping through steps 608, 610, 908 and 910 as hereinbefore discussed until the total desired displacement is equal to the instantaneous desired position, step 908. Whereupon processing is diverted to the step, 912, of implementing an appropriate time delay to allow for settling the motion of the d.c. motor 120 before the subroutine 900 is exited, step 916, by returning processing to the execute command step which originally called up the d.c. motor drive subroutine 900, for example, step 714 (FIG. 23*b*).

After executing step 714 (FIGS. 1 and 23*b*), of driving the pinion gear 476 into engagement with a selected rack 460, the select postage routine 702, executes the step, 716, of driving the stepper motor 402 to move the d.c. motor drive gear 124 into the digit select mode, wherein the gear 124 is disposed in engagement with the transfer gear 430. Step 716 generally includes the step of calling up the stepper motor drive subroutine 800 (FIG. 23*c*), executing the same as hereinbefore discussed and returning to step 716. Thereafter, the select postage routine 702 (FIG. 23*b*) executes the step, 718, of driving the d.c. motor 120 to rotate the digit selection member 478 for driving the pinion gear 476 to effectuate slidably moving the selected rack 460 for selecting the print element 465 which is to be printed. Step 718 generally includes the step of calling up the d.c. motor drive subroutine 900 (FIG. 23*d*) and executing the same as hereinbefore discussed before returning to step 718. Thereafter the inquiry is made, step 720, as to whether or not all the digits have been checked. Assuming all the digits have not been checked, processing loops to step 706, and steps 706–720 are continuously processed until the assumption is invalid. Whereupon processing proceeds to the step, 722, of driving the stepper motor 402 (FIG. 1) to move the drive gear 124 to its home position, wherein it is preferably disposed in a neutral mode of operation. Step 722 generally includes the step of calling up the stepper motor drive subroutine 800 (FIG. 23*c*), and executing the same as hereinbefore discussed before returning to step 722. Whereupon, the select postage routine 702 executes the step, 708, of transmitting an appropriate command execution complete message to the postage meter's computer 41 and processing is looped to idle 606 (FIG. 23*a*).

As above discussed, an appropriate time delay is implemented by the microprocessor 502 in the course of execution of each of the steps 710, 714, 716, 718 and 722 (FIG. 23*b*) to allow for settling movement of the stepper motor 402 or d.c. motor 120, depending upon which of the motors has been driven in the course of execution of the subroutine 800 or 900 (FIGS. 23*c* and 23*d*). In the case of the subroutine 800 the time delay is implemented by step 814, whereas in the case of the subroutine 900 the time delay is implemented by step 912. Each of the steps 814 and 912 generally includes the steps of calling up and executing the time delay subroutine 950 of FIG.

23*e*. As shown in FIG. 23*e*, the time delay subroutine 950 initially executes the step 952 of fetching an amount which is multiple of the sampling time period T, corresponds to the number of times processing is to loop in the time delay subroutine 950, and is preferably a different predetermined amount for the stepper motor 402 and d.c. motor 120 due to the respective motors having different settling time periods. Having executed step 952, the time delay subroutine 950 enters a loop 954 wherein the successive steps of waiting for the next elapse of the sampling time period T, step 608 as previously discussed, and then updating the d.c. motor servo-control drive system, step 610 as previously discussed, until the predetermined number of time delay loops have been completed. Whereupon processing is returned to the execute command step, for example, steps 710, 714, 716, 718 or 722, which originally called up the subroutine 800 or 900 as the case may be.

Having executed the select postage command 702 (FIG. 23*b*) and returned to idle 606 (FIG. 23*a*), processing continues through steps 608, 610, 612 and 614 as hereinbefore discussed, until a trip enable command has been received due to the operator depressing the start key 53*a*. Assuming the trip enable command is received, step 612 will be affirmatively answered and the command will be executed by the execute command routine 700 (FIG. 23*b*). The enable trip routine 726, includes the initial step of driving the step motor 420 (FIGS. 1 and 23*b*) to move the d.c. motor gear 124 to the drum drive mode step 728, wherein drive gear 124 is disposed in engagement with the transfer gear 90, in anticipation of feeding an envelope 16. Step 728 generally includes the step of calling up and executing the stepper motor drive subroutine 800 (FIG. 23*c*) including its subsidiary time delay routine 950 (FIG. 23*e*) before the routine 800 (FIG. 23*c*) returns processing to the call up step 728 (FIG. 23*b*). Whereupon step 730 is executed. Step 730 includes the steps of setting the trip enable status flag and energizing the solid state A.C. relay 52 (FIG. 2) to start the A.C. motor 50 for feeding envelopes 16 past the sensors 56 and 58 to the drum 38. Whereupon the appropriate command execution complete message is transmitted to the postage meter's computer 41, processing returns to idle 606 (FIG. 23*a*), and, upon the next elapse of a sampling time period, step 608, in the course of execution of the step of updating the d.c. motor servo-control drive system, step 610, since the trip logic enabled status flag was set in the course of execution of the enable trip command, the envelope sensors are poled, step 610*h*. At this juncture, assuming another command is not received for execution, the inquiry of step 612 will be answered in the negative, and processing diverted to step 614 which will be affirmatively answered since trip logic is enabled. Step 614 is followed by the step of inquiring as to whether or not the envelope sensing sequence is complete, step 616, which is in effect an inquiry as to whether or not the sensors 56 and 58 have completed successively sensing the leading edge of an envelope 16 as it is being fed to the drum 38. Assuming the sensing sequence is incomplete, step 616, processing is diverted to an inquiry as to whether or not an envelope is available. Assuming an available envelope, processing loops to idle 606, and step 608, 610, 614 616 and 618 are continuously processed until the sensing sequence, step 616 is complete. Whereupon processing proceeds to the step 620, wherein the microprocessor 502 generates a cycle drum command, and then calls up the execute command routine 700. On the other hand, if an envelope is not available, step 618, processing advances to step 622, wherein the microprocessor 502 generates a disable trip command and then calls up the execute command routine 700.

Assuming an envelope is not available and a disable trip command has been generated, step 622 (FIG. 23*a*), the microprocessor 502 implements the disable trip command routine, 740 (FIG. 23*b*) which commences with step 722, as previously discussed, wherein the stepper motor is driven to move the d.c. motor drive gear to its neutral mode, and then implements the step, 742, of clearing the trip enable status flag and deenergizing the solid state A.C. relay 52 to stop the A.C. motor 50 from feeding envelopes. Whereupon an appropriate command execution complete message is transmitted to the postage meter's computer 41 and processing is returned to idle 606 (FIG. 23*a*) where idle loop processing continues, with step 614 being answered negatively due to the trip enable status flag having been cleared, until a subsequent command is received from the postage meter's computer 41 as hereinbefore discussed.

Assuming however that an envelope is available, the envelope sensing sequence is eventually completed, the cycle drum command is generated, step 620 (FIG. 23*a*) and the microprocessor 502 implements the drum cycle command routine 750. The routine 750 commences with the step, 752, of calculating the envelope velocity Vl and the time delay td, thereafter the time delay td is implemented, step 754, and the D.C. motor is driven for cycling the drum to feed the envelope. As with the other d.c. motor drive steps, step 754 includes the step of calling up the d.c. motor drive subroutine 900 and implementing the same, including implementing the time delay subroutine 950, before returning processing to the call up step 756 (FIG. 23*b*). Thereafter, an appropriate command execution complete message is transmitted to the postage meters computer 41, step 708, and processing returns to idle, step 606.

Having returned processing to idle 606 (FIG. 23*a*), steps 608, 610, 612 and 614 are again continously processed until another command is received, step 612. Whereupon the command is executed, step 700. Assuming the command to be executed is to print on tape, 760 (FIG. 23*b*), the microprocessor 502 executes the series of steps involving alternately driving the stepper motor to the appropriate mode of operation and driving the d.c. motor, which steps have been discussed in detail in connection with the other commands. Accordingly, there follows a less detailed discussion of steps in the process of implementing the print on tape command routine 760. The steps of the routine 760 include those of driving the step motor to move the d.c. motor gear to the tape drive mode, step 762, wherein the gear 124 is disposed in engagement with the transfer gear 434; then driving the d.c. motor to feed tape into the path of travel of the drum, step 764; then driving the stepper motor to move the d.c. motor drive gear to the drum drive mode 768; then cycling the drum, followed by operating the tape cutting solenoid, step 772; then driving the step motor to move the D.C. motor drive gear back to the tape drive mode; then driving the d.c. motor to feed the tape (less the cut-off portion thereof) out of the feed path of the drum; then implementing step 722, of driving the step motor to move the d c. motor drive gear to its home position, e.g., preferably a neutral mode of operation; and then transmitting to the postage meter's computer 41*a* an appropriate command execution complete message, step 708, before returning to idle 606 (FIG. 23*a*).

The term postage meter as used herein includes any device for affixing a value or other indicia on a sheet or sheet like material for governmental or private carrier parcel, envelope or package delivery, or other purposes. For example, private parcel or freight services purchase and employ postage meters for providing unit value pricing on tape for application on individual parcels.

A more detailed description of the programs hereinbefore discussed is disclosed in the appended program listing which describes in greater detail the various routines incorporated in, and used in the operation of, the postage meter.

Although the invention disclosed herein has been described with reference to a simple embodiment thereof, variations and modifications may be made therein by persons skilled in the art without departing from the spirit and scope of the invention. Accordingly, it is intended that the following claims cover the disclosed invention and such variations and modifications thereof as fall within the true spirit and scope of the invention.

© 1984 Pitney Bowes Inc.

```
<<< ASSEMBLY COMMAND STRING >>>

DMSNOVA.SRC

<<< end of assembly command string >>>

ER  LINE  ADDR  OBJECT      TYPE

     1                            $ABS
     2                            $NOGEN
     3                            $ERRORPRINT
     4                            $INCLUDE(TITLE.)

     6                            ;*****************************************************************
     7                            ;
     8                            ;             MICROPROCESSOR-CONTROLLED DCMOTOR
     9                            ;             FOR CONTROLLING THE POSTAGE METER
    10                            ;             THE DRUM AND TAPE
    11                            ;*****************************************************************

ER  LINE  ADDR  OBJECT      TYPE

    13                            $INCLUDE(DECLARE.DMS)
    14                            ;*************************************************
    15                            ;        INTERNAL 8051 RAM's DECLARATION
    16                            ;*************************************************
    17                            ;*must have directly addressable bits.
    18                            ;=========================================
    19                                        DSEG
    20                                        ORG     20H
    21    0020                    FLAGS:      DS      5      ;*Mapped for flags.
    22    0025                    SAV_SENSR:  DS      1      ;*Sensors status register.
    23    0026                    STAT_HEADER: DS     1      ;*System status communication header.
    24    0027                    MSG1_STAT:  DS      1      ;*System status (first byte.
    25    0028                    MSG2_STAT:  DS      1      ;*System status second byte.
    26    0029                    MISTRIP_CTR: DS     1      ;*Missed-trip counter (third status byte).
    27    002A                    ERR_CNT:    DS      1      ;*Error count register.
    28    002B                    K2H:        DS      1      ;*ABS(error) x COEFF2 (High) register.
    29    002C                    K2L:        DS      1      ; Low byte.
    30    002D                    CMMD_HEADER: DS     1      ;Command-complete header.
```

```
 31  002E                  CNT_OFFSET:     DS      1       ;Computed cnt offset during drv setchng.
 32  002F                  POSN_ACC:       DS      2       ;Desired position count accum (2-byte).
 33  0031                  BASE_INDEX:     DS      2       ;One cycle index accum (2-byte).
 34  0033                  METER_INDEX:    DS      2       ;Rotary selector index.
 35  0035                  RUN_SPEED:      DS      1       ;Computed velocity, counts/sample.
 36  0036                  VEL_OFFS:       DS      1       ;Velocity offset during deccel.
 37  0037                  OLD_READ:       DS      1       ;Passive motor enc cnt reading.
 38  0038                  GP_LATCH:       DS      1       ;Register for 'on-the-fly0 latching.
 41  003B                  AUX_REG:        DS      1       ;Indirectly addressed register.
 42  003C                  STEP1:          DS      1       ;Step motor #1 mask reg.
 43  003D                  STEP2:          DS      1       ;Step motor #2 mask reg.
 44  003E                  ACCEL_CNT:      DS      2       ;Acceleration distance, counts (2-byte)
 45  0040                  DECCEL_INT:     DS      1       ;Decceleration time interval
 46  0041                  CYC_CTR:        DS      1       ;Cycle repeater counter
 47  0042                  RETRY_CTR:      DS      1       ;Retry counter (must be in-line down to BOFFS).
 48  0043                  TOTAL_CNT:      DS      2       ;Desired total distance (2-byte)
 49  0045                  ACCELK:         DS      1       ;Accel constant
 50  0046                  SLEWK:          DS      1       ;Maximum speed constant.
 51  0047                  BOFFS:          DS      2       ;METER_INDEX save area.
 52  0049                  DECCELK:        DS      1       ;Deccel constant
 53  004A                  PLIM_ERR:       DS      1       ;Positive error count limit.
 54  004B                  NLIM_ERR:       DS      1       ;Negative error count limit.
 55  004C                  PORTX_LATCH:    DS      1       ;Port X software latch.

ER  LINE  ADDR  OBJECT     TYPE

     58                    ;---------------------
     59                    ;        ARRAYS
     60                    ;---------------------
     61  004D              NEWBANK:        DS      5       ;Entered postage value buffer.
     62  0052              OLDBANK:        DS      5       ;Present postage value buffer.
     63  0057              TRIP_CTR:       DS      2       ;Trip counter.
     64  0059              SAV2_AREA:      DS      2       ;Last set bank no. and dir conv.
     65  005B              DRUM_DECCEL:    DS      2
     66  005D              SAVE_INDEX:     DS      1
     67  005E              START_OF_STACK: DS      1

     69                    ;**************************************
     70                    ;        DATA RAM'S EQUATES
     71                    ;**************************************
     72                    ;REUSABLE_REGISTERS (can be changed by
     73                    ;a local task or module).
     74                    ;--------------------------------------
     75                                    CSEG
     76  003E              STEP            EQU     ACCEL_CNT       ;Stepper control loop.
     77  003F              MASK            EQU     ACCEL_CNT+1
     78  0040              AUX1            EQU     DECCEL_INT      ;Meter mode.
     79  0045              AUX2            EQU     ACCELK
     80  0049              AUX3            EQU     DECCELK
     81  0047              TEACH_CTR       EQU     BOFFS
     82  004D              NEWRACK         EQU     NEWBANK
     83  0052              OLDRACK         EQU     OLDBANK
     84  0042              AUX_ARRAY       EQU     RETRY_CTR
```

```
ER   LINE  ADDR  OBJECT        TYPE

      86                        ;************************************
      87                        ;        REGISTER BANK 0
      88                        ;************************************
      89                        ;USED BY MAIN LINE ROUTINE.
      90                        ;        R0 = general purpose; for indirect addressing modes.
      91                        ;        R1 = general purpose; for indirect addressing modes.
      92                        ;             local in Stepper Drive Loop.
      93                        ;        R2 = 1ms-interval counter.
      94                        ;        R3 = 256-ms interval counter
      95                        ;        R4 = general purpose register.
      96  0004                  R4_RB0         EQU     04
      97                        ;        R5 = accel/deccel timer high byte.
      98                        ;        R6 = 1ms-increment time delay counter.
      99                        ;        R7 = accel/deccel timer low byte.

     101                        ;******************************
     102                        ;        REGISTER BANK 1
     103                        ;******************************
     104                        ;R4 is exclusively used by Communication rtn.
     105                        ;Else, all registers are used both by comm rtn
     106                        ;and set-postage rtn.
     107                        ;--------------------------------------------
     108                                       DSEG
     109                                       ORG     08
     110  0008                  R0_RB1:        DS      1
     111  0009                  R1_RB1:        DS      1
     112  000A                  R2_RB1:        DS      1
     113  000B                  R3_RB1:        DS      1
     114  000C                  R4_RB1:        DS      1
     115  000D                  R5_RB1:        DS      1
     116                                       CSEG
     117  0004                  COMERR_CTR     EQU     R4
     118  0008                  GP1_SAVE       EQU     R0_RB1
     119  0009                  GP2_SAVE       EQU     R1_RB1

ER   LINE  ADDR  OBJECT        TYPE

     121                        ;********************************
     122                        ;        REGISTER BANK 2
     123                        ;********************************
     124                        ;        R0 = trajectory computed count.
     125                        ;        R1 = accum save location during int rtn.
     126                        ;        R2 = control algorithm partial result storage (lbyte).
     127                        ;        R3 = control algorithm partial result storage (hbyte).
     128                        ;        R4 = scratchpad
     129                        ;        R5 = scratchpad
     130                        ;        R6 = 'on-the-fly' count latch
     131                        ;        R7 = T1 timeout counter.
     132                                       DSEG
     133                                       ORG     10H
     134  0010                  COMP_CNT:      DS      1        ;Computed encoder count.
     135  0011                  TEMP:          DS      1        ;Accum temp storage.
```

```
136  0012          K1L:           DS      1       ;Partial control result lbyte.
137  0013          K1H:           DS      1       ;                hbyte.
138  0014          R4_RB2:        DS      1
139  0015          R5_RB2:        DS      1
140  0016          SAVE_LATCH:    DS      1
141  0017          T1_CTR:        DS      1

143                ;************************************
144                ;        REGISTER BANK 3
145                ;************************************
146                ;RECEIVED MESSAGE ARRAY
148  0018          CMMD:          DS      5
149  001D          OLD_CMMD:      DS      1       ;Previous command.
150  001E          GP_PTR:        DS      2       ;Random selection pointer.

ER   LINE  ADDR  OBJECT      TYPE

152                ;************************************
153                ;        FLAGS DECLARATION
154                ;************************************
155                ;5 (20H-24H) BYTES WITH DIRECTLY-ADDRESSABLE BITS RESERVED
156                ;Bit address 0 to 27H.
157                ;-------------------------------------------------------
158                               BSEG
159                               ORG     00
160  0000          COM_RSRV:      DBIT    5
161  0005          BITMODE_FLG:   DBIT    1       ;Bit Mode communication.
163  0007          COMERR_FLG:    DBIT    1       ;Communication error flag.
164  0008          DCMDIR_FLG:    DBIT    1       ;0 =DCmotor dir =CCW: 1=CW.
165  0009          METER_FLG:     DBIT    1       ;Digit drive flag.
166  000A          DIRC_FLG:      DBIT    1       ;Rack dir conv'n storage.
167  000B          STMDIR_FLG:    DBIT    1       ;0 =Stepmotor dir =CW: 1=CCW.
168  000C          RUN_FLG:       DBIT    1       ;Slew mode flag.
169  000D          ACCEL_FLG:     DBIT    1       ;Accel/deccel flag
170  000E          PROF_FLG:      DBIT    1       ;0 =point-to-point: 1=velocity-position
171  000F          INITZ_FLG:     DBIT    1       ;Meter initialization mode.
172  0010          TEACH_FLG:     DBIT    1       ;Teach mode.
173  0011          TR1_FLG:       DBIT    1       ;First mail detect.
174  0012          TR2_FLG:       DBIT    1       ;Second mail detect.
175  0013          QMSG_FLG:      DBIT    1       ;Message qued flag.
176  0014          HOME_FLG:      DBIT    1       ;Load home indicator.
177  0015          SMALL_FLG:     DBIT    1       ;5 counts or less flg.
178  0016          CONT_FLG:      DBIT    1       ;Continuous mode flag.
179  0017          SKIP_FLG:      DBIT    1       ;Flow skip flag.
180  0018          TAPESOL_FLG:   DBIT    1       ;Tape solenoid flag.
182  001A          CMMDSRC_FLG:   DBIT    1       ;Command source flag.
184  001C          AUTO_FLG:      DBIT    1       ;Auto select mode.
185  001D          SAVE1_BIT:     DBIT    1       ;Bit temp storage.
186  001E          RECALL_FLG:    DBIT    1       ;Trajectory replay mode.
187  001F          SAVE_DIR:      DBIT    1       ;Dir save bit.
188  0020          RECVER_FLG:    DBIT    1       ;Transmission receiver.
189  0021          DCMOVE_FLG:    DBIT    1       ;Dc motor in active motion.
```

```
ER   LINE  ADDR  OBJECT          TYPE

      192                                ;****************************************
      193                                ;        STATUS BITS EQUATES
      194                                ;        (REGISTERS_MSG_STAT)
      195                                ;****************************************
      196                                              CSEG
      197  0038                          WTCHDOG_FLG    EQU     MSG1_STAT.0     ;Program flow watchdog.
      198  0039                          STEPBND_FLG    EQU     MSG1_STAT.1     ;Stepper bind
      199  003A                          SYS_ENABLE     EQU     MSG1_STAT.2     ;Drive system enabled
      200  003B                          STAT_FLG       EQU     MSG1_STAT.3     ;Status-change flag.
      201  003C                          BADSENS_FLG    EQU     MSG1_STAT.4     ;Sensor stucked on.
      202  003D                          TRIPEN_FLG     EQU     MSG1_STAT.5     ;Trip logic enable flag.
      203  003E                          DCMBND_FLG     EQU     MSG1_STAT.6     ;DC motor bind
      204  003F                          MODESEL_FLG    EQU     MSG1_STAT.7     ;Mode selector not reset

      206  0040                          LO30VDC_FLG    EQU     MSG2_STAT.0     ;Low 30 VDC supply.
      209  0043                          LOTAPE_FLG     EQU     MSG2_STAT.3     ;Low tape supply
      212  0046                          BADCOM_FLG     EQU     MSG2_STAT.6     ;Bad communication line.
      213  0047                          INITZERR_FLG   EQU     MSG2_STAT.7     ;Initialization error.


ER   LINE  ADDR  OBJECT          TYPE

      215                                ;****************************************
      216                                ;       CONSTANTS DECLARATION
      217                                ;****************************************
      218  0000                          CHECK_SUM      EQU     0000    ;Checksum code.
      219  03E8                          TC_SAMP        EQU     1000    ;Sampling interval= 1000us.
      220  00FA                          TC_T1INT       EQU      250    ;T1 interrupt inerval = 250us.
      221  000A                          TRIP_LIM       EQU       10    ;Trip limit pause.
      222  1F40                          COMWTCHDOG     EQU     8000    ;Communication rtn watchdog interval.
      223  0014                          LONG_TC        EQU       20    ;Long settling time interval.
      224  0005                          SHORT_TC       EQU        5    ;Short.
      225  0014                          TC3_SETTLE     EQU       20
      226  000A                          TC1_STEP       EQU       10    ;Per step time interval.
      227  0004                          TC2_STEP       EQU        4
      228  0066                          STEP2_MASK     EQU      66H    ;Step2 motor home mask.
      229  0099                          STEP1_NEUTRL   EQU      99H    ;Step1 motor neutrl mask.
      230  0066                          STEP1_MASK     EQU      66H    ;             drive mask.
      231  0024                          HARD           EQU       36    ;Hard error count limit.
      232  0030                          HARDER         EQU       48    ;Harder error.
      233  003F                          HARDEST        EQU       63    ;Hardest error count limit.
      234  0004                          SOFTERR        EQU        4    ;Soft (endstop) error limit.
      235  0001                          INITZ_SPEED    EQU        1    ;Digit move speed during initz'n.
      236  0059                          INITZ_ACCEL    EQU      59H    ;Accel constant with speed = INITZ_SPEED
      237  0006                          SRCH_CNT       EQU        6    ;Search mode count constant.
      239  0168                          COEFF0         EQU      360    ;Algorithm coefficient 0
      240  00FF                          COEFF1         EQU      255    ;Algorithm coefficient 1
      241  0050                          COEFF2         EQU       80    ;Algorithm coefficient 2 (COEFF2/256)
      242  0A00                          BASE_1REV      EQU    512*5    ;Base drv shaft 1 rotation distance.
      243  03E8                          METER_1REV     EQU     1000    ;Meter " " " " " ".
      244  0011                          RUND           EQU       17              ;Drum velocity, cnt/sample.
```

```
245  001A              BMAX_RUN        EQU     26              ;Base maximum velocity.
246  0079              ACCD            EQU     79H             ;Drum accel rate, cnt/sample^2.
247  00AE              DECCD           EQU     0AEH            ;Drum deccel rate.
248  0088              BACCT           EQU     88H             ;Base maximum accel rate.
249  0032              MMAX_RUN        EQU     50              ;Meter maximum velocity.
250  0096              MACCT           EQU     96H             ;Meter maximum accel rate.
251  009A              INTEN           EQU     9AH             ;Interrupt enable mask.
252  1000              END_OF_PGM      EQU     1000H           ;End of program memory.
253  FA00              MAX_CNT         EQU     BASE_1REV*25    ;Base maximum displacement.

ER   LINE  ADDR  OBJECT        TYPE

255                    ;**************************************************
256                    ;       COMPUTE DEGREES IN ENCODER COUNTS
257                    ;**************************************************
258  00FA              DEG90           EQU     250             ;90 degrees.
259  0038              DEG20           EQU     56              ;20 degrees.
260  08CA              ZERO_NINE       EQU     DEG90*9         ;90 X 9 degrees.
262                    ;*******************************************
263                    ;       ROTARY SELECTOR RACK POSN MAP
264                    ;*******************************************
265  0005              NO_OF_RACKS     EQU     05              ;Total no. of racks.
266  00C2              RACK4           EQU     DEG90-DEG20     ;$00.010  ^
267  00FA              RACK3           EQU     DEG90           ;$00.100  !
268  0132              RACK5           EQU     DEG90+DEG20     ;$00.001  ! CCW
269  0286              RACK1           EQU     DEG90*3-DEG20   ;$01.000  !
270  02EE              RACK2           EQU     DEG90*3         ;$10.000  !

272                    ;**************************************************
273                    ;       COMPUTE TAPE PRINT CYCLE CONSTANTS
274                    ;**************************************************
275  0600              LEAD_MARGIN     EQU     1536                    ;Lead margin distance.
276  0467              BACK_MARGIN     EQU     1127                    ;Trailing margin distance.
277  0599              CUT_DIST        EQU     BASE_1REV-BACK_MARGIN   ;Tape cut distance.

ER   LINE  ADDR  OBJECT        TYPE

279                    $NOCOND
280                    ;*******************************************
281                    ;       8155's MEMORY & I/O ADDRESS MAP
282                    ;-------------------------------------------
283  8800              P8155           EQU     08800H  ;SDK emulation = 08800H
284                                                    ;2732A eprom = 07800H.

286                                    IF      HIGH(P8155) EQ 088H
287  8801              PORTA           EQU     08801H  ;Port A address
288  8802              PORTB           EQU     08802H  ;Port B address
289  8803              PORTC           EQU     08803H  ;Port C address
290  9000              PORTX           EQU     9000H   ;Port X address
291  1000              EXRAM1          EQU     1000H   ;8155 start of RAM.

293                    ;-------------------------------------------
294                    ;       SDK-51 AUXILLARY RTNS ENTRY
```

```
                              ;------------------------------------------
      E00F                    CLRDSP          EQU     0E00FH  ;Clear SDK display.
      E006                    DSPCHR          EQU     0E006H  ;Display an ASCII character.
      E018                    DSP2BY          EQU     0E018H  ;Display 2-byte hex.
      E015                    DSP1BY          EQU     0E015H  ;Dispaly 1-byte hex.
      E01E                    DSPMSG          EQU     0E01EH  ;Display ASCII string.
      E64C                    UPI_IN          EQU     0E64CH
      E625                    UPI_CMD         EQU     0E625H
      E3CB                    CSMERR          EQU     0E3CBH  ;Display checksum err msg.
      C000                    KEYBD           EQU     0C000H
                                              ELSE
                                              ENDIF
                              $INCLUDE(INTVECTOR.OMS)

ER  LINE  ADDR  OBJECT    TYPE

                              ;**********************************************************
                              ;                PROGRAM STARTS HERE
                              ;**********************************************************
                                              ORG     00
      0000                    BEGIN           EQU     $
      0000  01 99     .C..                    AJMP    POWER_ON        ;Power-up initialization routine.
                              ;****************************************
                              ;               LOOPS FOREVER
                              ;****************************************
                                              ORG     03
      0003  02 00 03  ..C.                    LJMP    $               ;Loops forever if checksum error.
      0006  00 00             CHKSUM_CODE:    DW      CHECK_SUM
      0008  C0 83     .D..    TOCONT:         PUSH    DPH
      000A  32                                RETI

                              ;**********************************************************
                              ;                TO INTERRUPT SERVICE ROUTINE
                              ;**********************************************************
                              ;Used to keep track of the PWM turn-on time interval.
                              ;Timer is reloaded and started in the T1_INT interrupt routine
                              ;        every sampling interval with computed servo output
                              ;        value ( =PWM turn-on time for the next sampling interval.)
                              ;Used by communication routine as watchdog.
                              ;Not used by servo control (output Xtors always OFF) when
                              ;        used by communication routine.
                              ;----------------------------------------------------------
                                              ORG     0BH
      000B  43 90 03  .D..    T0_INT:         ORL     P1,#00000011B   ;Turn-off both source Xtors.
      000E  10 07 01  .BR.                    JBC     COMERR_FLG,$+4  ;COMERR_FLG =1 when in comm rtn.
      0011  32                                RETI
      0012  90 08 19  ..C.                    MOV     DPTR,#BADCOM    ;Force return to BADCOM but restore
      0015  8E 81     .D..                    MOV     SP,R6           ;SP for proper program continuation.
                              ;------------------------------------
                              ;       SPECIFY RETURN ADDRESS
                              ;         FOR FORCED RETURN
                              ;------------------------------------
      0017  C0 82     .D..    FORCRET:        PUSH    DPL             ;Push to stack PC return address.
      0019  80 ED     .R..                    SJMP    TOCONT
```

```
ER   LINE  ADDR  OBJECT         TYPE

     349                                   ;**************************************************************
     350                                   ;NAME:  TIMER1_INT
     351                                   ;
     352                                   ;ABSTRACT: Invokes by the sampling interval timeout; computes
     353                                   ;         the desired duty cycle for the next sampling interval
     354                                   ;         based on the sampled error count, last error count, and
     355                                   ;         last output (pwm turn-on time).
     356                                   ;
     357                                   ;INPUTS:  SYS_WTCHDOG, K1L, K1H, ERR_CNT, DCMOVE_FLG, DPTR
     358                                   ;
     359                                   ;OUTPUTS:  SGN(PWM turn-on time) in K2H, K2L.
     360                                   ;          ABS(PWM turn-on time) in Timer 0 and Start Timer.
     361                                   ;
     362                                   ;VARIABLES MODIFIED: RB1 Registers, ERR_CNT, T0 Latches, TR0, P1
     363                                   ;                K2H, K2L, Carry C, SYS_WTCHDOG
     364                                   ;
     365                                   ;RESTRICTIONS:
     366                                   ;               For logic correctness and servo loop stability, this
     367                                   ;               interrupt service rtn is position and time sensitive.
     368                                   ;               Timer 1 interrupt must have WAIT_T1 loop of UPDTE_SERVO
     369                                   ;               module as its only background routine to synchronize
     370                                   ;               the system to the servo sampling interval. The time to
     371                                   ;               compute the servo output must be insignificant relative
     372                                   ;               to the sampling period, ie., time delay between sampling
     373                                   ;               and outputting of PWM motor control must approach zero.
     374                                   ;               Hence, DPTR, B register, and PSW are preset to PORTB,
     375                                   ;               LOW(COEFF0), and Register Bank 2 respectively.
     376                                   ;
     377                                   ;SUBRTNS ACCESSED: None
     378                                   ;**************************************************************

     380                                              ORG     1BH
     381  001B  D5 17 7A      .DR.   TIMER1_INT:     DJNZ    T1_CTR,T1_EXIT
     382  001E  C2 8C         .B..                   CLR     TR0             ;Stop PWM timer.
     383  0020  F9                                   MOV     R1,A            ;Save accum of background rtn.

ER   LINE  ADDR  OBJECT         TYPE

     385                                   ;--------------------------------
     386                                   ;       COMPUTE ERROR COUNT
     387                                   ;--------------------------------
     388  0021  E0                                   MOVX    A,@DPTR         ;Sample actual position.
     389  0022  FD                                   MOV     R5,A
     390  0023  E0                                   MOVX    A,@DPTR
     391  0024  B5 15 02      .DR.                   CJNE    A,R5_RB2,REREAD
     392  0027  80 02         .R..                   SJMP    COMP_ERR
     393  0029  E0                   REREAD:         MOVX    A,@DPTR
     394  002A  FD                                   MOV     R5,A
     395  002B  E8                   COMP_ERR:       MOV     A,R0            ;Get desired position count.
```

```
396  002C  C3                             CLR    C                     ;Acc =desired ;COMP_CNT =sampled.
397  002D  9D                             SUBB   A,R5                  ;Error Count =Desired count-Sampled count
398  002E  F5 2A     .D..                 MOV    ERR_CNT,A             ;Save error count.
399  0030  20 E7 02  .BR.                 JB     ACC.7,$+5             ;Determine sign of error.
400  0033  80 02     .R..                 SJMP   CHK_IDLE_TOL          ;Bit =0 +; =1 -.
401  0035  F4                             CPL    A                     ;Get absolute value of error if negative.
402  0036  04                             INC    A
403  0037  20 21 06  .BR.  CHK_IDLE_TOL:  JB     DCMOVE_FLG,COMP_PWM   ;Is mode still in active DC motor c
404  003A  B4 01 03  ..R.                 CJNE   A,#01,COMP_PWM        ;+/- 1 count tolerance if in idling mode.
405  003D  E4                             CLR    A                     ;ie, error count is made =0.
406  003E  F5 2A     .D..                 MOV    ERR_CNT,A

408                        ;--------------------------------------------------
409                        ;       COMPUTE SERVO OUTPUT
410                        ;--------------------------------------------------
411  0040  FC              COMP_PWM:      MOV    R4,A            ;Acc =ABS(err cnt) =R4.
412  0041  A4                             MUL    AB              ;B =constant LOW(COEFF0).
413  0042  CC                             XCH    A,R4
414  0043  25 F0     .D..                 ADD    A,B
415  0045  CA                             XCH    A,R2            ;LOW( COEFF0 x err cnt )= R4; HIGH =R2.
416  0046  20 57 05  .BR.                 JB     ERR_CNT.7,MINUS
417  0049  2C                             ADD    A,R4            ;R2(low),R3(high) registers hold the term
418  004A  CB                             XCH    A,R3            ;[-COEFF1 x E(k-1)] - COEFF2 x G(k-1)]
419  004B  3A                             ADDC   A,R2            ;Output G(k)] is in R3=Lbyte, Acc=Hbyte.
420  004C  80 04     .R..                 SJMP   UPD_PWM
421  004E  C3              MINUS:         CLR    C
422  004F  9C                             SUBB   A,R4
423  0050  CB                             XCH    A,R3
424  0051  9A                             SUBB   A,R2

426                        ;--------------------------------------------------
427                        ;       UPDATE PWM DRIVE
428                        ;--------------------------------------------------
429  0052  88 2C     .D..  UPD_PWM:       MOV    K2L,R3
430  0054  20 5F 05  .BR.                 JB     K2H.7,$+8             ;Determine previous output sign bit.
431  0057  20 E7 07  .BR.                 JB     ACC.7,SIGNC_NEG       ;Output sign change from + to -.
432  005A  80 1F     .R..                 SJMP   SAME_POS              ;No change + to +.

ER   LINE  ADDR  OBJECT    TYPE

433  005C  30 E7 15  .BR.                 JNB    ACC.7,SIGNC_POS       ;Changed from - to +.
434  005F  80 07     .R..                 SJMP   SAME_NEG              ;No change - to -.
435  0061  43 90 0F  .D..  SIGNC_NEG:     ORL    P1,#00001111B   ;Turn off output Xtors if sign
436  0064  7C 08                          MOV    R4,#08          ;changed to avoid pwr supply short.
437  0066  DC FE     .R..                 DJNZ   R4,$            ;Turn-off delay time.
438  0068  F5 28     .D..  SAME_NEG:      MOV    K2H,A           ;Save output.
439  006A  F5 8C     .D..                 MOV    TH0,A           ;Load timer registers.
440  006C  88 8A     .D..                 MOV    TL0,R3
441  006E  00                             NOP
442  006F  53 90 F6  .D..  DIR_CW:        ANL    P1,#11110110B   ;Turn on Xtor CW pair.
443  0072  80 13     .R..                 SJMP   ON_TIMER        ;+err cnt =CCW; -err cnt =CW.
444  0074  43 90 0F  .D..  SIGNC_POS:     ORL    P1,#00001111B
445  0077  7C 08                          MOV    R4,#08
446  0079  DC FE     .R..                 DJNZ   R4,$
```

```
447  007B  F5 2B      .D..   SAME_POS:     MOV    K2H,A
448  007D  F4                              CPL    A                     ;Get cpl of output if positive
449  007E  C8                              XCH    A,R3                  ;because timer is upcount overflow.
450  007F  F4                              CPL    A
451  0080  F5 8A      .D..                 MOV    TL0,A
452  0082  53 90 F9   .D..   DIR_CCW:      ANL    P1,#11111001B         ;Turn on Xtor CCW pair.
453  0085  8B 8C      .D..                 MOV    TH0,R3
454  0087  D2 8C      .B..   ON_TIMER:     SETB   TR0                   ;Start timer.

456  0089  E9                              MOV    A,R1                  ;Restore accumulator.
457  008A  10 38 0B   .BR.                 JBC    WTCHDOG_FLG,T1_EXIT     ;Program in sync?
458  008D  D2 38      .B..                 SETB   WTCHDOG_FLG           ;Program went out of sync with servo
459  008F  D0 1E      .D..   IFATAL:       POP    GP_PTR                ;control sampling clock.
460  0091  D0 1F      .D..                 POP    GP_PTR+1              ;Save actual return address for later
461  0093  90 02 5B   ..C.                 MOV    DPTR,#JFATAL          ;diagnostics before forcing a RETI to
462  0096  01 17      .C..                 AJMP   FORCRET               ;fatal error trap.
463  0098  32                T1_EXIT:      RETI
464                          $INCLUDE(POWERON.OMS;6)

ER   LINE  ADDR  OBJECT     TYPE

466                          ;*****************************************************
467                          ;*******      POWER-UP PROGRAM INITIALIZATION      ******
468                          ;*****************************************************

470                          ;-----------------------------------------------------
471                          ;                     COMPUTE PROGRAM CHECKSUM
472                          ;-----------------------------------------------------
473  0099  30 B3 FD   .BR.   POWER_ON:     JNB    P3.3,$                ;Wait for 30 volts supply.
474  009C  90 00 00   ..C.                 MOV    DPTR,#BEGIN           ;Program memory 0 to 4K.
475  009F  7F 00                           MOV    R7,#00
476  00A1  E4                CHKSUM_LOOP:  CLR    A
477  00A2  93                              MOVC   A,@A+DPTR
478  00A3  2F                              ADD    A,R7
479  00A4  FF                              MOV    R7,A
480  00A5  A3                              INC    DPTR
481  00A6  E5 83      .D..                 MOV    A,DPH
482  00A8  B4 10 F6   ..R.                 CJNE   A,#10H,CHKSUM_LOOP
483  00AB  EF                              MOV    A,R7
484  00AC  60 03      ..R.                 JZ     INITZ_RTN
485  00AE  02 E3 CB          CHKSUM_ERR:   LJMP   CSMERR

487                          ;-----------------------------------------------------
488                          ;                     INITIALIZE I/O PORTS
489                          ;-----------------------------------------------------
490  00B1  C2 B1      .B..   INITZ_RTN:    CLR    P3.1                  ;Hold Transmit Line low.
491  00B3  12 E0 0F                        LCALL  CLRDSP                ;Clear SDK display.
492  00B6  74 0C                           MOV    A,#0CH                ;Set up 8155 command register.
493  00B8  90 88 00                        MOV    DPTR,#P8155           ;Configures Port C as output
494  00BB  F0                              MOVX   @DPTR,A               ;Ports A and B as inputs.
495  00BC  74 FF                           MOV    A,#0FFH               ;Write 1's to output ports:
496  00BE  F5 90      .D..                 MOV    P1,A                  ;P1
497  00C0  75 82 03   .D..                 MOV    DPL,#03
498  00C3  F0                              MOVX   @DPTR,A               ;Port C
```

```
 499  00C4  90 90 00                          MOV     DPTR,#9000H
 500  00C7  F0                                MOVX    @DPTR,A          ;Port X

ER   LINE  ADDR  OBJECT        TYPE

 502                                 ;----------------------------------------------
 503                                 ;                CLEAR INTERNAL RAMS
 504                                 ;         SET UP TIMERS, INTERRUPTS, STACK
 505                                 ;----------------------------------------------
 506  00C8  E4                                    CLR     A
 507  00C9  78 7F                                 MOV     R0,#7FH              ;Clear 8051 internal ram's.
 508  00CB  F6                       CLR_8031:    MOV     @R0,A
 509  00CC  D8 FD          .R..                   DJNZ    R0,CLR_8031
 510  00CE  F5 88          .D..                   MOV     TCON,A               ;Clear all interrupt flags.
 511  00D0  F5 A8          .D..                   MOV     IE,A                 ;and interrupt enables.
 512  00D2  F4                                    CPL     A
 513  00D3  F5 4C          .D..                   MOV     PORTX_LATCH,A        ;Put FFH to Port X latch.
 514  00D5  75 B8 02       .D..                   MOV     IP,#02               ;T0 highest priority
 515  00D8  75 89 21       .D..                   MOV     TMOD,#21H            ;T1 =mode 2; T0 =mode 1.
 516  00DB  75 8D 06       .D..                   MOV     TH1,#(-TC_T1INT)     ;Timer 1 interval constant.
 517  00DE  75 81 5D       .DD.                   MOV     SP,#START_OF_STACK-1 ;First stack location.
 518  00E1  43 A8 9A       .D..                   ORL     IE,#INTEN            ;Enable interrupts except EX1.

 520                                 ;----------------------------------------------
 521                                 ;          COMPUTE CONSTANT PARAMETERS
 522                                 ;----------------------------------------------
 523  00E4  75 45 AE       .D..                   MOV     ACCELK,#DECCD    ;Given deccel rate and running speed,
 524  00E7  0F                       ITER00:      INC     R7                 ;compute deccel distance and
 525  00E8  12 09 CC       ..C.                   LCALL   COMP_ACCEL         ;deccel time interval.
 526  00EB  25 5C          .D..                   ADD     A,DRUM_DECCEL+1
 527  00ED  F5 5C          .D..                   MOV     DRUM_DECCEL+1,A
 528  00EF  BC 11 F5       ..R.                   CJNE    R4,#RUND,ITER00
 529  00F2  8F 5B          .D..                   MOV     DRUM_DECCEL,R7

 532                                 ;----------------------------------------------
 533                                 ;            GET SAVED INFORMATIONS
 534                                 ;             FROM EXTERNAL MEMORY
 535                                 ;----------------------------------------------
 536  00F7  90 10 00                              MOV     DPTR,#EXRAM1     ;Get postage buffer.
 537  00FA  78 52          .D..                   MOV     R0,#OLDBANK      ;    rack ID no.
 538  00FC  E0                       LOOP4:       MOVX    A,@DPTR          ;    control flags.
 539  00FD  F6                                    MOV     @R0,A            ;    trip count.
 540  00FE  08                                    INC     R0
 541  00FF  A3                                    INC     DPTR
 542  0100  B8 5B F9       .DR.                   CJNE    R0,#OLDBANK+9,LOOP4
 543                                 $INCLUDE(INITLOAD.DMS;12)

ER   LINE  ADDR  OBJECT        TYPE

 545                                 ;*********************************************
 546                                 ;*****      INITIALIZE MECHANICAL BASE   *****
 547                                 ;*********************************************
```

```
0103  D2 3A        .B..    INITZ_LOAD:     SETB    SYS_ENABLE            ;Enable system.
0105  D1 C9        .C..                    ACALL   START_SERVO           ;Start servo control.

                           ;-----------------------------------
                           ;       CHECK OPTICAL SENSORS
                           ;-----------------------------------
0107  90 B8 01                             MOV     DPTR,#PORTA           ;Check for stucked sensrs.
010A  E0                                   MOVX    A,@DPTR
010B  44 38                                ORL     A,#00111000B
010D  B4 FF 02     ..R.                    CJNE    A,#0FFH,STUCKED
0110  80 04        .R..                    SJMP    ENBLE_OPTO            ;Enable optics if all off.
0112  D2 3C        .B..    STUCKED:        SETB    BADSENS_FLG           ;Set status bit for 'sensr fail'.
0114  21 77        .C..                    AJMP    FAIL_INITZ
0116  7C EF                ENBLE_OPTO:     MOV     R4,#11101111B         ;Enable system optical sensors.
0118  F1 31        .C..                    ACALL   ON_BIT

                           ;----------------------------------------
                           ;       FIND MAIN DRIVE SHAFT HOME
                           ;----------------------------------------
011A  12 0E A6     ..C.                    LCALL   HOME_CHK              ;Read base home sensr.
011D  60 09        .R..                    JZ      ALIGNED               ;Not home if not 0.
011F  E5 5A        .D..                    MOV     A,SAV2_AREA+1         ;Get last dir of motion.
0121  13                                   RRC     A                     ;Parameter pass is in C.
0122  12 0E 5B     ..C.                    LCALL   HOME_SRCH             ;Initialize main drv shaft home.
0125  10 3B 4F     .BR.                    JBC     STAT_FLG,FAIL_INITZ
0128  F5 31        .D..    ALIGNED:        MOV     BASE_INDEX,A          ;Reset base index regs.
012A  F5 32        .D..                    MOV     BASE_INDEX+1,A

                           ;-------------------------------------
                           ;       FIND DRIVE SELECTOR HOME
                           ;-------------------------------------
012C  90 B8 01                             MOV     DPTR,#PORTA           ;Read sensors.
012F  E0                                   MOVX    A,@DPTR
0130  F5 25        .D..                    MOV     SAV_SENSR,A           ;Save reading.
0132  54 03                                ANL     A,#03                 ;Isolate mode selector bits (0,1).
0134  60 05        .R..                    JZ      IN_BETWEEN
0136  75 3C 99     .D..                    MOV     STEP1,#STEP1_NEUTRL   ;Load stepper mask if not in neutrl.
0139  80 03        .R..                    SJMP    SRCH_NEUTRL
013B  75 3C 66     .D..    IN_BETWEEN:     MOV     STEP1,#STEP1_MASK     ;Mask for neutrl posn.

ER   LINE  ADDR  OBJECT        TYPE

013E  75 42 06     .D..    SRCH_NEUTRL:    MOV     RETRY_CTR,#06         ;Max. no. of search steps =6.
0141  79 3C        .D..                    MOV     R1,#STEP1
0143  91 87        .C..    STEP1_SRCH:     ACALL   ADV_1STEP
0145  70 07        .R..                    JNZ     WHERE                 ;Neutral pos'n is found if zero.
0147  91 60        .C..    NEUTRL_FND:     ACALL   N_TO_T
0149  10 3B 2B     .BR.                    JBC     STAT_FLG,FAIL_INITZ
014C  80 15        .R..                    SJMP    TAPE_FND
014E  B4 02 02     ..R.    WHERE:          CJNE    A,#02,$+5
0151  80 10        .R..                    SJMP    TAPE_FND              ;02= Tape drive pos'n is found.
0153  50 1F        .R..                    JNC     NOTVALID              ;01= Drum drive pos'n is found.
0155  91 69        .C..    DRUM_FND:       ACALL   D_TO_T
0157  10 3B 1D     .BR.                    JBC     STAT_FLG,FAIL_INITZ
```

```
600  015A  91 57     .C..               ACALL  T_TO_D
601  015C  10 38 18  .BR.               JBC    STAT_FLG,FAIL_INITZ
602  015F  91 72     .C..               ACALL  D_TO_N
603  0161  80 0C     .R..               SJMP   CHKERR
604  0163  91 57     .C..  TAPE_FND:    ACALL  T_TO_D
605  0165  10 38 0F  .BR.               JBC    STAT_FLG,FAIL_INITZ
606  0168  91 69     .C..               ACALL  D_TO_T
607  016A  10 38 0A  .BR.               JBC    STAT_FLG,FAIL_INITZ
608  016D  91 76     .C..               ACALL  T_TO_N
609  016F  10 38 05  .BR.  CHKERR:      JBC    STAT_FLG,FAIL_INITZ
610  0172  80 07     .R..               SJMP   EX_INITZLOAD
611  0174  D5 42 CC  .DR.  NOTVALID:    DJNZ   RETRY_CTR,STEP1_SRCH    ;03= unknown; advance step.

613                        ;--------------------------------------
614                        ;       INITIALIZATION FAILURE
615                        ;--------------------------------------
616  0177  D2 47     .B..  FAIL_INITZ:  SETB   INITZERR_FLG            ;Tell of initial'n failure.
617  0179  41 58     .C..               AJMP   JFATAL                  ;Proceed to Fatal Loop.
618  017B                  EX_INITZLOAD EQU    $
619                        $INCLUDE(MAINLINE.DMS;54)

ER   LINE  ADDR  OBJECT    TYPE

621                        ;*************************************
622                        ;*****     IDLE CONTROL LOOP     *****
623                        ;*************************************
624                        ;The program loops here when not executing
625                        ;any command: polls the control flags, the
626                        ;communication line, the  keyboard, the
627                        ;machine's optical sensors and switches.
628                        ;True state triggers a task/ or a command.
629                        ;One loop pass is equal to the servo sampling
630                        ;interval, hence, steady-state dcmotor shaft
631                        ;posn is always maintained.
632                        ;R3 (RB0) is used as loop monitor for coarse,
633                        ;long time durations, seconds, +/-.255sec. ie.,
634                        ;timeout in waiting for an event to occur.
635                        ;-----------------------------------------
636  017B  78 00           IDLE_LOOP:   MOV    R3,#00      ;Clr 256ms-interval counter.
637  017D  C2 B4     .B..  MON_LOOP:    CLR    P3.4        ;Entry point for loop monitor.
638  017F  75 41 01  .D..               MOV    CYC_CTR,#01 ;Clr busy line and reset cmmd
639                                                        ;repeater counter.
640                        ;-----------------------------------------
641                        ;      POLL CONTROL FLAGS AND INPUTS
642                        ;-----------------------------------------
643  0182  10 38 02  .BR.  CHK_STAT:    JBC    STAT_FLG,$+5  ;STAT_FLG =1 change of status occured:
644  0185  80 02     .R..               SJMP   CHK_QMSG      ;transmit status registers to
645  0187  41 0E     .C..               AJMP   JXMIT         ;main control module.
646  0189  10 13 02  .BR.  CHK_QMSG:    JBC    QMSG_FLG,$+5  ;QMSG_FLG =1 message received while
647  018C  80 02     .R..               SJMP   CHK_IMSG      ;executing the previous task:
648  018E  41 20     .C..               AJMP   GET_CMMD      ;get message and execute command.
649  0190  D1 FD     .C..  CHK_IMSG:    ACALL  CHKIMSG       ;Check for incoming msg from channels.
650  0192  50 02     .R..               JNC    CHK_TRIP      ;C =1 get msg and execute cmmd.
651  0194  21 FB     .C..               AJMP   JRECVMSG
```

```
652  0196  20 12 59     .BR.   CHK_TRIP:      JB     TR2_FLG,TRIP_RDY   ;TR2_FLG =1 valid trip sequence
653                                                                     ;detected while in last trip cycle.
654                            ;-----------------------------------------------------
655                            ;-------MAINTAIN SERVO STEADY-STATE-POSITION
656                            ;-----------------------------------------------------
657  0199  12 08 09     ..C.   STEADY_STATE:  LCALL  UPDTE_SERVO        ;Updte srvo cntrl: track realtime eve
658  019C  20 30 26     .BR.                  JB     TRIPEN_FLG,TRIP_ON       ;=1 trip logic is enabled.
659                                                                           ;=0 trip logic is disabled.
660                            ;--------------------------------------
661                            ;-------TRIP LOGIC IS DISABLED
662                            ;--------------------------------------
663  019F  74 FF                              MOV    A,#0FFH            ;Keep stepper motor off.
664  01A1  F1 3F        .C..                  ACALL  OUT_STEP
666  01A5  B4 47 02     ..R.                  CJNE   A,#47H,NOTSEAL     ;If true, same logic as Trip-On
667  01A8  80 18        .R..                  SJMP   TRIP_ON               ;but drum trip is ignored.

ER  LINE  ADDR  OBJECT      TYPE

669  01AA  70 05        .R..   NOTSEAL:       JNZ    IDLE_MODE          ;If cmmd = 00, wait 20sec for the cntrl
670  01AC  B8 4E CE     ..R.                  CJNE   R3,#78,MON_LOOP    ;module to indicate its presence.
671  01AF  41 58        .C..                  AJMP   JFATAL                ;Disable system if it timed out.
672  01B1  74 02               IDLE_MODE:     MOV    A,#00000010B       ;Drive unit is idling: no task to do.
674  01B5  F1 6D        .C..                  ACALL  PEEK_STAT          ;Monitor sensrs/swtchs for any change.
675  01B7  BB 18 04     ..R.                  CJNE   R3,#27,CHK_DRV     ;Check if there is power on motor.
676  01BA  D2 3E        .B..                  SETB   DCMMND_FLG         ;There should be no restraining force
677  01BC  41 58        .C..                  AJMP   JFATAL               ;on motor shaft, hence, servo output
678  01BE  12 0F 1D     ..C.   CHK_DRV:       CALL   CHKZDC               ;must be zero. Do not allow this condi-
679  01C1  60 88        .R..                  JZ     IDLE_LOOP            ;for a long period of time, else, con-
680  01C3  21 7D        .C..   JMONLOOP:      AJMP   MON_LOOP             ;sider condition a dc motor bind error.

682                            ;--------------------------------------
683                            ;-------TRIP LOGIC IS ENABLED
684                            ;--------------------------------------
685  01C5  10 12 2A     .BR.   TRIP_ON:       JBC    TR2_FLG,TRIP_RDY     ;=1 trip detect sequence OK; =0 false
686  01C8  30 11 05     .BR.                  JNB    TR1_FLG,CHK_PATH     ;=1 start trip detect: =0 false
687  01CB  20 41 0F     .BR.                  JB     BADFEED_FLG,BAD_FEED  ;=1 bad feed detected; =0 false
688  01CE  21 78        .C..                  AJMP   IDLE_LOOP
689                                                                       ;R4 holds sensrs reading from UPDTE.
690  01D0  EC                  CHK_PATH:      MOV    A,R4                 ;No trip detected: check transport
691  01D1  54 C0                              ANL    A,#11000000B           ;path: ACC = 0 clear ; not zero
692  01D3  60 10        .R..                  JZ     CHK_EOM                ;blocked.
699  01E3  21 78        .C..                  AJMP   IDLE_LOOP

701  01E5  20 18 0A     .BR.   CHK_EOM:       JB     TEST_FLG,TRIP_RDY    ;=0 check end of feed; =1 test mode.
702  01E8  B8 4E 08     ..R.                  CJNE   R3,#78,JMONLOOP      ;Wait 20sec for end-of-feed.
704  01ED  30 38 28     .BR.                  JNB    STAT_FLG,CMMD_COMPLETE ;Transmit Cmmd-Complete if
705  01F0  21 78        .C..                  AJMP   IDLE_LOOP              ;no status change.

707  01F2  30 3D 02     .BR.   TRIP_RDY:      JNB    TRIPEN_FLG,IGNORE_TRIP  ;TRIPEN_FLG =1 rotate drum.
709  01F5  61 F6        .C..                  AJMP   PRNT_MAIL
710  01F9  21 78        .C..                  AJMP   IDLE_LOOP                 ;ignore drum printing.
```

```
ER   ADDR  OBJECT        TYPE

                                    ;--------------------------------------------
                                    ;      EXTERNAL MESSAGE IS TO BE RECEIVED
                                    ;--------------------------------------------
     01FB  D2 84          .B.       JRECVMSG:     SETB   P3.4                       ;Set busy signal.
     01FD  12 0A 9E       ..C.                    LCALL  RECV_MSG                   ;Receive message from source.
     0200  10 3B 02       .BR.                    JBC    STAT_FLG,IGNORE_MSG        ;Ignore msg if error, else
     0203  41 20          .C..                    AJMP   GET_CMMD                   ;Get command.
     0205  30 3D 91       .BR.      IGNORF_MSG:   JNB    TRIPEN_FLG,STEADY_STATE    ;Loop idle if trip not enabled;
     0208  C2 12          .B..      DISABLE_TRIP: CLR    TR2_FLG                    ;Disable trip if enabled.
     020A  D1 D5          .C..                    ACALL  STOP_XPORT
     020C  21 78          .C..      EX_IGNORE:    AJMP   IDLE_LOOP

                                    ;--------------------------------------------
                                    ;      A CHANGE OF STATUS IS TO BE TRANSMITTED
                                    ;--------------------------------------------
     020E  D1 E5          .C..      JXMIT:        ACALL  CHK_RECV              ;Check for incoming msg before xmit.
     0210  12 0A 06       ..C.                    LCALL  XMIT_STAT             ;Transmit status to Control Module.
     0213  30 3A 45       .BR.                    JNB    SYS_ENABLE,JFATAL     ;Check if status is fatal (syst. disabled).
     0216  21 7B          .C..                    AJMP   IDLE_LOOP             ;(If there is comm err, status will be
                                                                               ;retransmitted, ie., STAT_FLG still 1.
                                    ;--------------------------------------------
                                    ;      COMMAND EXECUTION IS COMPLETED
                                    ;--------------------------------------------
     0218  20 3B 0D       .BR.      CMMD_COMPLETE: JB    STAT_FLG,EXRET             ;Error?
     021B  D1 E5          .C..                    ACALL  CHK_RECV
     021D  20 13 03       .BR.                    JB     QMSG_FLG,RETURN_IDLE       ;Repeat cmmd if no msg queued.
     0220  D5 41 0E       .DR.                    DJNZ   CYC_CTR,REPEAT             ;Command to be repeated?
     0223  12 0A 21       ..C.      RETURN_IDLE:  LCALL  XMIT_CMMDC                 ;Status will be xmitted if comm err
     0226  C2 3B          .B..                    CLR    STAT_FLG
     0228  20 41 DD       .BR.      EXRET:        JB     BADFEED_FLG,DISABLE_TRIP   ;Insure transport is stopped if true
     022B  21 7B          .C..                    AJMP   IDLE_LOOP                  ;Else, terminate cmmd execution.

ER   ADDR  OBJECT        TYPE

                                    ;--------------------------------------------
                                    ;      COMMAND VECTORS FROM MESSAGE
                                    ;--------------------------------------------
     022D  A2 1A          .B..      GET_CMMD:     MOV    C,CMMDSRC_FLG              ;Indicate source of command.
     022F  92 20          .B..                    MOV    RECVER_FLG,C
     0231  D2 B4          .B..      REPEAT:       SETB   P3.4                       ;Set busy signal.
     0233  E5 18          .D..                    MOV    A,CMMD                     ;Get command.
     0235  90 02 3D       ..C.      EXEC_CMMD:    MOV    DPTR,#CMMD_TAB             ;Load start of table.
     0238  54 0F                                  ANL    A,#0FH                     ;Mask upper nibble.
     023A  C3                                     CLR    C
     023B  33                                     RLC    A                          ;Multiply by 2.
     023C  73                                     JMP    @A+DPTR     ;SDK-51 key    ;Look-up jump table.
     023D  41 0E          .C..      CMMD_TAB:     AJMP   REQ_STAT        ;P         ;Status request.
     020E                           REQ_STAT      EQU    JXMIT
     023F  61 5D          .C..                    AJMP   METER_MODE      ;A         ;Enter postage amount.
                                                                         ;I         ;Initialize meter printwheels.
```

```
 760                                                           ;Q      ;Initialize selector position.
 761  0241   41 08      .C..              AJMP    DISABLE_TRIP ;B      ;Disable trip logic.
 762  0243   41 A6      .C..              AJMP    ENABLE_TRIP  ;C      ;Enable trip logic.
 764  0245   61 74      .C..              AJMP    PRNT_TAPE    ;D      ;Print on tape.
 765                                                   ;TEST ON        ;Auto select on meter.
 766  0247   61 39      .C..              AJMP    AUTO_TEACH   ;E      ;Trajectory playback mode.
 767  0249   61 0C      .C..              AJMP    TRIM_TAPE    ;F      ;Trim tape.
 769                                                                   ;Run dc motor continuously.
 770  024D   41 F0      .C..              AJMP    INKER        ;H      ;Drive the inker mech.
 771  024F   61 02      .C..              AJMP    ADJ_MARGIN   ;I      ;Adjust letter print margin.
 772  0251   41 E3      .C..              AJMP    UPDOWN_CTR   ;J      ;Increment counter.
 773                                                           ;Z      ;Decrement counter.
 774  0253   61 F6      .C..              AJMP    PRNT_MAIL    ;K      ;Print on mail.
 775  0255   61 31      .C..              AJMP    AUTO_RPT     ;L      ;Repeat last command.
 776  0257   61 38      .C..              AJMP    TEACH_RTN    ;M      ;Teach mode rtn.
 777  0259   61 65      .C..              AJMP    AUTO_SELECT  ;N      ;Automatic postage sel'n.
 778                                                           ;O      ;Disable system.

ER  LINE  ADDR  OBJECT        TYPE

 780                                  ;---------------------------------------------
 781                                  ;           FATAL ERROR TRAP
 782                                  ;---------------------------------------------
 783  025B   C2 A8      .B..  JFATAL:   CLR     IE.3              ;Disable T1 interrupt.
 784  025D   C2 3A      .B..            CLR     SYS_ENABLE        ;Disable system.
 785  025F   D2 A8      .B..            SETB    IE.0              ;Insure EX0 is enabled.
 786  0261   74 0F                      MOV     A,#0FH
 787  0263   F5 90      .D..            MOV     P1,A              ;Turn off: dcmotors drive.
 788  0265   F1 3F      .C..            ACALL   OUT_STEP          ;        : stepmotors drive.
 789  0267   F1 28      .C..            ACALL   OFF_SOL           ;        : solenoids drive.
 790  0269   90 10 00                   MOV     DPTR,#EXRAM1      ;Save current postage buffer
 791  026C   78 52      .D..            MOV     R0,#OLDBANK        ;and no. of last rack
 792  026E   E6               LOOP3:    MOV     A,@R0              ;set.
 793  026F   F0                         MOVX    @DPTR,A            ;and trip count.
 794  0270   08                         INC     R0
 795  0271   A3                         INC     DPTR
 796  0272   B8 5A F9   .DR.            CJNE    R0,#OLDBANK+8,LOOP3
 797  0275   E5 21      .D..            MOV     A,FLAGS+1         ;Save control flags.
 798  0277   F0                         MOVX    @DPTR,A
 799  0278   12 E0 0F                   LCALL   CLRDSP                      ;System disable.
 800  027B   7A 02      .C..            MOV     R2,#HIGH(STRING)                ;Display ERROR =status bytes.
 801  027D   7B A2      .C..            MOV     R3,#LOW(STRING)
 802  027F   12 E0 1E                   LCALL   DSPMSG
 803  0282   AA 28      .D..            MOV     R2,MSG2_STAT
 804  0284   AB 27      .D..            MOV     R3,MSG1_STAT
 805  0286   12 E0 18                   LCALL   DSP2BY
 806  0289   B2 B4      .B..  FATAL_LOOP: CPL   P3.4                        ;Toggle system status LED.
 807  028B   20 46 0C   .BR.  LOOP1MS:  JB      BADCOM_FLG,JLOOP
 808  028E   D1 FD      .C..            ACALL   CHKIMSG
 809  0290   50 08      .R..            JNC     JLOOP
 810  0292   12 0A 9E   ..C.            CALL    RECV_MSG
 811  0295   DC FE      .R..            DJNZ    R4,$
 812  0297   12 0A 06   ..C.            CALL    XMIT_STAT
 813  029A   DC FE      .R..  JLOOP:    DJNZ    R4,$
```

```
 814  029C  DC FE         .R..                      DJNZ    R4,$
 815  029E  DA EB         .R..                      DJNZ    R2,LOOP1MS
 816  02A0  80 E7         .R..                      SJMP    FATAL_LOOP           ;Loop forever.

 818  02A2  03 45 3D 20             STRING:         DB      3,'E= '

ER   LINE  ADDR  OBJECT      TYPE

 820                                ;*******************************************************
 822                                ;*******************************************************
 823                                ;Status Registers is used to pass status information from
 824                                ;module-to-module (or sub-routines).
 825                                ;        STAT_FLG =0 if no change in status
 826                                ;                 =1 if there is a change in status
 827                                ;        and corresponding change information bit(s).
 828                                ;Tasks which are required to transmit a Cmmd-Complete
 829                                ;to the control module pass thru CMMD_COMPLETE before
 830                                ;terminating, else, task terminates directly to IDLE_LOOP.
 831                                ;-------------------------------------------------------

 833                                ;**********************************************
 834                                ;                  ENABLE TRIP LOGIC
 835                                ;**********************************************
 836  02A6  91 4E         .C..      ENABLE_TRIP:    ACALL   N_TO_D               ;Unlock shutter bar.
 837  02A8  20 38 0C      .BR.                      JB      STAT_FLG,EX_ONXPORT
 838  02AB  43 27 28      .D..                      ORL     MSG1_STAT,#00101000B ;Tell CM trip logic is enabled.
 839  02AE  53 28 F9      .D..      RUN_XPORT:      ANL     MSG2_STAT,#11111001B ;Clear strafeed, badfeed flgs.
 840  02B1  74 FB                                   MOV     A,#11111011B         ;Turn on AC motor.
 841  02B3  F1 24         .C..                      ACALL   ON_SOL
 842  02B5  D1 C9         .C..                      ACALL   START_SERVO     ;Reset real-timekeeping registers.
 843  02B7  21 7B         .C..      EX_ONXPORT:     AJMP    IDLE_LOOP

ER   LINE  ADDR  OBJECT      TYPE

 973                                ;*******************************************************
 974                                ;                  PRINT-ON-TAPE CYCLE
 975                                ;*******************************************************
 976  0374  30 1B 05      .BR.      PRNT_TAPE:      JNB     TEST_FLG,TAPE_CYCLE
 977  0377  75 1D 6E      .D..                      MOV     OLD_CMMD,#6EH
 978  037A  61 31         .C..                      AJMP    AUTO_RPT
 979  037C  30 19 04      .BR.      TAPE_CYCLE:     JNB     INK_FLG,$+7     ;Turn on inker if enabled.
 980  037F  74 FD                                   MOV     A,#11111101B
 981  0381  F1 24         .C..                      ACALL   ON_SOL
 982  0383  91 60         .C..                      ACALL   N_TO_T          ;Shift to tape drive.
 983  0385  20 38 6C      .BR.                      JB      STAT_FLG,EX_TAPE
 984  0388  C2 08         .B..                      CLR     DCMDIR_FLG      ;Advance tape edge for leading
 985  038A  75 43 00      .D..                      MOV     TOTAL_CNT,#LOW(LEAD_MARGIN)      ;margin.
 986  038D  75 44 06      .D..                      MOV     TOTAL_CNT+1,#HIGH(LEAD_MARGIN)
 987  0390  B1 90         .C..                      ACALL   BPOSN_MOVE
 988  0392  20 38 5F      .BR.                      JB      STAT_FLG,EX_TAPE
```

```
 989  0395  F1 10      .C..                  ACALL   DEL20MS
 990  0397  D1 F0      .C..                  ACALL   MSG_QUED
 991  0399  74 FE                            MOV     A,#11111110B
 992  039B  F1 24      .C..                  ACALL   ON_SOL           ;Disengage tape roller.
 993  039D  F1 10      .C..                  ACALL   DEL20MS
 994  039F  B1 02      .C..                  ACALL   BHOME_MOVE       ;Move drv shaft to home.
 995  03A1  20 38 50   .BR.                  JB      STAT_FLG,EX_TAPE
 996  03A4  91 57      .C..                  ACALL   T_TO_D           ;Shift to drum drive.
 997  03A6  20 38 48   .BR.                  JB      STAT_FLG,EX_TAPE
 998  03A9  D1 F0      .C..                  ACALL   MSG_QUED
 999  03AB  D2 18      .B..                  SETB    TAPESOL_FLG      ;Tell motion control loop to
1000  03AD  7A 00                            MOV     R2,#00           ;engage tape roller 'on-the-fly'.
1001  03AF  91 C1      .C..                  ACALL   MOVE_DRUM        ;Print on tape.
1002  03B1  20 38 40   .BR.                  JB      STAT_FLG,EX_TAPE
1003  03B4  D1 F0      .C..                  ACALL   MSG_QUED
1004  03B6  7E 1D                            MOV     R6,#29
1005  03B8  F1 1E      .C..                  ACALL   DELAY_LOOP
1006  03BA  91 69      .C..                  ACALL   D_TO_T           ;Shift to tape drive.
1007  03BC  20 38 35   .BR.                  JB      STAT_FLG,EX_TAPE
1008  03BF  75 43 67   .D..                  MOV     TOTAL_CNT,#LOW(BACK_MARGIN) ;Advance tape for
1009  03C2  75 44 04   .D..                  MOV     TOTAL_CNT+1,#HIGH(BACK_MARGIN)  ;trailing margin.
1010  03C5  81 90      .C..                  ACALL   BPOSN_MOVE
1011  03C7  20 38 2A   .BR.                  JB      STAT_FLG,EX_TAPE
1012  03CA  D1 F0      .C..                  ACALL   MSG_QUED
1013  03CC  F1 10      .C..                  ACALL   DEL20MS
1014  03CE  74 FE                            MOV     A,#11111110B
1015  03D0  F1 24      .C..                  ACALL   ON_SOL           ;Disengage tape roller.
1016  03D2  F1 10      .C..                  ACALL   DEL20MS
1017  03D4  75 43 99   .D..                  MOV     TOTAL_CNT,#LOW(CUT_DIST) ;Cut tape while main drive
1018  03D7  75 44 05   .D..                  MOV     TOTAL_CNT+1,#HIGH(CUT_DIST)     ;shaft moves to home.
1019  03DA  81 90      .C..                  ACALL   BPOSN_MOVE
1020  03DC  20 38 15   .BR.                  JB      STAT_FLG,EX_TAPE

ER  LINE  ADDR  OBJECT     TYPE

1021  03DF  D1 F0      .C..                  ACALL   MSG_QUED
1022  03E1  F1 10      .C..                  ACALL   DEL20MS
1023  03E3  74 01                            MOV     A,#00000001B
1024  03E5  F1 28      .C..                  ACALL   OFF_SOL          ;Engage tape roller.
1025  03E7  F1 1C      .C..                  ACALL   DEL240MS
1026  03E9  D1 F0      .C..                  ACALL   MSG_QUED
1027  03EB  B2 08      .B..                  CPL     DCMDIR_FLG       ;Retract tape to start pos'n.
1028  03ED  B1 8A      .C..                  ACALL   ONEREV_MOVE
1029  03EF  20 38 02   .BR.                  JB      STAT_FLG,EX_TAPE
1030  03F2  91 76      .C..                  ACALL   T_TO_N           ;Shift to neutral.
1031  03F4  41 18      .C..       EX_TAPE:   AJMP    CMMD_COMPLETE

1033                              ;*****************************************************
1034                              ;                PRINT_ON_MAIL CYCLE
1035                              ;*****************************************************
1036                              ;Compute time delay before start of drum print motion.
1037                              ;-----------------------------------------------------
```

```
ER   LINE  ADDR  OBJECT        TYPE

     1071  042F  91 4E         .C..   UNLOCK:       ACALL  N_TO_D              ;Engage drive to drum drv posn.
     1072  0431  20 38 18      .BR.                 JB     STAT_FLG,EX_MAIL
     1073  0434  80 06         .R..                 SJMP   DRV_DRUM
     1074  0436  FE                   LOAD_DELAY:   MOV    R6,A
     1075  0437  20 18 02      .BR.                 JB     TEST_FLG,DRV_DRUM        ;Skip delay in test mode.
     1076  043A  F1 1E         .C..                 ACALL  DELAY_LOOP
     1077  043C  91 C1         .C..   DRV_DRUM:     ACALL  MOVE_DRUM           ;Print on mail.
     1078  043E  20 38 08      .BR.                 JB     STAT_FLG,EX_MAIL
     1079  0441  20 3D 04      .BR.   INKD_OFF:     JB     TRIPEN_FLG,PAUSE    ;=1 letter mode: pause to complete
     1080  0444  91 72         .C..                 ACALL  D_TO_N              ;235ms/letter cycle at 61 ips.
     1081  0446  80 04         .R..                 SJMP   EX_MAIL             ;=0 single print cmmd: return drive
     1082  0448  7E 01                PAUSE:        MOV    R6,#01              ;to neutral.
     1083  044A  F1 1E         .C..                 ACALL  DELAY_LOOP
     1084  044C  41 18         .C..   EX_MAIL:      AJMP   CMMD_COMPLETE
     1085                                           $INCLUDE(MOTION.OMS;19)

ER   LINE  ADDR  OBJECT        TYPE

     1087                             ;             $$$$$$$$$$$$$$$$$$$$$$$$$$$$$$$$$$$$$$$$$$$$$$$$$$$$$$$$$$$$
     1088                             ;             $$$$$$$      MOTION CONTROL CALL ROUTINES        $$$$$$$$$
     1089                             ;             $$$$$$$$$$$$$$$$$$$$$$$$$$$$$$$$$$$$$$$$$$$$$$$$$$$$$$$$$$$$

     1091                             ;$$$$$$$$$$$$$$$$$$$$$$$$$$$$$$$$$$$$$$$$$$$$$$$$$$$$$$$$$$$
     1092                             ;             MODE SELECTOR MOTIONS
     1093                             ;$$$$$$$$$$$$$$$$$$$$$$$$$$$$$$$$$$$$$$$$$$$$$$$$$$$$$$$$$$$
     1094  044E  81 02         .C..   N_TO_D:       ACALL  BHOME_MOVE          ;Insure base is home.
     1095  0450  20 38 33      .BR.                 JB     STAT_FLG,EX_MSMOVE
     1096  0453  7D 06                              MOV    R5,#06              ;Neutral to drum drive.
     1097  0455  80 02         .R..                 SJMP   $+4                 ;No. of steps = 6.
     1098  0457  7D 0C                T_TO_D:       MOV    R5,#12D             ;Tape to drum drive.
     1099  0459  C2 08         .B..                 CLR    STMDIR_FLG          ;No. of steps = 12.
     1100  045B  75 3F 01      .D..                 MOV    MASK,#01            ;Load direction and posn mask.
     1101  045E  80 1D         .R..                 SJMP   STEP1_DRV
     1102  0460  81 02         .C..   N_TO_T:       ACALL  BHOME_MOVE
     1103  0462  20 38 21      .BR.                 JB     STAT_FLG,EX_MSMOVE
     1104  0465  7D 06                              MOV    R5,#06              ;Neutral to tape drive.
     1105  0467  80 02         .R..                 SJMP   $+4
     1106  0469  7D 0C                D_TO_T:       MOV    R5,#12D             ;Drum to tape drive.
     1107  046B  D2 08         .B..                 SETB   STMDIR_FLG
     1108  046D  75 3F 02      .D..                 MOV    MASK,#02
     1109  0470  80 08         .R..                 SJMP   STEP1_DRV
     1110  0472  D2 08         .B..   D_TO_N:       SETB   STMDIR_FLG          ;Drum to neutral drive.
     1111  0474  80 02         .R..                 SJMP   $+4                 ;Dir = CW.
     1112  0476  C2 08         .B..   T_TO_N:       CLR    STMDIR_FLG          ;Tape to neutral drive.
     1113  0478  75 3F 00      .D..                 MOV    MASK,#00            ;Dir = CCW.
     1114  047B  7D 06                              MOV    R5,#06              ;Load no. of steps and mask.
     1115  047D  79 3C         .D..   STEP1_DRV:    MOV    R1,#STEP1
     1116  047F  75 3E 0A      .D..                 MOV    STEP,#TC1_STEP
     1117  0482  91 8E         .C..                 ACALL  MOVE_STEPPER
     1118  0484  91 AE         .C..                 ACALL  STEP_SETTLE
     1119  0486  22                   EX_MSMOVE:    RET
```

```
ER   LINE  ADDR  OBJECT       TYPE

     1121                               ;****************************************
     1122                               ;       STEPPER MOTOR STEP MOVE
     1123                               ;****************************************
     1124                               ;R1 =step mask address: R5 =no. of steps
     1125                               ;STEP  =step time delay: STMDIR_FLG =direction
     1126                               ;Waits for sampling instant to get loop in
     1127                               ;sync with servo sampling clock (period).
     1128                               ;----------------------------------------
     1129  0487  7D 01                  ADV_1STEP:      MOV    R5,#01               ;Call entry for single step.
     1130  0489  D2 08         .B..                     SETB   STMDIR_FLG
     1131  048B  75 3E 0F      .D..                     MOV    STEP,#15

     1133  048E  12 08 08      ..C.     MOVE_STEPPER:   CALL   UPDTE_SERVO
     1134  0491  E7                     NEXT_STEP:      MOV    A,@R1                ;Get present step mask.
     1135  0492  20 08 03      .BR.                     JB     STMDIR_FLG,CW_STEP   ;Step direction?
     1136  0495  23                     CCW_STEP:       RL     A                    ;Advance step mask.
     1137  0496  80 01         .R..                     SJMP   $+3
     1138  0498  03                     CW_STEP:        RR     A
     1139  0499  F7                                     MOV    @R1,A                ;Save updated step mask.
     1140  049A  7A 00                                  MOV    R2,#00               ;Energize stepper for step
     1141  049C  F1 3F         .C..                     ACALL  OUT_STEP             ;mask in accum.
     1142  049E  12 08 08      ..C.     STEP_DELAY:     CALL   UPDTE_SERVO          ;Synch with sampling period
     1143  04A1  EA                                     MOV    A,R2                 ;for step time delay interval.
     1144  04A2  B5 3E F9      .DR.                     CJNE   A,STEP,STEP_DELAY    ;Time out?
     1145  04A5  DD EA         .R..                     DJNZ   R5,NEXT_STEP         ;More steps to be made?
     1146  04A7  90 88 01               READ_MODSEL:    MOV    DPTR,#PORTA          ;Read mode sel posn.
     1147  04AA  E0                                     MOVX   A,@DPTR
     1148  04AB  54 03                                  ANL    A,#03                ;Isolate mode selecter bits.
     1149  04AD  22                                     RET                         ;Return with reading in A.

     1151                               ;------------------------------------
     1152                               ;       VERIFY FINAL POSITION
     1153                               ;------------------------------------
     1154  04AE  7D 14                  STEP_SETTLE:    MOV    R5,#LONG_TC     ;Call entry here is 20ms settling delay.
     1155  04B0  12 08 08      ..C.     CHK_POSN:       CALL   UPDTE_SERVO     ;                   256ms
     1156  04B3  91 A7         .C..                     ACALL  READ_MODSEL          ;Compare reading with desired
     1157  04B5  B5 3F 01      .DR.                     CJNE   A,MASK,BADSTEP_CHK   ;value contained in MASK.
     1158  04B8  22                                     RET
     1159  04B9  DD F5         .R..     BADSTEP_CHK:    DJNZ   R5,CHK_POSN          ;Timeout after 256 ms.
     1160  04BB  43 27 0A      .D..                     ORL    MSG1_STAT,#0AH       ;Bad stepper move error.
     1161  04BE  C2 3A         .B..                     CLR    SYS_ENABLE           ;It's a fatal error.
     1162  04C0  22                                     RET

ER   LINE  ADDR  OBJECT       TYPE

     1164                               ;************************************
     1165                               ;        ROTATE PRINT DRUM
     1166                               ;************************************
     1167  04C1  C2 08         .B..     MOVE_DRUM:      CLR    DCMDIR_FLG
     1168  04C3  B1 32         .C..                     ACALL  DRUM_MOVE
     1169  04C5  10 3B 2C      .BR.                     JBC    STAT_FLG,VERFINAL    ;Verify final position if error.
```

```
1170  04C8  05 57        .D..    GOODTRIP:        INC     TRIP_CTR                  ;Count no. of drum trips.
1171  04CA  E5 57        .D..                     MOV     A,TRIP_CTR
1172  04CC  B4 0A 19     ..R.                     CJNE    A,#TRIP_LIM,NOTLIM
1173  04CF  75 57 00     .D..                     MOV     TRIP_CTR,#00
1174  04D2  05 58        .D..                     INC     TRIP_CTR+1
1175  04D4  30 3D 10     .BR.                     JNB     TRIPEN_FLG,NOTLIM         ;Check if continuous trip test
1176  04D7  91 FA        .C..                     ACALL   CHKFINALP
1177  04D9  20 38 17     .BR.                     JB      STAT_FLG,EX_DRUM
1178  04DC  30 18 08     .BR.                     JNB     TEST_FLG,NOTLIM           ;mode.
1180  04E2  75 1D 2E     .D..                     MOV     OLD_CMMD,#'.'             ;postage selection.
1181  04E5  D2 13        .B..                     SETB    QMSG_FLG                  ;Treat as a queued message.
1185  04EF  74 02                                 MOV     A,#00000010B
1186  04F1  F1 28        .C..                     ACALL   OFF_SOL
1187  04F3  22                   EX_DRUM:         RET

1189  04F4  91 FA        .C..    VERFINAL:        ACALL   CHKFINALP
1190  04F6  30 38 CF     .BR.                     JNB     STAT_FLG,GOODTRIP
1191  04F9  22                                    RET

1193                             ;******************************************
1194                             ;        VERIFY DRUM FINAL POSITION
1195                             ;******************************************
1196  04FA  91 72        .C..    CHKFINALP:       ACALL   D_TO_N          ;Slide selector to verify.
1197  04FC  20 38 02     .BR.                     JB      STAT_FLG,EX_CHKFN
1198  04FF  91 4E        .C..                     ACALL   N_TO_D
1199  0501  22                   EX_CHKFN:        RET

ER   LINE  ADDR  OBJECT       TYPE

1201                             ;****************************************
1202                             ;        MOVE TO DRIVE HOME POSITION
1203                             ;****************************************
1204  0502  90 05 00             BHOME_MOVE:      MOV     DPTR,#BASE_1REV/2
1205  0505  78 31        .D..                     MOV     R0,#BASE_INDEX
1206  0507  80 05        .R..                     SJMP    COMP_HOME
1207  0509  90 01 F4             MHOME_MOVE:      MOV     DPTR,#METER_1REV/2
1208  050C  78 33        .D..                     MOV     R0,#METER_INDEX

1210  050E  C3                   COMP_HOME:       CLR     C                 ;Move load to absolute home posn.
1211  050F  E5 82        .D..                     MOV     A,DPL             ;Compute distance from current posn
1212  0511  96                                    SUBB    A,@R0                 ;to home posn.
1213  0512  FC                                    MOV     R4,A              ;Result is displacement
1214  0513  E5 83        .D..                     MOV     A,DPH                 ;to be travelled
1215  0515  08                                    INC     R0                    ;and direction of motion.
1216  0516  96                                    SUBB    A,@R0
1217  0517  86 44        .D..                     MOV     TOTAL_CNT+1,@R0
1218  0519  18                                    DEC     R0
1219  051A  86 43        .D..                     MOV     TOTAL_CNT,@R0
1220  051C  D2 08        .B..                     SETB    DCMDIR_FLG
1221  051E  30 E7 0C     .BR.                     JNB     ACC.7,EX_HOMOVE
1222  0521  CC                                    XCH     A,R4
1223  0522  25 82        .D..                     ADD     A,DPL
1224  0524  F5 43        .D..                     MOV     TOTAL_CNT,A
1225  0526  EC                                    MOV     A,R4
```

```
      1226  0527  35 83        .D..                   ADDC    A,DPH
      1227  0529  F5 44        .D..                   MOV     TOTAL_CNT+1,A
      1228  052B  C2 08        .B..                   CLR     DCMDIR_FLG
      1229  052D  B8 31 4C     .DR.    EX_HOMOVE:     CJNE    R0,#BASE_INDEX,MPOSN_MOVE
      1230  0530  A1 90        .C..                   AJMP    BPOSN_MOVE

ER    LINE  ADDR  OBJECT       TYPE

      1232                             ;*******************************************************
      1233                             ;                 MOTION PROFILE REQUIREMENTS
      1234                             ;*******************************************************
      1235                             ;The caller has to supply the following variables.
      1236                             ;--------------------------------------------------
      1237                             ;1. ACCELK = acceleration constant (counts/ms^2)
      1238                             ;2. DECCELK =  deccel eration constant (counts/ms^2)
      1239                             ;3. SLEWK  = running velocity constant (counts/ms)
      1240                             ;4. TOTAL_CNT = total distance to be traversed (counts)
      1241                             ;5. CONT_FLG = incremental or continuous motion
      1242                             ;6. PROF_FLG = profile or position-only (point-to-point) control.
      1243                             ;7. LIM_ERR = max error count before calling a fault condition.
      1244                             ;------------------------------------------------------------

      1246  0532  75 43 00     .D..    DRUM_MOVE:     MOV     TOTAL_CNT,#LOW(BASE_1REV)  ;Specifies drum rotation
      1247  0535  75 44 0A     .D..                   MOV     TOTAL_CNT+1,#HIGH(BASE_1REV) ;velocity profile and
      1248  0538  75 45 79     .D..                   MOV     ACCELK,#ACCD                        ;type of control.
      1249  053B  75 49 AE     .D..                   MOV     DECCELK,#DECCD
      1250  053E  75 46 11     .D..                   MOV     SLEWK,#RUND
      1251  0541  85 5B 40     .DD.                   MOV     DECCEL_INT,DRUM_DECCEL
      1252  0544  85 5C 3E     .DD.                   MOV     ACCEL_CNT,DRUM_DECCEL+1
      1253  0547  75 3F 00     .D..                   MOV     ACCEL_CNT+1,#00
      1254  054A  D2 0E        .B..                   SETB    PROF_FLG
      1255  054C  75 4A 3F     .D..                   MOV     PLIM_ERR,#HARDEST
      1256  054F  75 4B C1     .D..                   MOV     NLIM_ERR,#(-HARDEST)
      1257  0552  A1 9E        .C..                   AJMP    START_MOTION

      1259  0554  E4                   HUNT_MOVE:     CLR     A                   ;Search for a home position signal.
      1260  0555  F5 44        .D..                   MOV     TOTAL_CNT+1,A
      1261  0557  F5 41        .D..                   MOV     CYC_CTR,A                ;Will stop in SRCH_CNT once home
      1262  0559  75 43 06     .D..                   MOV     TOTAL_CNT,#SRCH_CNT  ;the home posn signal is seen.
      1263  055C  D2 16        .B..                   SETB    CONT_FLG                 ;Run continuously
      1264  055E  D2 14        .B..                   SETB    HOME_FLG                 ;Tell sampling handler to
      1265  0560  75 4A 06     .D..                   MOV     PLIM_ERR,#(SRCH_CNT)         ;look for the signal.
      1266  0563  75 4B FA     .D..                   MOV     NLIM_ERR,#(-SRCH_CNT)
      1267  0566  80 0C        .R..                   SJMP    HUNT2

      1269  0568  75 43 FF     .D..    ENDSTOP_MOVE:  MOV     TOTAL_CNT,#0FFH   ;Move towards an endstop.
      1270  056B  75 44 FF     .D..                   MOV     TOTAL_CNT+1,#0FFH   ;Load max 16 bit count.

      1272  056E  75 4A 04     .D..    INITZ_MOVE:    MOV     PLIM_ERR,#SOFTERR        ;Lowest error limit for
      1273  0571  75 4B FC     .D..                   MOV     NLIM_ERR,#(-SOFTERR)     ;soft collision at endstop.
      1274  0574  75 46 01     .D..    HUNT2:         MOV     SLEWK,#INITZ_SPEED       ;Slow speed= 1 cnt/sample.
      1275  0577  75 45 59     .D..                   MOV     ACCELK,#INITZ_ACCEL
      1276  057A  80 20        .R..                   SJMP    TRAPZPROF
```

```
ER  LINE  ADDR  OBJECT     TYPE

    1278  057C  75 45 96   .D..   MPOSN_MOVE:   MOV    ACCELK,#MACCT     ;Load max. accel rate and speed
    1279  057F  75 46 32   .D..   MPOSN2:       MOV    SLEWK,#MMAX_RUN   ;for meter point-to-point drive.
    1280  0582  75 4A 24   .D..                 MOV    PLIM_ERR,#HARD
    1281  0585  75 4B DC   .D..                 MOV    NLIM_ERR,#(-HARD)
    1282  0588  80 12      .R..                 SJMP   TRAPZPROF
    1284  058A  75 43 00   .D..   ONEREV_MOVE:  MOV    TOTAL_CNT,#LOW(BASE_1REV)   ;One rotation move
    1285  058D  75 44 0A   .D..                 MOV    TOTAL_CNT+1,#HIGH(BASE_1REV) ;at base drv shaft.

    1287  0590  75 45 88   .D..   BPOSN_MOVE:   MOV    ACCELK,#BACCT     ;Base point-to-point drive.
    1288  0593  75 46 1A   .D..                 MOV    SLEWK,#BMAX_RUN .
    1289  0596  75 4A 30   .D..   BPOSN2:       MOV    PLIM_ERR,#HARDER   ;Load max. error count limit
    1290  0599  75 4B D0   .D..                 MOV    NLIM_ERR,#(-HARDER) ;(harder stop).

    1292                          ;------------------------------------------
    1293                          ;        INITIALIZE MOTION CONTROL LOOP
    1294                          ;                HOUSEKEEPING
    1295                          ;------------------------------------------
    1296  059C  F1 4B      .C..   TRAPZPROF:    ACALL  COMP_PROF         ;Compute a trapezoidal motion profile.
    1297  059E  E4                START_MOTION: CLR    A
    1298  059F  FD                              MOV    R5,A
    1299  05A0  F5 2F      .D..                 MOV    POSN_ACC,A        ;Clear position accumulator.
    1300  05A2  F5 30      .D..                 MOV    POSN_ACC+1,A
    1301  05A4  04                              INC    A
    1302  05A5  FF                              MOV    R7,A              ;Initialize accel/deccel/settl timer.
    1303  05A6  74 05                           MOV    A,#05                       ;Check for size of displacement.
    1304  05A8  B5 43 01   .DR.                 CJNE   A,TOTAL_CNT,$+4               ;5 counts or less= single step
    1305  05AB  C3                              CLR    C                             ; by 1 count/sample.
    1306  05AC  40 11      .R..                 JC     PROCEED                       ;Else, proceed with trapz profile.
    1307  05AE  E4                              CLR    A
    1308  05AF  B5 44 0D   .DR.                 CJNE   A,TOTAL_CNT+1,PROCEED
    1309  05B2  B5 43 01   .DR.                 CJNE   A,TOTAL_CNT,LESS5           ;Check for non-zero displacement.
    1310  05B5  22                              RET                                ;No motion required if zero.
    1311  05B6  D2 15      .B..   LESS5:        SETB   SMALL_FLG
    1312  05B8  C2 0C      .B..                 CLR    RUN_FLG
    1313  05BA  75 35 01   .D..                 MOV    RUN_SPEED,#01
    1314  05BD  80 06      .R..                 SJMP   DCMLOOP
    1315  05BF  D2 0C      .B..   PROCEED:      SETB   RUN_FLG
    1316  05C1  C2 15      .B..                 CLR    SMALL_FLG
    1317  05C3  D2 21      .B..                 SETB   DCMOVE_FLG                  ;Start of dcmotor motion.

ER  LINE  ADDR  OBJECT     TYPE

    1319                          ;**********************************************
    1320                          ;*******    DC MOTOR MOTION CONTROL LOOP   *******
    1321                          ;**********************************************
    1322                          ;Loops here during dc motor servo control of a
    1323                          ;desired motion profile.
    1324                          ;RUN_FLG and ACCEL_FLG are modified to reflect
    1325                          ;a trapezoidal motion profile.
    1326                          ;Output decision is used at the next sampling
    1327                          ;instant generation of the target trajectory.
```

```
      05C5  12 08 08    ..C.   DCMLOOP:        LCALL  UPDTE_SERVO          ;Update servo control.
      05C8  E5 2A       .D..                   MOV    A,ERR_CNT
      05CA  20 E7 08    .BR.                   JB     ACC.7,CNT_NEG        ;ACC.7 =1 neg cnting; 0=pos.
      05CD  B5 4A 01    .DR.   CNT_POS:        CJNE   A,PLIM_ERR,$+4       ;Check if error count is within
      05D0  D3                                 SETB   C                       ;allowable limit = abs(HARDERR)
      05D1  50 09       .R..                   JNC    FAULT
      05D3  C1 03       .C..                   AJMP   COMP_TIMING
      05D5  B5 4B 01    .DR.   CNT_NEG:        CJNE   A,NLIM_ERR,$+4
      05D8  C3                                 CLR    C
      05D9  50 28       .R..                   JNC    COMP_TIMING

                               ;-----------------------------------------------------------
                               ;               DC MOTOR CONTROL LOOP EXIT
                               ;-----------------------------------------------------------
      05DB  30 0E 04    .BR.   FAULT:          JNB    PROF_FLG,SHUTOFF     ;Do not shut off if drum drv.
      05DE  D2 3B       .B..                   SETB   STAT_FLG             ;Just indicate fault to caller.
      05E0  80 21       .R..                   SJMP   COMP_TIMING          ;Proceed as usual.
      05E2  C2 3A       .B..   SHUTOFF:        CLR    SYS_ENABLE           ;DC motor move error.
      05E4  43 27 48    .D..                   ORL    MSG1_STAT,#01001000B ;Set error flags and
      05E7  43 90 03    .D..                   ORL    P1,#00000011B        ;and turn off motor drive.
      05EA  75 35 00    .D..   END_OF_MOTION:  MOV    RUN_SPEED,#00        ;Insure that before exit,
      05ED  C2 0C       .B..                   CLR    RUN_FLG              ;motion is in constant vel
      05EF  C2 0D       .B..                   CLR    ACCEL_FLG            ;mode with speed = 0 (stop).
      05F1  20 3B 0C    .BR.                   JB     STAT_FLG,EX_DCMLOOP
      05F4  20 97 07    .BR.                   JB     P1.7,LONG_SETTLE     ;Select settling time delay.
      05F7  20 0F 04    .BR.                   JB     INITZ_FLG,LONG_SETTLE  ;Longer Ts when in base
      05FA  F1 0C       .C..                   ACALL  DEL05MS                ;drive and/or initz'n mode.
      05FC  80 02       .R..                   SJMP   EX_DCMLOOP
      05FE  F1 10       .C..   LONG_SETTLE:    ACALL  DEL20MS
      0600  C2 21       .B..   EX_DCMLOOP:     CLR    DCMOVE_FLG           ;End of dcmotor motion.
      0602  22                                 RET

ER  LINE  ADDR  OBJECT      TYPE

                               ;*******************************************
                               ;       TRAPEZOIDAL MOTION PROFILE
                               ;             HOUSEKEEPING
                               ;*******************************************
                               ;Decides whether the motion is in accel phase,
                               ;constant velocity phase, deccel phase, or in
                               ;settling phase based on the motion specs and
                               ;control mode inputs.
                               ;Insure the motion stops at final position count.
                               ;Uses the following registers and control flags:
                               ;TOTAL_CNT   =desired total displacement count
                               ;POSN_ACC    =accumulated displacement count wrt time
                               ;ACCEL_CNT   =POSN_ACC value when in accel phase.
                               ;RUN_SPEED   =computed target speed last sampling instant
                               ;VEL_OFFS    =offset count to insure total displ. = desired.
                               ;ACCELK      =desired accel rate
                               ;SLEWK       =desired slew rate (running speed)
                               ;DECCELK     =desired deccel rate
                               ;CYC_CTR     =desired displacement multiplier.
```

```
                                           ;RUN_FLG    =0 constant velocity phase; 1 accel/deccel
                                           ;ACCEL_FLG  =0 accel phase; 1 deccel phase
                                           ;PROF_FLG   =0 accel rate = deccel rate; 1 not equal
                                           ;CONT_FLG   =0 start-stop mode; 1 continuous run mode
                                           ;SMALL_FLG  =0 TOTAL_CNT > 5; 1 not > 5.
                                           ;R7 and R5 (RB0) as a 16-bit register for
                                           ;keeping track of accel/deccel time interval.
                                           ;Modifies RUN_FLG, ACCEL_FLG ,R7, R5 for next sampling
                                           ;instant generation of the target position count.
                                           ;---------------------------------------------------

0603  20 0C 02      .BR.   COMP_TIMING:    JB     RUN_FLG,NOTCV            ;Examine last sampling
0606  C1 3A         .C..                   AJMP   CONST_VEL                ;instant's motion phase,
0608  30 0D 02      .BR.   NOTCV:          JNB    ACCEL_FLG,ACCEL_VEL      ;ie.,const velocity? accel?
060B  C1 A2         .C..                   AJMP   DECCEL_VEL               ;deccel phase?
                                           ;----------------------------------------------
                                           ;               ACCELERATION PHASE
                                           ;----------------------------------------------
060D  20 0E 08      .BR.   ACCEL_VEL:      JB     PROF_FLG,CHK_SPEEDLIM    ;Motion in accel mode IF
0610  C3                                   CLR    C                        ;POSN_ACC < TOTAL_CNT/4
0611  E5 2F         .D..                   MOV    A,POSN_ACC               ;OR RUN_SPEED < SLEWR
0613  95 3E         .D..                   SUBB   A,ACCEL_CNT              ;ELSE motion in constant vel mode.
0615  E5 30         .D..                   MOV    A,POSN_ACC+1
0617  95 3F         .D..                   SUBB   A,ACCEL_CNT+1
0619  50 0E         .R..                   JNC    END_ACCEL                ;Check SGN(_POSN-ACCEL_).
061B  E5 35         .D..   CHK_SPEEDLIM:   MOV    A,RUN_SPEED              ;If not end of accel, is com-
061D  B5 46 02      .DR.                   CJNE   A,SLEWK,$+5              ;puted speed = target running
0620  80 07         .R..                   SJMP   END_ACCEL                ;speed? End of accel if it is.
0622  0F                                   INC    R7                       ;Else, increment accel/deccel

ER    LINE  ADDR  OBJECT        TYPE

0623  BF 00 01      ..R.                   CJNE   R7,#00,$+4               ;timekeeping regs R7, R5.
0626  0D                                   INC    R5
0627  C1 B3         .C..                   AJMP   EXIT_TIMING
0629  30 0E 04      .BR.   END_ACCEL:      JNB    PROF_FLG,$+7             ;If end of accel, if accel not
062C  AF 40         .D..                   MOV    R7,DECCEL_INT            ;= deccel (PROF_FLG set), preset
062E  80 06         .R..                   SJMP   $+8                      ;R7 with deccel interval; else,
0630  85 2F 3E      .DD.                   MOV    ACCEL_CNT,POSN_ACC       ;save current posn cnt, ie.,
0633  85 30 3F      .DD.                   MOV    ACCEL_CNT+1,POSN_ACC+1   ;accel displacement.
0636  C2 0C         .B..                   CLR    RUN_FLG                  ;Indicate motion is in
0638  C1 B3         .C..                   AJMP   EXIT_TIMING              ;'constant velocity phase'.
                                           ;----------------------------------------------
                                           ;               CONSTANT_VELOCITY PHASE
                                           ;----------------------------------------------
063A  C3                   CONST_VEL:      CLR    C                   ;Motion in constant vel mode IF
063B  E5 43         .D..                   MOV    A,TOTAL_CNT         ;TOTAL_CNT - POSN_ACC - ACCEL_CNT - RUN_SPEED
063D  95 2F         .D..                   SUBB   A,POSN_ACC          ;result is > 0 OR CONT_FLG is set.
063F  30 15 04      .BR.                   JNB    SMALL_FLG,GTS       ;ELSE motion in deccel mode.
0642  60 30         .R..                   JZ     END_CONST           ;(When SMALL_FLG is set, ie., target
0644  C1 B3         .C..                   AJMP   EXIT_TIMING         ;displacement <= 5 cnts, profile is
0646  F5 F0         .D..   GTS:            MOV    B,A                 ;always constant velocity.)
0648  E5 44         .D..                   MOV    A,TOTAL_CNT+1
064A  95 30         .D..                   SUBB   A,POSN_ACC+1
```

```
1431  064C  C5 F0      .D..                 XCH   A,B                  ;Result (TOTAL-POSN) lo =A ; hi =B.
1432  064E  50 0A      .R..                 JNC   CNTINUE              ;If SGN(TOTAL-POSN) negative;
1433  0650  12 09 F8   ..C.                 CALL  TWOS_CPL             ;displacement, must be in continuous
1434  0653  F5 2F      .D..                 MOV   POSN_ACC,A           ;mode. Get absolute count to correct
1435  0655  85 F0 30   .DD.                 MOV   POSN_ACC+1,B         ;position registers.
1436  0658  C1 B3      .C..                 AJMP  EXIT_TIMING
1437  065A  95 3E      .D..   CNTINUE:      SUBB  A,ACCEL_CNT          ;If SGN positive, result - ACCEL_CNT
1438  065C  F5 36      .D..                 MOV   VEL_OFFS,A           ;Save difference (= offset velocity if
1439  065E  E5 F0      .D..                 MOV   A,B                  ;difference =< RUN_SPEED)
1440  0660  95 3F      .D..                 SUBB  A,ACCEL_CNT+1
1441  0662  FC                              MOV   R4,A                 ;Difference lo =VEL_OFFSET; hi =R4.
1442  0663  C3                              CLR   C
1443  0664  E5 36      .D..                 MOV   A,VEL_OFFS           ;Result = Difference - RUN_SPEED
1444  0666  95 35      .D..                 SUBB  A,RUN_SPEED          ;lo =R4 ; hi =Acc.
1445  0668  CC                              XCH   A,R4
1446  0669  94 00                           SUBB  A,#00
1447  066B  40 07      .R..                 JC    END_CONST            ;End of const vel phase if negative
1448  066D  C2 17      .B..                 CLR   SKIP_FLG             ;or zero result.
1449  066F  70 42      .R..                 JNZ   EXIT_TIMING
1450  0671  BC 00 3F   ..R.                 CJNE  R4,#00,EXIT_TIMING
1451                          ;-----------------------------------------------
1452                          ;      CONTINUOUS RUN MODE OR START-STOP?
1453                          ;-----------------------------------------------
1454  0674  30 16 18   .BR.   END_CONST:    JNB   CONT_FLG,STOP_MOTION      ;CONT_FLG =0 start-stop mode.
1455  0677  20 17 0E   .BR.                 JB    SKIP_FLG,CHKSMALL         ;         =1 continuous run.
1456  067A  D2 17      .B..                 SETB  SKIP_FLG                  ;0 to 1 transition of SKIP_FLG

ER  LINE  ADDR  OBJECT     TYPE

1457  067C  F1 66      .C..                 ACALL CHKKBD                    ;indicates start of deccel phase.
1458  067E  40 03      .R..                 JC    RST_CYCTR                 ;Motion to be stopped if in
1459  0680  D5 41 05   .DR.                 DJNZ  CYC_CTR,CHKSMALL          ;continuous run mode?
1460  0683  75 41 01   .D..   RST_CYCTR:    MOV   CYC_CTR,#01               ;Reset cycle counter.
1461  0686  80 0A      .R..                 SJMP  STOP_MOTION
1462  0688  30 15 28   .BR.   CHKSMALL:     JNB   SMALL_FLG,EXIT_TIMING
1463  068B  E4                              CLR   A                         ;Reset POSN if in continuous
1464  068C  F5 2F      .D..                 MOV   POSN_ACC,A                ;run mode and SMALL_FLG set,
1465  068E  F5 30      .D..                 MOV   POSN_ACC+1,A              ;ie., TOTAL <=5.
1466  0690  C1 B3      .C..                 AJMP  EXIT_TIMING
1467  0692  C2 16      .B..   STOP_MOTION:  CLR   CONT_FLG                  ;Yes, motion is to be stopped.
1468  0694  20 15 17   .BR.                 JB    SMALL_FLG,DECR            ;No deccel phase if SMALL_FLG
1469  0697  D2 17      .B..                 SETB  SKIP_FLG                  ;is set.
1470  0699  D2 0C      .B..                 SETB  RUN_FLG                   ;Indicate deccel phase.
1471  069B  D2 0D      .B..                 SETB  ACCEL_FLG
1472  069D  85 49 45   .DD.                 MOV   ACCELK,DECCELK            ;Load deccel rate.
1473  06A0  C1 B3      .C..                 AJMP  EXIT_TIMING
1474                          ;-----------------------------------------------
1475                          ;                DECCELERATION PHASE
1476                          ;-----------------------------------------------
1477  06A2  30 17 09   .BR.   DECCEL_VEL:   JNB   SKIP_FLG,DECR      ;Motion in deccel mode IF
1478  06A5  E5 36      .D..                 MOV   A,VEL_OFFS         ;R7 is > 0 ELSE motion is stopped.
1479  06A7  B5 35 04   .DR.                 CJNE  A,RUN_SPEED,DECR   ;Adjust with offset velocity to
1480  06AA  C2 17      .B..                 CLR   SKIP_FLG           ;arrive at exact target count
1481  06AC  80 05      .R..                 SJMP  EXIT_TIMING        ;displacement.
```

```
       1482  06AE  1F                    DECR:          DEC     R7                      ;Decrement accel/decel timekeeping
       1483  06AF  BF FF 01       ..R.                  CJNE    R7,#0FFH,EXIT_TIMING    ;registers.
       1484  06B2  1D                                   DEC     R5
       1485                                ;-----------------------------------------------
       1486                                ;              END OF MOTION?
       1487                                ;-----------------------------------------------
       1488  06B3  BF 00 05       ..R.     EXIT_TIMING:   CJNE    R7,#00,CHKFLG           ;R7 =R5 =0 end of cycle.
       1489  06B6  BD 00 02       ..R.                  CJNE    R5,#00,CHKFLG
       1490  06B9  A1 EA          .C..                  AJMP    END_OF_MOTION
       1491  06BB  BA 80 03       ..R.     CHKFLG:        CJNE    R2,#80H,$+6             ;For 'on-the-fly' activation of the
       1492  06BE  10 18 02       .BR.                  JBC     TAPESOL_FLG,$+5         ;tape solenoid only.
       1493  06C1  A1 C5          .C..                  AJMP    DCMLOOP
       1494  06C3  74 01                                MOV     A,#00000001B            ;Turn off tape solenoid.
       1495  06C5  F1 28          .C..                  ACALL   OFF_SOL
       1496  06C7  A1 C5          .C..                  AJMP    DCMLOOP
       1497                                $INCLUDE(MAINSUB.DMS:8)

ER     LINE  ADDR  OBJECT         TYPE

       1499                                ;              ************************************************
       1500                                ;              **********    MAIN CALL ROUTINES    **********
       1501                                ;              ************************************************

       1503                                ;************************************************
       1504                                ;          START DCMOTOR SERVO CONTROL
       1505                                ;************************************************
       1506  06C9  75 8B 06       .D..     START_SERVO:   MOV     TL1,#(-TC_T1INT)                ;Initialize TL1 and
       1507  06CC  75 17 04       .D..                  MOV     T1_CTR,#TC_SAMP/TC_T1INT              ;T1 int ctr.
       1508  06CF  E4                                   CLR     A                               ;Clear both 1ms- and
       1509  06D0  FA                                   MOV     R2,A                            ;_256ms-timeout ctrs.
       1510  06D1  FB                                   MOV     R3,A
       1511  06D2  D2 8E          .B..                  SETB    TR1                             ;Start Timer 1.
       1512  06D4  22                                   RET

       1514                                ;**************************************************
       1515                                ;              STOP MAIL TRANSPORT
       1516                                ;**************************************************
       1517                                ;Turn off the AC motor.
       1518                                ;Lock the shutter bar if Trip Logic is enabled.
       1519                                ;-------------------------------------------------
       1520  06D5  74 04                   STOP_XPORT:    MOV     A,#00000100B                    ;Turn off AC motor.
       1521  06D7  F1 28          .C..                  ACALL   OFF_SOL
       1522  06D9  75 18 62       .D..                  MOV     CMMD,#62H
       1523  06DC  10 3D 01       .BR.                  JBC     TRIPEN_FLG,LOCK                 ;Lock shutter bar if trip was enabled.
       1524  06DF  22                                   RET
       1525  06E0  91 72          .C..     LOCK:          ACALL   D_TO_N                          ;Move mode selector to neutral.
       1526  06E2  D2 3B          .B..                  SETB    STAT_FLG
       1527  06E4  22                                   RET

ER     LINE  ADDR  OBJECT         TYPE

       1529                                ;**********************************************
```

```
1530                                  ;       CHECK RECEIVE BEFORE TRANSMIT
1531                                  ;****************************************
1532  06E5  10 05 14   .BR.   CHK_RECV:      JBC     BITMODE_FLG,EX_CHKRECV
1533  06E8  D1 FD      .C..                  ACALL   CHKIMSG          ;Check for incoming msg.
1534  06EA  40 08      .R..                  JC      TURN_RECV        ;Receive msg if C =1.
1535  06EC  7E 0F                            MOV     R6,#0FH          ;Wait ~30us to avoid contention.
1536  06EE  DE FE      .R..                  DJNZ    R6,$

1538                                  ;**********************************
1539                                  ;       RECEIVE QUED MESSAGE
1540                                  ;**********************************
1541  06F0  D1 FD      .C..   MSG_QUED:      ACALL   CHKIMSG          ;Look again.
1542  06F2  50 08      .R..                  JNC     EX_CHKRECV
1543  06F4  12 0A 9E   ..C.   TURN_RECV:     LCALL   RECV_MSG
1544  06F7  10 38 02   .BR.                  JBC     STAT_FLG,EX_CHKRECV ;Ignore msg if comm err.
1545  06FA  D2 13      .B..                  SETB    QMSG_FLG         ;Inform mainline of queued msg.
1546  06FC  22                EX_CHKRECV:    RET

1548                                  ;****************************************
1549                                  ;       CHECK FOR INCOMING MESSAGE
1550                                  ;****************************************
1551  06FD  C3                CHKIMSG:       CLR     C                ;C =1 incoming msg; C =0 none.
1552  06FE  30 B0 04   .SR.                  JNB     P3.0,CHK_KEY
1553  0701  D3                               SETB    C
1554  0702  C2 1A      .B..                  CLR     CMMDSRC_FLG      ;Command source is serial line.
1555  0704  22                               RET
1556  0705  F1 66      .C..   CHK_KEY:       ACALL   CHKKBD
1557  0707  50 02      .R..                  JNC     EX_CHKIMSG
1558  0709  D2 1A      .B..                  SETB    CMMDSRC_FLG      ;Command source is keyboard.
1559  070B  22                EX_CHKIMSG:    RET

1561                                  ;************************************************************
1562                                  ;              DELAY LOOPS IN MILLISEC INCREMENT
1563                                  ;************************************************************
1564  070C  7E 05             DEL05MS:       MOV     R6,#SHORT_TC             ;Short settling time.
1565  070E  80 0E      .R..                  SJMP    DELAY_LOOP
1566  0710  7E 14             DEL20MS:       MOV     R5,#LONG_TC              ;Long settling time.
1567  0712  80 0A      .R..                  SJMP    DELAY_LOOP
1568  0714  7E 3C             DEL60MS:       MOV     R6,#60                   ;60ms delay.
1569  0716  80 06      .R..                  SJMP    DELAY_LOOP
1570  0718  7E 78             DEL120MS:      MOV     R6,#120                  ;120ms delay.
1571  071A  80 02      .R..                  SJMP    DELAY_LOOP
1572  071C  7E F0             DEL240MS:      MOV     R6,#240                  ;240ms delay.

1574  071E  12 08 08   ..C.   DELAY_LOOP:    LCALL   UPDTE_SERVO
1575  0721  DE FB      .R..                  DJNZ    R6,DELAY_LOOP
1576  0723  22                               RET

ER  LINE  ADDR  OBJECT     TYPE

1578                                  ;******************************************
1579                                  ;              UPDATE AUXILLARY PORT X
1580                                  ;******************************************
1581                                  ;Output solenoid drives on Port X.
```

```
1582                                   ;------------------------------------------
1583  0724  55 4C      .D..     ON_SOL:        ANL    A,PORTX_LATCH
1584  0726  80 02      .R..                    SJMP   SAVE_PORTX
1585  0728  45 4C      .D..     OFF_SOL:       ORL    A,PORTX_LATCH
1586  072A  F5 4C      .D..     SAVE_PORTX:    MOV    PORTX_LATCH,A
1587  072C  90 90 00                           MOV    DPTR,#PORTX
1588  072F  F0                                 MOVX   @DPTR,A
1589  0730  22                                 RET

1591                                   ;**************************************************
1592                                   ;              UPDATE PORT_C 8155
1593                                   ;**************************************************
1594  0731  90 B8 03                ON_BIT:        MOV    DPTR,#PORTC      ;PC4, PC5 = 0.
1595  0734  E0                                     MOVX   A,@DPTR
1596  0735  5C                                     ANL    A,R4
1597  0736  F0                                     MOVX   @DPTR,A
1598  0737  22                                     RET
1599  0738  90 B8 03                OFF_BIT:       MOV    DPTR,#PORTC      ;PC4, PC5 = 1.
1600  073B  E0                                     MOVX   A,@DPTR
1601  073C  4C                                     ORL    A,R4
1602  073D  F0                                     MOVX   @DPTR,A
1603  073E  22                                     RET
1604  073F  54 0F                   OUT_STEP:      ANL    A,#00001111B     ;Mask out upper nibble
1605  0741  FC                                     MOV    R4,A             ;of stepper output.
1606  0742  90 B8 03                               MOV    DPTR,#PORTC
1607  0745  E0                                     MOVX   A,@DPTR
1608  0746  54 F0                                  ANL    A,#11110000B     ;Do not disturb other bits
1609  0748  4C                                     ORL    A,R4             ;of PORT C.
1610  0749  F0                                     MOVX   @DPTR,A
1611  074A  22                                     RET

ER   LINE  ADDR  OBJECT        TYPE

1634                                   ;****************************************
1635                                   ;       CHECK FOR KEY DEPRESSION
1636                                   ;****************************************
1637  0766  90 C0 00                CHKKBD:        MOV    DPTR,#KEYBD      ;Check for UPI Output Buffer
1638  0769  E0                                     MOVX   A,@DPTR          ;Full signal.
1639  076A  A2 E1      .B..                        MOV    C,ACC.1
1640  076C  22                                     RET

ER   LINE  ADDR  OBJECT        TYPE

1642                                   ;**********************************************************************
1643                                   ;       CHECK FOR ANY CHANGE IN STATUS WHEN TRIP LOGIC IS OFF
1644                                   ;**********************************************************************
1645                                   ;Returns to the main routine with:
1646                                   ;       1. the corresponding status bit (in MSG_STAT) updated.
1647                                   ;       2. STAT_FLG set if a status change occurs.
1648                                   ;       3. STAT_FLG cleared if no change of status.
1649                                   ;----------------------------------------------------------------------
```

```
1650  076D  90 B8 01           PEEK_STAT:  MOV   DPTR,#PORIA           ;Read sensors.
1651  0770  E0                             MOVX  A,@DPTR
1652  0771  F5 25        .D..              MOV   SAV_SENSR,A           ;Save reading.
1653  0773  20 2D 04     .BR.              JB    SAV_SENSR.5,NOSET
1654  0776  D2 18        .B..              SETB  TEST_FLG
1655  0778  80 02        .R..              SJMP  CHK_MODSEL
1656  077A  C2 18        .B..  NOSET:      CLR   TEST_FLG
1657                           ;----------------------------------------------
1658                           ;           CHECK MODE SELECTOR
1659                           ;----------------------------------------------
1660  077C  54 03              CHK_MODSEL: ANL   A,#03                 ;Isolate mode selector bits (0,1).
1661  077E  20 3F 06     .BR.              JB    MSG1_STAT.7,SET1      ;Get previous status.
1662  0781  60 0A        .R..              JZ    CHK_XPORT             ;No change if zero.
1664  0785  80 04        .R..              SJMP  CHANGE1
1665  0787  70 04        .R..  SET1:       JNZ   CHK_XPORT             ;No change if not zero.
1666  0789  C2 3F        .B..              CLR   MSG1_STAT.7           ;Tell Control Module MS is home.
1667  078B  D2 3B        .B..  CHANGE1:    SETB  MSG1_STAT.3           ;Tell Main Loop there is a change in status.
1668                           ;----------------------------------------------
1669                           ;           CHECK TRANSPORT PATH
1670                           ;            UNDER TRIP SENSORS
1671                           ;----------------------------------------------
1672  078D  E5 25        .D..  CHK_XPORT:  MOV   A,SAV_SENSR
1673  078F  54 C0                          ANL   A,#0C0H               ;Isolate TRIP bits (6,7).
1674  0791  20 45 0B     .BR.              JB    MSG2_STAT.5,SET2      ;Get previous status.
1675  0794  70 05        .R..              JNZ   NOT_CLEAR
1679  079D  80 05        .R..              SJMP  CHANGE2
1680  079F  70 05        .R..  SET2:       JNZ   CHK_TAPE
1682  07A4  D2 3B        .B..  CHANGE2:    SETB  MSG1_STAT.3

ER  LINE  ADDR  OBJECT        TYPE

1684                           ;----------------------------------------------
1685                           ;           CHECK TAPE SUPPLY
1686                           ;----------------------------------------------
1687  07A6  20 43 05     .BR.  CHK_TAPE:   JB    MSG2_STAT.3,SET4      ;Check tape supply status.
1688  07A9  30 2B 0B     .BR.              JNB   SAV_SENSR.3,CHK_H2O   ;No change if both 0.
1689  07AC  80 03        .R..              SJMP  CHANGE4
1690  07AE  20 2B 06     .BR.  SET4:       JB    SAV_SENSR.3,CHK_H2O   ;No change if both 1.
1691  07B1  A2 2B        .B..  CHANGE4:    MOV   C,SAV_SENSR.3
1692  07B3  92 43        .B..              MOV   MSG2_STAT.3,C         ;Tell CM current status of tape supply.
1693  07B5  D2 3B        .B..              SETB  MSG1_STAT.3

ER  LINE  ADDR  OBJECT        TYPE

1708                           ;*****************************************
1709                           ;*****  UPDATE SERVO CONTROL ELEMENTS  *****
1710                           ;*****************************************
1711                                       ORG   800H
1712  0800  01                 MOVE_TAB:   DB    1                     ;Motion spec table.
1713  0801  00                             DB    LOW(MAX_CNT)
1714  0802  FA                             DB    HIGH(MAX_CNT)
1715  0803  03                             DB    3
1716  0804  1A                             DB    BMAX_RUN
1717  0805  01                             DB    1
```

```
1718  0806  C3                    DUMMY_CALL:      CLR     C                       ;For dummy call when SDK-51
1719  0807  22                                     RET                             ;is not in used.

1721                               ;****************************************
1722                               ;        COMPUTE MOTION TRAJECTORY
1723                               ;****************************************
1724  0808  53 D0 E7     .D..     UPDTE_SERVO:     ANL     PSW,#11100111B          ;Insure Reg Bank is 0!!!
1725  080B  30 0C 04     .BR.                      JNB     RUN_FLG,CONST_SPEED     ;0= constant speed mode.
1726  080E  31 CC        .C..                      ACALL   COMP_ACCEL              ;1= accel/deccel (time varying) mode
1727  0810  F5 35        .D..                      MOV     RUN_SPEED,A             ;Save speed result.
1728  0812  85 35 38     .DD.     CONST_SPEED:     MOV     AUX_REG,RUN_SPEED       ;Convert result to double precisio
1729  0815  75 F0 00     .D..                      MOV     B,#00                   ;Integrate speed to get distance:
1730  0818  78 2F        .D..                      MOV     R0,#POSN_ACC            ;Target trajectory (in abs posn)
1731  081A  31 93        .C..                      ACALL   INTEGRATE               ;in POSN_ACC register.

1733                               ;****************************************
1734                               ;        UPDATE ABSOLUTE POSITIONS
1735                               ;****************************************
1736  081C  30 08 08     .BR.                      JNB     DCMDIR_FLG,INCR_INDEX   ;Sign convention of speed
1737  081F  E5 38        .D..                      MOV     A,AUX_REG               ;for CCW or CW rotation
1738  0821  60 07        .R..                      JZ      INCR_INDEX              ;needed for absolute posn
1739  0823  F4                                     CPL     A                       ;hookeeping and desired
1740  0824  04                                     INC     A                       ;signed encoder count reading
1741  0825  F5 38        .D..                      MOV     AUX_REG,A               ;CCW=0=pos cnting; CW=1=neg.
1742  0827  75 F0 FF     .D..                      MOV     B,#0FFH
1743  082A  30 96 08     .BR.     INCR_INDEX:      JNB     P1.6,METER_ACTIVE       ;1 =base drive active/meter passive
1744  082D  31 65        .C..     BASE_ACTIVE:     ACALL   TRACK_BASE              ;0 =meter drive active/base passive
1745  082F  78 10        .D..                      MOV     R0,#COMP_CNT            ;     : desired line ctr reading.
1746  0831  31 93        .C..                      ACALL   INTEGRATE
1747  0833  80 0D        .R..                      SJMP    COMP_K1K2
1748  0835  30 10 02     .BR.     METER_ACTIVE:    JNB     TEACH_FLG,NO_TEACH
1749  0838  31 06        .C..                      ACALL   GETOFFSET
1750  083A  31 59        .C..     NO_TEACH:        ACALL   TRACK_METER
1751  083C  31 90        .C..     SKIP_MINDEX:     ACALL   ADJSGN                  ;Get 2's cpl because convention
1752  083E  78 10        .D..                      MOV     R0,#COMP_CNT            ;is opposite dir of counting.
1753  0840  31 93        .C..                      ACALL   INTEGRATE

ER  LINE  ADDR  OBJECT       TYPE

1755                               ;********************************************
1756                               ;        COMPUTE ALGORITHM VARIABLES
1757                               ;          FOR NEXT SAMPLING INSTANT
1758                               ;********************************************
1759  0842  D2 D4        .B..     COMP_K1K2:       SETB    PSW.4                   ;Select Register Bank 2.
1760  0844  90 00 FF                               MOV     DPTR,#COEFF1            ;K1 =-[COEFF1 x signed last error cnt]
1761  0847  E5 2A        .D..                      MOV     A,ERR_CNT               ;Get last sampling instant's err cnt.
1762  0849  30 E7 06     .BR.                      JNB     ACC.7,POS_ERR           ;Get absolute value if negative.
1763  084C  F4                    NEG_ERR:         CPL     A
1764  084D  04                                     INC     A
1765  084E  31 E1        .C..                      ACALL   XRTN
1766  0850  80 04        .R..                      SJMP    SAV_K1                  ;Result is +, ie., -(-K1).
1767  0852  31 E1        .C..     POS_ERR:         ACALL   XRTN
1768  0854  31 FB        .C..                      ACALL   TWOS_CPL                ;Result is -, ie., -(+K1).
1769  0856  FA                    SAV_K1:          MOV     R2,A                    ;Save result.
```

```
1770  0857  AB F0        .D..                MOV    R3,B
1771                                                               ;K2 =-[COEFF2/256 x signed last output]
1772  0859  20 5F 0C     .BR.   CMPTK2:      JB     K2H.7,NEG_DC    ;Get abs value of last sampling
1773  085C  85 2B 83     .DD.   POS_DC:      MOV    DPH,K2H         ;instant's algorithm output if (-).
1774  085F  85 2C 82     .DD.                MOV    DPL,K2L
1775  0862  31 B7        .C..                ACALL  COMP_K2          ;Multiply with COEFF2 constant.
1776  0864  31 FB        .C..                ACALL  TWOS_CPL          ;Result is (-), ie., -K2.
1777  0866  80 0E        .R..                SJMP   PARTIAL
1778  0868  E5 2C        .D..   NEG_DC:      MOV    A,K2L
1779  086A  85 2B F0     .DD.                MOV    B,K2H
1780  086D  31 FB        .C..                ACALL  TWOS_CPL
1781  086F  F5 82        .D..                MOV    DPL,A
1782  0871  85 F0 83     .DD.                MOV    DPH,B
1783  0874  31 B7        .C..                ACALL  COMP_K2           ;Result is (+), ie., =(-K2).
1784  0876  2A                  PARTIAL:     ADD    A,R2            ;Compute algorithm partial result,
1785  0877  FA                               MOV    R2,A              ;K1 regs =K1 + K2.
1786  0878  E5 E0        .D..                MOV    A,B
1787  087A  3B                               ADDC   A,R3
1788  087B  FB                               MOV    R3,A

ER  LINE  ADDR  OBJECT       TYPE

1790                                ;**********************************************
1791                                ;       WAIT FOR SAMPLING PERIOD TIMEOUT
1792                                ;**********************************************
1793  087C  90 88 03            WAIT_1MS:    MOV    DPTR,#PORTC     ;Select active encoder buffer.
1794  087F  E0                               MOVX   A,@DPTR
1795  0880  B2 E5        .B..                CPL    ACC.5
1796  0882  F0                               MOVX   @DPTR,A
1797  0883  B2 B5        .B..                CPL    P3.5            ;Trigger 5v hardware watchdog.
1798  0885  15 82        .D..                DEC    DPL             ;Preset DPTR and B.
1799  0887  75 F0 68     .D..                MOV    B,#LOW(COEFF0)
1800  088A  D2 38        .B..                SETB   WTCHDOG_FLG     ;Must be set when T1 interrupts to
1801  088C  30 38 19     .BR.   WAIT_T1:     JNB    WTCHDOG_FLG,T1_DONE ;indicate pgrm is in sync with
1802  088F  30 14 FA     .BR.                JNB    HOME_FLG,WAIT_T1          ;servo sampling clock.
1803  0892  C2 AF        .B..                CLR    EA              ;Prevent interrupt because DPTR
1804  0894  15 82        .D..                DEC    DPL             ;is changed to PORTA; wait until
1805  0896  E0                               MOVX   A,@DPTR         ;portA is read and DPTR is restored.
1806  0897  A3                               INC    DPTR            ;Bump DPTR to PORTB.
1807  0898  D2 AF        .B..                SETB   EA
1808  089A  54 04                            ANL    A,#04
1809  089C  70 EE        .R..                JNZ    WAIT_T1         ;Home was seen if not zero.
1810  089E  31 A7        .C..                ACALL  READ1_XCTR
1811  08A0  FE                               MOV    R6,A            ;Store reading to SAVE_LATCH.
1812  08A1  C2 14        .B..                CLR    HOME_FLG        ;Tell caller home count is latched.
1813  08A3  75 41 01     .D..                MOV    CYC_CTR,#01     ;Tell motion timing housekeeper to stop
1814  08A6  80 E4        .R..                SJMP   WAIT_T1         ;motion.
1816  08A8  A3                  T1_DONE:     INC    DPTR            ;Select passive external ctr.
1817  08A9  E0                               MOVX   A,@DPTR
1818  08AA  B2 E5        .B..                CPL    ACC.5
1819  08AC  F0                               MOVX   @DPTR,A
1820  08AD  B2 B5        .B..                CPL    P3.5            ;Re-arm watchdog.
1821  08AF  7F 04                            MOV    R7,#TC_SAMP/TC_T1INT    ;Reload T1 timeout counter.
1822  08B1  C2 D4        .B..                CLR    PSW.4           ;Restore to RB0.
```

```
1823  08B3  31 B1         .C..                     ACALL   TRACKTIME
1824  08B5  31 33         .C..                     ACALL   COMP_VPASSIVE    ;Compute passive velocity.
1825  08B7  20 96 04      .BR.                     JB      P1.6,METER_PASSIVE
1826  08BA  31 65         .C..   BASE_PASSIVE:     ACALL   TRACK_BASE
1827  08BC  80 04         .R..                     SJMP    CHK30VOLT
1828  08BE  31 9D         .C..   METER_PASSIVE:    ACALL   ADJSGN
1829  08C0  31 59         .C..                     ACALL   TRACK_METER
1830  08C2  20 B3 05      .BR.   CHK30VOLT:        JB      P3.3,EX_UPDTE    ;=0 30VDC dips down beyond tolerance.
1831  08C5  D2 40         .B..                     SETB    LO30VDC_FLG
1832  08C7  02 00 BF      ..C.                     JMP     IFATAL           ;Force return to fatal error trap.
1833  08CA  20 30 01      .BR.   EX_UPDTE:         JB      TRIPEN_FLG,CHK_FEED
1834  08CD  22                                     RET

ER  LINE  ADDR  OBJECT    TYPE

    1836                         ;*************************************************************
    1837                         ;                  CHECK MAIL FEED WHEN IN PRINT CYCLE
    1838                         ;*************************************************************
    1839                         ;Detects trips at the transport path to give the ff. info:
    1840                         ;        1. time when next mail is detected at TRIP1 for its speed
    1841                         ;           calculation in next cycle.
    1842                         ;
    1843                         ;
    1844                         ;
    1845                         ;
    1846                         ;Returns to main routine with:
    1847                         ;        1. TRIP sensors status updated.
    1848                         ;        2. TR1_FLG set if TRIP1 sensor is tripped (0 to 1 transition).
    1849                         ;        3. TR2_FLG set if TRIP2 sensor is tripped.
    1850                         ;        4. No change in flags' state if no trip is detected.
    1851                         ;------------------------------------------------------------
    1852  08CE  90 88 01             CHK_FEED:   MOV     DPTR,#PORTA            ;Read sensors.
    1853  08D1  E0                               MOVX    A,@DPTR
    1854  08D2  FC                               MOV     R4,A                   ;Save reading.
    1855  08D3  20 11 13   .BR.                  JB      TR1_FLG,CHK_TR2        ;TR1_FLG =1 TRIP1 tripped;  =0 not yet.
    1856  08D6  20 E6 02   .BR.      CHK_TR1:    JB      ACC.6,$+5              ;Check for 0 to 1 Xition at TRIP1
    1857  08D9  80 1E      .R..                  SJMP    UPD_TRIP               ;No trip.
    1858  08DB  30 2E 02   .BR.                  JNB     SAV_SENSR.6,TR1_TRIPPED ;Tripped if previous status is 0.
    1859  08DE  80 19      .R..                  SJMP    UPD_TRIP
    1872  08F9  8C 25      .D..      UPD_TRIP:   MOV     SAV_SENSR,R4           ;Update TRIP status.
    1873  08FB  30 11 07   .BR.                  JNB     TR1_FLG,EX_CHKFEED
ER  LINE  ADDR  OBJECT     TYPE

    1879                             ;******************************************************
    1880                             ;        READ PASSIVE VELOCITY AS EXTERNAL COMMAND
    1881                             ;******************************************************
    1882  0906  31 A4      .C..      GETOFFSET:  ACALL   READ_XCTR          ;Interpret velocity of disabled (passive)
    1883  0908  C5 47      .D..                  XCH     A,TEACH_CTR        ;dc motor as servo command to the enabled
    1884  090A  F4                               CPL     A                  ;(active) dc motor.
    1885  090B  04                               INC     A
    1886  090C  25 47      .D..                  ADD     A,TEACH_CTR
    1887  090E  30 18 1E   .BR.                  JNB     TEST_FLG,MANUAL         ;=1 motion record or playback
    1888  0911  FC                   RECPLAYB:   MOV     R4,A                    ;=0 manual motion.
```

```
0912  85 1E 82   .DD.                       MOV    DPL,GP_PTR          ;mode: =0 return to caller.
0915  85 1F 83   .DD.                       MOV    DPH,GP_PTR+1
0918  A3                                    INC    DPTR
0919  E5 83      .D..                       MOV    A,DPH
091B  B4 40 03   ..R.                       CJNE   A,#40H,GOODMEM      ;End_of_memory_blocks?
091E  C2 10      .B..                       CLR    TEACH_FLG
0920  22                                    RET
0921  20 1E 04   .BR.   GOODMEM:            JB     RECALL_FLG,PLAYBACK
0924  EC                                    MOV    A,R4           ;Get passive velocity (lo_byte).
0925  F0                RECORD:             MOVX   @DPTR,A        ;Record into memory.
0926  80 01      .R..                       SJMP   SAVEPTR
0928  E0                PLAYBACK:           MOVX   A,@DPTR        ;Recall passive velocity count.
0929  85 82 1E   .DD.   SAVEPTR:            MOV    GP_PTR,DPL
092C  85 83 1F   .DD.                       MOV    GP_PTR+1,DPH
092F  F5 38      .D..   MANUAL:             MOV    AUX_REG,A
0931  80 1E      .R..                       SJMP   TO16BITS       ;Convert to 16 bits.

                        ;*******************************************
                        ;       COMPUTE PASSIVE LOAD VELOCITY
                        ;*******************************************
0933  78 02             COMP_VPASSIVE:      MOV    R0,#02
0935  31 A4      .C..   READ_AGAIN:         ACALL  READ_XCTR
0937  C3                                    CLR    C
0938  FC                                    MOV    R4,A           ;Save count read.
0939  95 37      .D..                       SUBB   A,OLD_READ     ;Passive velocity = new read-old read.
093B  F5 38      .D..                       MOV    AUX_REG,A      ;Save SGN(passive vel).
093D  30 E7 02   .BR.                       JNB    ACC.7,VALIDATE
0940  F4                                    CPL    A
0941  04                                    INC    A
0942  B4 0A 01   ..R.   VALIDATE:           CJNE   A,#10,$+4      ;Check if valid.
0945  D3                                    SETB   C
0946  40 05      .R..                       JC     GOODREAD       ;Good read if set;
0948  D8 EB      .R..                       DJNZ   R0,READ_AGAIN  ;Read again if invalid.
094A  75 38 00   .D..                       MOV    AUX_REG,#00    ;Make passive speed =0 if still invalid.
094D  8C 37      .D..   GOODREAD:           MOV    OLD_READ,R4    ;Update old reading with new read.
094F  E5 38      .D..                       MOV    A,AUX_REG
0951  33                TO16BITS:           RLC    A              ;Convert to signed 16 bits.
0952  E4                                    CLR    A                  ;High byte in B.
0953  50 01      .R..                       JNC    LOADB
0955  F4                                    CPL    A
0956  F5 F0      .D..   LOADB:              MOV    B,A            ;Hbyte in B reg.
0958  22                EX_COMPVP:          RET

                        ;*******************************************
                        ;       CONVERT RELATIVE TO ABSOLUTE
                        ;             LOAD POSITION COUNT
                        ;*******************************************
0959  30 09 36   .BR.   TRACK_METER:        JNB    METER_FLG,EX_ABS        ;Do not track if disabled.
095C  78 33      .D..                       MOV    R0,#METER_INDEX         ;Pointer to meter index reg.
095E  31 93      .C..                       ACALL  INTEGRATE               ;Integrate computed velocity.
0960  90 03 E8                              MOV    DPTR,#METER_1REV        ;DPTR = meter drv 1 rev count.
0963  80 07      .R..                       SJMP   COMP_ABS
0965  78 31      .D..   TRACK_BASE:         MOV    R0,#BASE_INDEX          ;Pointer to base index reg.
0967  31 93      .C..                       ACALL  INTEGRATE               ;Integrate computed velocity.
0969  90 0A 00                              MOV    DPTR,#BASE_1REV         ;DPTR = base drv 1 rev count.
096C  E6                COMP_ABS:           MOV    A,@R0
```

```
1945  096D  30 E7 09    .BR.                JNB    ACC.7,ABS1      ;Convert index to a positive value
1946  0970  18                              DEC    R0              ;relative to the home position count.
1947  0971  C6                              XCH    A,@R0            ;IF SGN(index) is negative
1948  0972  25 82       .D..                ADD    A,DPL              ;THEN index =index + 1 rev count
1949  0974  C6                              XCH    A,@R0              ;ELSE
1950  0975  35 83       .D..                ADDC   A,DPH
1951  0977  08                              INC    R0
1952  0978  F6                              MOV    @R0,A            ;Endif.
1953  0979  18                  ABS1:       DEC    R0              ;Convert positive index value to an
1954  097A  C3                              CLR    C               ;absolute position count starting from
1955  097B  E5 82       .D..                MOV    A,DPL           ;home (zero) count.
1956  097D  96                              SUBB   A,@R0            ;temp =1 rev count - index
1957  097E  FC                              MOV    R4,A
1958  097F  E5 83       .D..                MOV    A,DPH
1959  0981  08                              INC    R0
1960  0982  96                              SUBB   A,@R0
1961  0983  30 E7 0C    .BR.                JNB    ACC.7,EX_ABS     ;IF SGN(temp) is negative
1962  0986  CC                              XCH    A,R4               ;THEN index = (-temp)
1963  0987  F4                              CPL    A                  ;ELSE
1964  0988  24 01                           ADD    A,#01
1965  098A  18                              DEC    R0
1966  098B  F6                              MOV    @R0,A
1967  098C  CC                              XCH    A,R4
1968  098D  F4                              CPL    A
1969  098E  34 00                           ADDC   A,#00
1970  0990  08                              INC    R0
1971  0991  F6                              MOV    @R0,A
1972  0992  22                  EX_ABS:     RET                     ;Endif.

ER  LINE  ADDR  OBJECT      TYPE

1974                                ;****************************************
1975                                ;        INTEGRATE VELOCITY COUNT
1976                                ;****************************************
1977  0993  E6                  INTEGRATE:  MOV    A,@R0           ;R0 holds index address lobyte.
1978  0994  25 38       .D..                ADD    A,AUX_REG       ;AUX_REG =signed velocity count
1979  0996  F6                              MOV    @R0,A            ;in counts/sample.
1980  0997  08                              INC    R0
1981  0998  E5 F0       .D..                MOV    A,B
1982  099A  36                              ADDC   A,@R0
1983  099B  F6                              MOV    @R0,A
1984  099C  22                              RET

1986                                ;*********************************************
1987                                ;        COMPLEMENT 16-BIT VELOCITY COUNT
1988                                ;*********************************************
1989  099D  E5 38       .D..    ADJSGN:     MOV    A,AUX_REG       ;lo_byte in AUX_REG
1990  099F  31 FB       .C..                ACALL  TWOS_CPL        ;hi_byte in B.
1991  09A1  F5 38       .D..                MOV    AUX_REG,A
1992  09A3  22                              RET

1994                                ;*******************************************
1995                                ;        READ EXTERNAL COUNTER BUFFER
1996                                ;*******************************************
```

```
1997  09A4  90 88 02                 READ_XCTR:      MOV     DPTR,#PORTB
1998  09A7  E0                       READ1_XCTR:     MOVX    A,@DPTR          ;Read buffer.
1999  09A8  F5 38          .D..                      MOV     AUX_REG,A
2000  09AA  E0                                       MOVX    A,@DPTR
2001  09AB  B5 38 01       .DR.                      CJNE    A,AUX_REG,RE_READ
2002  09AE  22                                       RET
2003  09AF  E0                       RE_READ:        MOVX    A,@DPTR          ;Best of 3 readings.
2004  09B0  22                       EX_READXCTR:    RET

2006                                 ;*****************************************
2007                                 ;    UPDATE SYSTEM REAL-TIMEKEEPING
2008                                 ;*****************************************
2009  09B1  0A                       TRACKTIME:      INC     R2                      ;R2 counts 1ms-interval.
2010  09B2  BA 00 01       ..R.                      CJNE    R2,#00,EX_TRACKT        ;R3 counts 256ms-interval.
2011  09B5  0B                                       INC     R3                      ;Must be in RB0.
2012  09B6  22                       EX_TRACKT:      RET

ER    LINE  ADDR  OBJECT         TYPE

2014                                 ;********************************************
2015                                 ;        COMPUTE SERVO ALGORITHM VARIABLE
2016                                 ;          (K2 =LAST OUTPUT x COEFF2)
2017                                 ;********************************************
2018                                 ;DPTR =ABS(output) at last sampling instant.
2019                                 ;----------------------------------------
2020  09B7  C3                       COMP_K2:        CLR     C                       ;Limit to maximum absolute
2021  09B8  74 E8                                    MOV     A,#LOW(TC_SAMP)         ;output value, ie., equals
2022  09BA  95 82          .D..                      SUBB    A,DPL                   ;sampling period interval.
2023  09BC  74 03                                    MOV     A,#HIGH(TC_SAMP)
2024  09BE  95 83          .D..                      SUBB    A,DPH
2025  09C0  50 06          .R..                      JNC     XK2
2026  09C2  75 83 03       .D..                      MOV     DPH,#HIGH(TC_SAMP)
2027  09C5  75 82 E8       .D..                      MOV     DPL,#LOW(TC_SAMP)
2028  09C8  74 50                    XK2:            MOV     A,#COEFF2               ;Multiply output by COEFF2
2029  09CA  80 06          .R..                      SJMP    BINFRAC                 ;algorithm constant.

2031                                 ;****************************************
2032                                 ;         COMPUTE POSITION COUNT IN
2033                                 ;            ACCELERATION PHASE
2034                                 ;****************************************
2035                                 ;Accel posn =accel rate x time displacement
2036                                 ;----------------------------------------
2037  09CC  8F 82          .D..      COMP_ACCEL:     MOV     DPL,R7           ;DPTR =motion real-timekeeping regs,
2038  09CE  8D 83          .D..                      MOV     DPH,R5           ;ie., time displacement in millisec.
2039  09D0  E5 45          .D..                      MOV     A,ACCELK         ;Get accel rate, counts/ms^2.

2041                                 ;****************************************
2042                                 ;         FIXED-POINT BINARY-INTEGER
2043                                 ;              MULTIPLICATION
2044                                 ;****************************************
2045                                 ;DPTR =integer :ACC =binary fraction (N/256)
2046                                 ;----------------------------------------
2047  09D2  31 E1          .C..      BINFRAC:        ACALL   XRTN          ;Do an integer multiply, integer x N.
2048  09D4  A2 E7          .B..      DIV256:         MOV     C,ACC.7       ;Divide result by 256.
```

```
2049  09D6  E5 F0     .D..       MOV   A,B        ;Shift 1 byte to left R4, B, ACC.
2050  09D8  34 00                ADDC  A,#00      ;Round off to nearest integer.
2051  09DA  CC                   XCH   A,R4       ;Result low byte = ACC.
2052  09DB  34 00                ADDC  A,#00      ;Result high byte = B.
2053  09DD  F5 F0     .D..       MOV   B,A
2054  09DF  EC                   MOV   A,R4
2055  09E0  22                   RET

ER  LINE  ADDR  OBJECT   TYPE

2057                        ;*****************************************
2058                        ;       DOUBLE-PRECISION INTEGER
2059                        ;           MULTIPLICATION
2060                        ;*****************************************
2061                        ;Multiplier (positive 8 bits) =ACC
2062                        ;Multiplicand (positive 16 bits) =DPTR
2063                        ;Product result in R4 (msd), B, ACC (lsd).
2064                        ;-----------------------------------------
2065  09E1  FC                  XRTN:  MOV   R4,A      ;Compute product low byte.
2066  09E2  85 82 F0  .DD.             MOV   B,DPL          ;Load multiplicand low byte
2067  09E5  A4                         MUL   AB             ;Multiplier saved to R4.
2068  09E6  C0 E0     .D..             PUSH  ACC            ;Save product low byte.
2069  09E8  C0 F0     .D..             PUSH  B              ;Save partial product high byte.
2070  09EA  EC                         MOV   A,R4      ;Compute product high byte.
2071  09EB  85 83 F0  .DD.             MOV   B,DPH          ;Load multiplicand high byte.
2072  09EE  A4                         MUL   AB
2073  09EF  D0 83     .D..             POP   DPH            ;Get intermediate prod high byte.
2074  09F1  25 83     .D..             ADD   A,DPH          ;Sum is final prod high byte.
2075  09F3  C5 F0     .D..             XCH   A,B            ;Prod 2nd byte = B.
2076  09F5  34 00                      ADDC  A,#00
2077  09F7  FC                         MOV   R4,A           ;Prod 3rd byte(MSB) = R4.
2078  09F8  D0 E0     .D..             POP   ACC            ;Prod 1st byte(LSB) = ACC
2079  09FA  22                         RET                  ;Return to caller.

2081                        ;********************************
2082                        ;       DOUBLE-PRECISION
2083                        ;       TWOS COMPLEMENT
2084                        ;********************************
2095  09FB  F4              TWOS_CPL:  CPL   A              ;ACC =lo byte.
2086  09FC  24 01                      ADD   A,#01          ;B =hi byte.
2087  09FE  C5 F0     .D..             XCH   A,B
2088  0A00  F4                         CPL   A
2089  0A01  34 00                      ADDC  A,#00
2090  0A03  C5 F0     .D..             XCH   A,B
2091  0A05  22                         RET
2092                        $INCLUDE(NEWCOMRTN.DMS)

ER  LINE  ADDR  OBJECT   TYPE

2094                        ;****************************************
2095                        ;        COMMUNICATION ROUTINES
2096                        ;         TIME DELAY DECLARATIONS
2097                        ;****************************************
```

```
0068            ;Transmitter echoplex protocol time
                ;constants in microsecond.
                ;------------------------------------
0068            BITTX       EQU     104                 ;Bit-to-bit xmit/echo-sample time.
00AA            SBTX        EQU     170                 ;CTS detect to Start Bit time.
0154            NFPTX       EQU     340                 ;No-Error-Pulse width.
046F            BYTETX      EQU     1135                ;Byte-to-byte xmit time.
005C            DELAY1      EQU     (BITTX-12)          ;Delay before xmitting 1st data bit.
0055            DELAY2      EQU     (BITTX-19)          ;Delay before xmitting next data bit.
005C            DELAY3      EQU     (BITTX-12)          ;Delay before sampling EOM/EOB.
005B            DELAY4      EQU     (BYTETX-(BITTX*10)-4)    ;Delay before next byte xmit.
                ;-----------------------------------------------
                ;Receiver echoplex protocol time constants.
                ;-----------------------------------------------
0064            CTSRX       EQU     100                 ;RTS detect to CTS xmit time.
002A            SBRX        EQU     42                  ;SB detect to SB echo time.
0078            BITIRX      EQU     120                 ;SB detect to 1st bit sample time.
008C            ECHIRX      EQU     140                 ;SB detect to 1st data bit echo time.
006A            BITRX       EQU     106                 ;Bit-to-bit sample/xmit-echo time.
04A4            NEPRX       EQU     1188                ;SB detect to NEP sample time.
0610            BYTERX      EQU     1552                ;Time until next receiver activity.
0050            DELAY5      EQU     (CTSRX-20)          ;Delay before xmitting CTS.
0048            DELAY6      EQU     (BITIRX-SBRX-3) ;Delay before sampling 1st data bit.
0012            DELAY7      EQU     (ECHIRX-BITIRX-2) ;Delay before echoing recv'd bit.
0050            DELAY8      EQU     (BITRX-DELAY7-8)  ;Delay before sampling next data bit.
008E            DELAY9      EQU     (BYTETX-(BITIRX+BITRX*8)-25) ;Delay before next byte recv.
00C3            DELAY10     EQU     (NEPRX-BYTETX+DELAY9)    ;Delay before sampling NEP.
016C            DELAY11     EQU     (BYTERX-NEPRX)           ;Delay before recv rtn exit.

                ;********************************************
                ;       MACRO TO GENERATE CODE FOR
                ;               TIME DELAYS
                ;********************************************
                TIME        MACRO   DVND
                            IF      (DVND MOD 2) EQ 0
                            MOV     R2,#((DVND-2)/2)
                            DJNZ    R2,$
                            NOP
                            ELSE
                            MOV     R2,#(DVND/2)
                            DJNZ    R2,$
                            ENDIF
                            ENDM
```

```
ER  LINE ADDR  OBJECT      TYPE

                ;****************************************
                ;       TRANSMIT MESSAGE TO SOURCE
                ;****************************************
                ;RECVER_FLG =0 xmit thru serial line; =1 thru display.
                ;---------------------------------------------------
     0A06  E4               XMIT_STAT:    CLR     A
     0A07  71 58       .C..               ACALL   XCOMPREP          ;Transmit system status.
     0A09  30 20 0C    .BR.               JNB     RECVER_FLG,STAT_SERIAL
```

```
2150 0A0C 12 E0 0F                        LCALL  CLRDSP
2151 0A0F AA 28     .D..                  MOV    R2,MSG2_STAT
2152 0A11 AB 27     .D..                  MOV    R3,MSG1_STAT
2153 0A13 12 E0 18                        LCALL  DSP2BY
2154 0A16 41 9C     .C..                  AJMP   END_OF_XMIT
2155 0A18 79 26     .D..   STAT_SERIAL:   MOV    R1,#STAT_HEADER
2156 0A1A 7D 03                           MOV    R5,#03
2157 0A1C 75 26 80  .D..                  MOV    STAT_HEADER,#80H
2158 0A1F 41 39     .C..                  AJMP   XMIT_RIN
2159 0A21 74 02            XMIT_CMMDC:    MOV    A,#02
2160 0A23 71 58     .C..                  ACALL  XCOMPREP       ;Transmit command-execution-complete.
2161 0A25 30 20 0A  .BR.                  JNB    RECVER_FLG,CMMDC_SERIAL
2162 0A28 12 E0 0F                        LCALL  CLRDSP
2163 0A2B AA 58     .D..                  MOV    R2,TRIP_CTR+1
2164 0A2D 12 E0 15                        LCALL  DSP1BY
2165 0A30 41 9C     .C..                  AJMP   END_OF_XMIT
2166 0A32 79 2D     .D..   CMMDC_SERIAL:  MOV    R1,#CMMD_HEADER
2167 0A34 7D 02                           MOV    R5,#02
2168 0A36 75 2D 83  .D..                  MOV    CMMD_HEADER,#83H

2170                       ;*******************************************
2171                       ;      TRANSMISSION ECHOPLEX ROUTINE
2172                       ;            ( 12 MHZ CLOCK )
2173                       ;*******************************************
2174                       ;CAUTION: Instruction code, sequence, and loops
2175                       ;       are critical to time delay computations.
2176                       ;R0 =pointer to time constant watchdog.
2177                       ;R1 =start addrs of xmitting buffer.
2178                       ;R2 =timer delay constants register.
2179                       ;R3 =save area for byte to be xmitted.
2180                       ;R4 =communication failure counter.
2181                       ;R5 =no. of bytes to be xmitted.
2182                       ;R6 =stack pointer save area for wtchdg timeout.
2183                       ;R7 =save area for no. of data bits per byte.
2184                       ;-------------------------------------------
2185 0A39 D2 B1     .B..   XMIT_RIN:      SETB   P3.1           ;Xmit RTS.
2186 0A3B 30 B0 FD  .BR.                  JNB    P3.0,$         ;Wait CTS until wtchdog times out.
2187 0A3E                                 TIME   SBTX           ;Delay before xmitting Start Bit.
2194 0A43 C2 B1     .B..   START_XMIT:    CLR    P3.1           ;Xmit Start Bit.
2195 0A45 7F 08                           MOV    R7,#08         ;Load no. of data bits per byte.

ER   LINE ADDR OBJECT      TYPE

2196 0A47 C3                              CLR    C
2197 0A48 92 1D     .B..                  MOV    SAVE1_BIT,C    ;First N-1 bit is Start Bit, ie., 0.
2198 0A4A E7                              MOV    A,@R1          ;Get byte to be xmitted.
2199 0A4B FB                              MOV    R3,A           ;Save to work area.
2200 0A4C 09                              INC    R1             ;Points to next byte.
2201 0A4D                                 TIME   DELAY1         ;Delay before xmitting first data bit.
2208 0A52 EB               BITOUT:        MOV    A,R3
2209 0A53 13                              RRC    A              ;Place bit into C.
2210 0A54 FB                              MOV    R3,A
2211 0A55 92 B1     .B..                  MOV    P3.1,C         ;Transmit Nth bit (C).
2212 0A57 71 86     .C..                  ACALL  CHK_ECHO       ;Check echo of N-1 bit.
```

```
2213  0A59  30 07 38      .BR.                    JNB    COMERR_FLG,XMITERR   ;Echo error if set.
2214  0A5C  92 1D         .B..                    MOV    SAVE1_BIT,C          ;Save N bit, ie., N+1 bit = N.
2215  0A5E                                        TIME   DELAY2               ;Delay before xmitting next data bit.
2221  0A62  DF EE         .R..                    DJNZ   R7,BITOUT            ;All data bits xmitted?
2222  0A64  00                                    NOP                         ;NOP to balance bit-to-bit delay.
2223  0A65  DD 18         .R..                    DJNZ   R5,XMIT_EOB          ;End-of-Msg if zero, else, End-of-Byte.
2224  0A67  C2 B1         .B..    XMIT_EOM:       CLR    P3.1                 ;Xmit EOM.
2225  0A69  71 86         .C..                    ACALL  CHK_ECHO             ;Check echo of last data bit.
2226  0A6B  30 07 26      .BR.                    JNB    COMERR_FLG,XMITERR
2227  0A6E                                        TIME   DELAY3               ;Delay before reading EOM/EOB echo.
2234  0A73  20 B0 1E      .BR.                    JB     P3.0,XMITERR         ;Check EOM echo.
2235  0A76  D2 B1         .B..                    SETB   P3.1                 ;Everything is OK; Xmit NEP.
2236  0A78                                        TIME   NEPTX                ;Delay for NEP width.
2243  0A7D  80 1D         .R..                    SJMP   END_OF_XMIT          ;End of xmission.
2244  0A7F  D2 B1         .B..    XMIT_EOB:       SETB   P3.1                 ;Xmit EOB.
2245  0A81  71 86         .C..                    ACALL  CHK_ECHO             ;Check echo of last data bit.
2246  0A83  30 07 0E      .BR.                    JNB    COMERR_FLG,XMITERR
2247  0A86                                        TIME   DELAY3
2254  0A8B  30 B0 06      .BR.                    JNB    P3.0,XMITERR         ;Check EOB echo.
2255  0A8E                                        TIME   DELAY4               ;Delay before start of next byte xmit.
2261  0A92  41 43         .C..                    AJMP   START_XMIT           ;Start xmitting next byte.
2262  0A94  C2 07         .B..    XMITERR:        CLR    COMERR_FLG           ;Indicate communication error.
2263  0A96  C2 B1         .B..                    CLR    P3.1                 ;Drop Xmit line.
2264  0A98  DA FE         .R..                    DJNZ   R2,$                 ;Force an EOM error.
2265  0A9A  DA FE         .R..                    DJNZ   R2,$
2266  0A9C  61 16         .C..    END_OF_XMIT:    AJMP   CHK_COMERR           ;Check for xmit error.

ER   LINE  ADDR  OBJECT        TYPE

2268                                  ;*********************************************
2269                                  ;          RECEIVE MESSAGE FROM SOURCE
2270                                  ;*********************************************
2271  0A9E  85 18 10      .DD.    RECV_MSG:       MOV    OLD_CMMD,CMMD        ;Save current command.
2272  0AA1  75 09 18      .DD.                    MOV    R1_RB1,#CMMD
2273  0AA4  51 B5         .C..                    ACALL  RECV_RTN
2274  0AA6  30 38 03      .BR.                    JNB    STAT_FLG,EX_RECVRTN
2275  0AA9  85 10 18      .DD.                    MOV    CMMD,OLD_CMMD
2276  0AAC  22                    EX_RECVRTN:     RET

2278  0AAD  75 09 38      .DD.    RECV_KCODE:     MOV    R1_RB1,#AUX_REG
2279  0AB0  51 B5         .C..                    ACALL  RECV_RTN
2280  0AB2  E5 38         .D..                    MOV    A,AUX_REG
2281  0AB4  22                                    RET

2283  0AB5  74 04                 RECV_RTN:       MOV    A,#04
2284  0AB7  71 58         .C..                    ACALL  XCOMPREP
2285  0AB9  30 1A 0D      .BR.                    JNB    CMMDSRC_FLG,STRT_RECV
2286  0ABC  12 E6 4C              GETKCODE:       CALL   UPI_IN               ;Use SDK-51 tool.
2287  0ABF  C2 E7         .B..                    CLR    ACC.7
2288  0AC1  F7                                    MOV    @R1,A                ;Save keycode.
2289  0AC2  7A 00                                 MOV    R2,#00
2290  0AC4  12 E6 25                              CALL   UPI_CMD              ;Reset UPI.
2291  0AC7  61 16         .C..                    AJMP   END_OF_RECV
```

```
2293                                    ;****************************************
2294                                    ;        RECEIVE ECHOPLEX ROUTINE
2295                                    ;           ( 12 MHZ CLOCK )
2296                                    ;****************************************
2297                                    ;CAUTION:  Instruction code, sequence, and
2298                                    ;loops are critical to time delay computations.
2299                                    ;R1 =start addrs of msg recv buffer.
2300                                    ;R3 =byte-building register.
2301                                    ;-----------------------------------------
2302  0AC9                              STRT_RECV:       TIME    DELAY5          ;Delay before xmitting CTS.
2309  0ACE  D2 B1          .B..                          SETB    P3.1            ;Transmit CTS.
2310  0AD0  20 B0 FD       .BR.         WAIT_STARTB:     JB      P3.0,$          ;Wait Start Bit until wtchdog times out.
2311  0AD3                                               TIME    SBRX            ;Delay before echoing Start Bit.
2318  0AD8  C2 B1          .B..                          CLR     P3.1            ;Echo Start Bit.
2319  0ADA  7F 08                                        MOV     R7,#08          ;Reset no. of data bits /byte.
2320  0ADC                                               TIME    DELAY6          ;Delay before sampling first data bit.
2326  0AE0  A2 B0          .B..         RECV_BIT:        MOV     C,P3.0          ;Get bit from recv line.
2327  0AE2                                               TIME    DELAY7          ;Delay before echoing recv'd data bit.
2334  0AE7  92 B1          .B..                          MOV     P3.1,C          ;Echo received bit.
2335  0AE9  EB                                           MOV     A,R3            ;Get byte-building register.
2336  0AEA  13                                           RRC     A               ;Move recv'd bit to register.
2337  0AEB  FB                                           MOV     R3,A
2338  0AEC                                               TIME    DELAY8          ;Delay before sampling next data bit.

ER  LINE  ADDR  OBJECT         TYPE

2345  0AF1  DF ED          .R..                          DJNZ    R7,RECV_BIT
2346  0AF3  A2 B0          .B..         BYTE_COMPLETE:   MOV     C,P3.0          ;Sample EOB/EOM.
2347  0AF5                                               TIME    DELAY7
2354  0AFA  92 B1          .B..                          MOV     P3.1,C          ;Echo EOB/EOM.
2355  0AFC  A7 08          .D..                          MOV     @R1,R3_RB1      ;Move byte to msg recv buffer.
2356  0AFE  09                                           INC     R1              ;Points to next byte buffer.
2357  0AFF  50 07          .R..                          JNC     EOM_RECVD       ;What was it, EOB or EOM?
2358  0B01                              EOB_RECVD:       TIME    DELAY9          ;Delay before receiving next byte.
2365  0B06  41 D0          .C..                          AJMP    WAIT_STARTB
2366  0B08                              EOM_RECVD:       TIME    DELAY10         ;Delay before sampling NEP.
2372  0B0C  20 B0 02       .BR.                          JB      P3.0,NO_ERROR   ;No error in received msg if set.
2373  0B0F  C2 07          .B..                          CLR     COMERR_FLG      ;Else, indicate communication error.
2374  0B11                              NO_ERROR:        TIME    DELAY11         ;Delay before rtn becomes ready for next msg.
2381  0B16                              END_OF_RECV      EQU     $
2383                                    ;****************************************
2384                                    ;        COMMUNICATION RTN EXIT
2385                                    ;****************************************
2386  0B16  10 07 0D       .BR.         CHK_COMERR:      JBC     COMERR_FLG,GOODCOM
2387  0B19  D2 38          .B..         BADCOM:          SETB    STAT_FLG         ;Communication error is a soft error.
2388  0B1B  BC FF 05       ..R.                          CJNE    COMERR_CTR,#255,INCOMERR
2389  0B1E  D2 46          .B..                          SETB    BADCOM_FLG       ;Indicate bad comm line error.
2390  0B20  02 02 58       ..C.                          JMP     JFATAL
2391  0B23  0C                          INCOMERR:        INC     COMERR_CTR
2392  0B24  80 02          .R..                          SJMP    COMRETRY
2393  0B26  7C 00                       GOODCOM:         MOV     COMERR_CTR,#00  ;Reset retry ctr
2394  0B28  C2 8C          .B..         COMRETRY:        CLR     TR0             ;Stop watchdog timer.
2395  0B2A  C2 B1          .B..                          CLR     P3.1            ;Drop TX line low.
```

```
2396  082C  C2 D3     .B..                CLR    PSW.3               ;Return to RB0.
2397  082E  C3                            CLR    C                   ;Adjust mainline real-timekeeping,
2398  082F  E5 8A     .D..                MOV    A,TL0               ;ie., compensate for time spent in
2399  0831  25 82     .D..                ADD    A,DPL               ;echoplex communication
2400  0833  FC                            MOV    R4,A                          ;because servo clock was
2401  0834  E5 8C     .D..                MOV    A,TH0                         ;turned off.
2402  0836  35 83     .D..                ADDC   A,DPH
2403  0838  CC                 ITERADJ:   XCH    A,R4                ;Determine no. of sampling period
2404  0839  C3                            CLR    C                             ;that had passed while in
2405  083A  94 E8                         SUBB   A,#LOW(TC_SAMP)                  ;communication.
2406  083C  CC                            XCH    A,R4
2407  083D  94 03                         SUBB   A,#HIGH(TC_SAMP)
2408  083F  40 04     .R..                JC     ADJRMDR
2409  0841  31 81     .C..                ACALL  TRACKTIME           ;Adjust timekeeping registers.
2410  0843  80 F3     .R..                SJMP   ITERADJ
2411  0845  CC                 ADJRMDR:   XCH    A,R4                ;Round off within one sampling
2412  0846  8C F0     .D..                MOV    B,R4                   ;period.
2413  0848  31 FB     .C..                ACALL  TWOS_CPL
2414  084A  C3                            CLR    C
2415  084B  94 F4                         SUBB   A,#LOW(TC_SAMP/2)

ER  LINE  ADDR  OBJECT    TYPE

2416  084D  E5 F0     .D..                MOV    A,B
2417  084F  94 01                         SUBB   A,#HIGH(TC_SAMP/2)
2418  0851  40 02     .R..                JC     ADJDONE
2419  0853  31 81     .C..                ACALL  TRACKTIME
2420  0855  75 8B 06  .D..     ADJDONE:   MOV    TL1,#(-TC_T1INT)
2421  0858  D2 8E     .B..                SETB   TR1                 ;Re-start servo control.
2422  085A  22                            RET                        ;Return to caller.
2424                           ;********************************************
2425                           ;       SET UP COMMUNICATION WATCHDOG
2426                           ;********************************************
2427  085B  C2 8E     .B..     XCOMPREP:  CLR    TR1                 ;Stop servo.
2428  085D  C2 8C     .B..                CLR    TR0                 ;Stop PWM timer.
2429  085F  43 90 03  .D..                ORL    P1,#00000011B       ;Insure no drive to motors.
2430  0862  D2 D3     .B..                SETB   PSW.3               ;Select Register Bank 3.
2431  0864  90 08 80  ..C.                MOV    DPTR,#WTCHDG_TAB
2432  0867  93                            MOVC   A,@A+DPTR
2433  0868  FE                            MOV    R6,A
2434  0869  A3                            INC    DPTR
2435  086A  93                            MOVC   A,@A+DPTR
2436  086B  F5 82     .D..                MOV    DPL,A               ;Save watchdog time interval.
2437  086D  F4                            CPL    A
2438  086E  F5 8A     .D..                MOV    TL0,A               ;Load watchdog timer.
2439  0870  EE                            MOV    A,R6
2440  0871  F5 83     .D..                MOV    DPH,A
2441  0873  F4                            CPL    A
2442  0874  F5 8C     .D..                MOV    TH0,A
2443  0876  D2 07     .B..                SETB   COMERR_FLG          ;Enable communication error flag.
2444  0878  D2 8C     .B..                SETB   TR0                 ;Start watchdog timer.
2445  087A  E5 81     .D..                MOV    A,SP                ;Set-up stack pointer for
2446  087C  14                            DEC    A                   ;forced-return if wtchdog
```

```
2447  087D  14                          DEC     A                       ;times out.
2448  087E  FE                          MOV     R6,A                    ;Save to R6 (RB1).
2449  087F  22                          RET
2450  0880  0F A0         WTCHDG_TAB:   DW      4000                    ;4ms interval.
2451  0882  13 88                       DW      5000                    ;5ms interval.
2452  0884  1F 40                       DW      8000                    ;8ms interval.

2454                      ;*********************************************
2455                      ;        CHECK XMITTED DATA BIT ECHO
2456                      ;*********************************************
2457  0886  20 B0 04  .BR.  CHK_ECHO:     JB      P3.0,ECH_IS_ONE
2458  0889  20 1D 04  .BR.  ECH_IS_ZERO:  JB      SAVE1_BIT,ECHOERR       ;Echo error if not the same.
2459  088C  22                          RET
2460  088D  20 1D 02  .BR.  ECH_IS_ONE:   JB      SAVE1_BIT,$+5
2461  0890  C2 07     .B..  ECHOERR:      CLR     COMERR_FLG              ;Indicate communication error.
2462  0892  22                          RET
2463                      $INCLUDE(METERTN.DMS)

ER   LINE . ADDR  OBJECT      TYPE

2465                      ;*********************************************
2466                      ;*******         METER MODE MAINLINE      ********
2467                      ;*********************************************
2468  0893  C2 B4     .B..  METER_RTNS:   CLR     P3.4                    ;Set busy signal.
2469  0895  10 3D 04  .BR.                JBC     TRIPEN_FLG,COPY_TRIP ;Copy Trip Enable status.
2470  0898  C2 1D     .B..                CLR     SAVE1_BIT
2471  089A  80 06     .R..                SJMP    SEL_STEP2
2472  089C  D2 1D     .B..  COPY_TRIP:    SETB    SAVE1_BIT               ;Suspend status if enabled and
2473  089E  C2 11     .B..                CLR     TR1_FLG                 ;clear associated trip flags.
2474  08A0  C2 12     .B..                CLR     TR2_FLG
2475  08A2  74 FF           SEL_STEP2:    MOV     A,#0FFH
2476  08A4  12 07 3F  ..C.                LCALL   OUT_STEP                ;Turn off base stepper drive.
2477  08A7  C3                          CLR     C
2478  08A8  D1 E6     .C..                ACALL   SWITCH                  ;Switch dcmotor drive.
2479  08AA  20 38 33  .BR.                JB      STAT_FLG,EXIT_MODE  ;Do not proceed if error.
2480  08AD  C2 97     .B..                CLR     P1.7                    ;Select meter I/O.
2481  08AF  E5 18     .D..                MOV     A,CMMD                  ;Parse meter command.
2482  08B1  B4 71 07  ..R.                CJNE    A,#71H,NOT71H

2484                      ;*********************************************
2485                      ;     COMMAND IS COMPLETE INITIALIZATION
2486                      ;*********************************************
2487  08B4  91 30     .C..                ACALL   FIND_SELHOME            ;Find selector home.
2488  08B6  20 38 23  .BR.                JB      STAT_FLG,INITZ_FAIL
2489  08B9  80 15     .R..                SJMP    INITZ_RACK              ;Initialize racks.
2490  08BB  B4 61 01  ..R.  NOT71H:       CJNE    A,#61H,NOT61H

2492                      ;*********************************************
2493                      ;     COMMAND IS NORMAL SELECTION MODE
2494                      ;*********************************************
2495  08BE  C3              NORMAL_MODE:  CLR     C
2496  08BF  20 1C 26  .BR.  NOT61H:       JB      AUTO_FLG,SRC_SDK        ;Automatic random select if set.
2497  08C2  50 1D     .R..                JNC     VALUE_SELECT            ;>61H get postage value from msg.
```

```
2499                                 ;*********************************************
2500                                 ;       COMMAND IS PARTIAL INITIALIZATION
2501                                 ;*********************************************
2502  0BC4  B4 21 07    ..R.  INITZ_NOVA:   CJNE   A,#21H,NOT21H         ;<61H initialization mode.
2503  0BC7  91 30       .C..  INITZ_HOME:   ACALL  FIND_SELHOME          ;=21H find bank selector home.
2504  0BC9  20 3B 10    .BR.                JB     STAT_FLG,INITZ_FAIL
2505  0BCC  80 44       .R..                SJMP   PRE_RETURN
2506  0BCE  40 11       .R..  NOT21H:       JC     VALUE_SELECT          ;>21H initialize racks to 0.
2507  0BD0  30 09 3F    .BR.  INITZ_RACK:   JNB    METER_FLG,PRE_RETURN  ;<21H initialize postage value.
2508  0BD3  D2 0F       .B..                SETB   INITZ_FLG             ;Indicate initialization move.
2509  0BD5  D2 06       .B..                SETB   INHSEL_FLG            ;Disable selection-move inhibit.
2510  0BD7  91 A3       .C..                ACALL  SET_POSTAGE
2511  0BD9  30 3B 2E    .BR.                JNB    STAT_FLG,BACK_HOME
2512  0BDC  D2 47       .B..  INITZ_FAIL:   SETB   INITZERR_FLG

ER   LINE  ADDR  OBJECT      TYPE

2513  0BDE  C2 3A       .B..                CLR    SYS_ENABLE            ;Disable system if failure.
2514  0BE0  22                EXIT_MODE:    RET

2516                                 ;***********************************
2517                                 ;       SELECT POSTAGE VALUE
2518                                 ;***********************************
2519  0BE1  20 1A 04    .BR.  VALUE_SELECT: JB     CMMDSRC_FLG,SRC_SDK
2520  0BE4  91 5D       .C..  SRC_MSG:      ACALL  GET_AMOUNT
2521  0BE6  80 02       .R..                SJMP   VAL1
2522  0BE8  F1 24       .C..  SRC_SDK:      ACALL  ENTER_AMOUNT
2523  0BEA  10 3B 05    .BR.  VAL1:         JBC    STAT_FLG,SETDELAY     ;Any error in getting postage
2524  0BED  20 09 07    .BR.                JB     METER_FLG,STRT_SET
2525  0BF0  91 A3       .C..                ACALL  SET_POSTAGE
2526  0BF2  12 07 1C    ..C.  SETDELAY:     CALL   DFL240MS
2527  0BF5  80 18       .R..                SJMP   PRE_RETURN
2528  0BF7  E5 3D       .D..  STRT_SET:     MOV    A,STEP2          ;Insure selector is in bank drive.
2529  0BF9  12 07 3F    ..C.                CALL   OUT_STEP
2530  0BFC  75 3F 01    .D..                MOV    MASK,#01
2531  0BFF  12 04 AE    ..C.                CALL   STEP_SETTLE
2532  0C02  20 3B 2A    .BR.                JB     STAT_FLG,EX_METERTN   ;Do not proceed if not.
2533  0C05  91 A3       .C..                ACALL  SET_POSTAGE           ;value is soft error.
2534  0C07  20 3B 25    .BR.                JB     STAT_FLG,EX_METERTN
2535  0C0A  C2 0F       .B..  BACK_HOME:    CLR    INITZ_FLG
2536  0C0C  12 05 09    ..C.                CALL   MHOME_MOVE
2537  0C0F  20 3B 10    .BR.                JB     STAT_FLG,EX_METERTN

2539                                 ;****************************************
2540                                 ;       PREPARE RETURN TO CALLER
2541                                 ;****************************************
2542  0C12  E4                PRE_RETURN:   CLR    A                ;Clear new postage buffer.
2543  0C13  79 4D       .D..                MOV    R1,#NEWRACK
2544  0C15  F7                CLR_NEWRACK:  MOV    @R1,A
2545  0C16  09                              INC    R1
2546  0C17  B9 52 FB    .DR.                CJNE   R1,#NEWRACK+NO_OF_RACKS,CLR_NEWRACK
2547  0C1A  74 FF                           MOV    A,#0FFH          ;Select step motor #1 and base
2548  0C1C  12 07 3F    ..C.                LCALL  OUT_STEP         ; mode selector.
2549  0C1F  D3                              SETB   C
```

```
2550  0C20  D1 E6       .C..                 ACALL  SWITCH
2551  0C22  D2 97       .B..                 SETB   P1.7
2552  0C24  E5 3C       .D..                 MOV    A,STEP1
2553  0C26  12 07 3F    ..C.                 LCALL  OUT_STEP
2554  0C29  10 1D 01    .BR.                 JBC    SAVE1_BIT,RSTR_TRIPEN   ;Restore Trip Enable status .
2555  0C2C  22                               RET
2556  0C2D  D2 3D       .B..  RSTR_TRIPEN:   SETB   TRIPEN_FLG
2557  0C2F  22                EX_METERIN:    RET

ER  LINE  ADDR  OBJECT      TYPE

    2559                      ;****************************************
    2560                      ;        SEARCH RACK SELECTOR HOME
    2561                      ;****************************************
    2562  0C30  75 3D 66  .D..  FIND_SELHOME:  MOV    STEP2,#STEP2_MASK     ;Where is transmission engaged?
    2563  0C33  75 42 00  .D..                 MOV    RETRY_CTR,#13
    2564  0C36  79 3D     .D..                 MOV    R1,#STEP2
    2565  0C38  12 04 B7  ..C.  STEP2_SRCH:    CALL   ADV_1STEP          ;Single step stepper; returns with
    2566  0C3B  B4 01 02  ..R.                 CJNE   A,#01,$+5          ;drive selector sensor output.
    2567  0C3E  80 10     .R..                 SJMP   BNKENG             ; =01 engaged to rack drive
    2568  0C40  B4 02 02  ..R.                 CJNE   A,#02,UNDEF
    2575  0C50  C3              BNKENG:        CLR    C                  ;Search for selector home posn.
    2576  0C51  D1 5B     .C..                 ACALL  HOME_SRCH
    2577  0C53  20 3B 06  .BR.                 JB     STAT_FLG,EX_FINDH
    2578  0C56  F5 33     .D..                 MOV    METER_INDEX,A      ;Clear rotary sel index if found.
    2579  0C58  F5 34     .D..                 MOV    METER_INDEX+1,A
    2580  0C5A  D2 09     .B..                 SETB   METER_FLG          ;Enable meter posn counter.
    2581  0C5C  22              EX_FINDH:      RET

    2583                      ;*************************************
    2584                      ;        DECODE POSTAGE AMOUNT
    2585                      ;        FROM RECEIVED MESSAGE
    2586                      ;*************************************
    2587                      ;Unpack postage amount from packed format
    2588                      ;of the message string into byte/digit.
    2589                      ;Soft error if invalid amount.
    2590                      ;---------------------------------------
    2591  0C5D  E5 19     .D..  GET_AMOUNT:    MOV    A,CMMD+1           ;Get no. of digits from format byte.
    2592  0C5F  C4                             SWAP   A
    2593  0C60  54 0F                          ANL    A,#0FH
    2594  0C62  FA                             MOV    R2,A               ;Save no. of digits.
    2595  0C63  B4 05 01  ..R.                 CJNE   A,#NO_OF_RACKS,$+4   ;No. of racks exceeded.
    2596  0C66  D3                             SETB   C
    2597  0C67  50 37     .R..                 JNC    OUT_LIMIT
    2598  0C69  C3                             CLR    C
    2599  0C6A  13                             RRC    A                  ;Determine no. of data bytes in msg.
    2600  0C6B  50 03     .R..                 JNC    EVEN
    2601  0C6D  33              ODD:           RLC    A
    2602  0C6E  04                             INC    A
    2603  0C6F  13                             RRC    A
    2604  0C70  79 19     .D..  EVEN:          MOV    R1,#CMMD+1
    2605  0C72  29                             ADD    A,R1               ;R1 points to data byte with LS digit
    2606  0C73  F9                             MOV    R1,A
```

```
ER   LINE  ADDR  OBJECT         TYPE

     2607  0C74  E5 19          .D..                    MOV    A,CMMD+1          ;Determine start of LS digit location in
     2608  0C76  54 0F                                  ANL    A,#0FH              ;NEWRACK array; get no. of digits right of DP.
     2609  0C78  B4 0F 01       ..R.                    CJNE   A,#0FH,$+4          ;No such digit if 0FH.
     2610  0C7B  E4                                     CLR    A
     2611  0C7C  78 4E          .D..                    MOV    R0,#NEWRACK+1     ;R0 points to ones integer byte in NEWRACK array.
     2612  0C7E  28                                     ADD    A,R0                ;Acc holds no. of digits right of DP.
     2613  0C7F  B4 51 01       .DR.                    CJNE   A,#NEWRACK+4,$+4
     2614  0C82  D3                                     SETB   C
     2615  0C83  50 18          .R..                    JNC    OUT_LIMIT           ;Over .xxx limit of postage value.
     2616  0C85  F8                                     MOV    R0,A                ;R0= start of postage value's LS digit.
     2617  0C86  E7                     GET_LOWNIB:     MOV    A,@R1             ;Get low nibble of data byte
     2618  0C87  54 0F                                  ANL    A,#0FH              ;pointed by R1.
     2619  0C89  F6                                     MOV    @R0,A             ;Store in digit array pointed by R0.
     2620  0C8A  DA 01          .R..                    DJNZ   R2,GET_HIGHNIB    ;Count no. of digits unpacked.
     2621  0C8C  22                                     RET
     2622  0C8D  18                     GET_HIGHNIB:    DEC    R0                  ;Pointer from LS to MS digit.
     2623  0C8E  B8 4C 02       .DR.                    CJNE   R0,#NEWRACK-1,$+5
     2624  0C91  80 00          .R..                    SJMP   OUT_LIMIT
     2625  0C93  E7                                     MOV    A,@R1             ;Get high nibble of data byte.
     2626  0C94  C4                                     SWAP   A
     2627  0C95  54 0F                                  ANL    A,#0FH
     2628  0C97  F6                                     MOV    @R0,A
     2629  0C98  19                                     DEC    R1
     2630  0C99  DA 01          .R..                    DJNZ   R2,$+3
     2631  0C9B  22                                     RET
     2632  0C9C  18                                     DEC    R0
     2633  0C9D  B8 4C E6       .DR.                    CJNE   R0,#NEWRACK-1,GET_LOWNIB
     2634  0CA0  D2 38          .B..    OUT_LIMIT:      SETB   STAT_FLG          ;Soft error, ignore recvd amount.
     2635  0CA2  22                                     RET

ER   LINE  ADDR  OBJECT         TYPE

     2637                               ;**************************************************
     2638                               ;                       POSTAGE SELECTION RTN
     2639                               ;**************************************************
     2640                               ;Find adjacent racks relative to present posn.
     2641                               ;------------------------------------------------
     2642  0CA3  D2 D3          .B..    SET_POSTAGE:    SETB   PSW.3             ;Select RB1 but DO NOT use R6.
     2643  0CA5  D2 B4          .B..                    SETB   P3.4
     2644  0CA7  7F 01                                  MOV    R7,#01            ;Rack CCW posn table index.
     2645  0CA9  7E 00                                  MOV    R6,#00            ;Rack CW posn table index.
     2646  0CAB  7D 05                                  MOV    R5,#NO_OF_RACKS   ;No. of racks ctr.
     2647  0CAD  EF                     ITER1:          MOV    A,R7              ;Interpolate current posn
     2648  0CAE  B1 F6          .C..                    ACALL  INTERPOL          ; to determine the adjacent
     2649  0CB0  50 04          .R..                    JNC    EX_ITER1          ; valid rack posn's.
     2650  0CB2  0F                                     INC    R7
     2651  0CB3  0E                                     INC    R6
     2652  0CB4  DD F7          .R..                    DJNZ   R5,ITER1          ;Iterate loop for no. of racks.
     2653  0CB6  7D 06                  EX_ITER1:       MOV    R5,#NO_OF_RACKS+1
     2654  0CB8  D5 0D 03       .DR.    NEXT_RACK:      DJNZ   R5_RB1,PSEL_LOOP    ;All racks checked?
     2655  0CBB  C2 D3          .B..                    CLR    PSW.3
     2656  0CBD  22                                     RET
```

```
                                    ;---------------------------------------------------
                                    ;Find the nearest of the two found adjacent rack.
                                    ;---------------------------------------------------
0CBE  11 08        .C..  PSET_LOOP:    ACALL  UPDTE_SERVO       ;One iteration per loop.
0CC0  D2 D3        .B..                SETB   PSW.3             ;Find the nearest of the
0CC2  BF 06 02     ..R.                CJNE   R7,#NO_OF_RACKS+1,$+5  ;two adjacent racks from both
0CC5  7F 01                            MOV    R7,#01            ;direction, CCW (R7) and CW (R6).
0CC7  EF                 TESTCCW:      MOV    A,R7              ;Start with CCW.
0CC8  B1 F6        .C..                ACALL  INTERPOL          ;Get the rack info from table.
0CCA  8B 49        .D..                MOV    AUX3,R3     ;Save table high byte.
0CCC  85 47 40     .DD.                MOV    AUX1,BOFFS        ;Save pointed rack abs posn.
0CCF  85 48 45     .DD.                MOV    AUX2,BOFFS+1
0CD2  40 06        .R..                JC     CCWABS            ;Get absolute value if negative.
0CD4  F5 44        .D..                MOV    TOTAL_CNT+1,A     ;Get displacement to be travelled
0CD6  89 43        .D..                MOV    TOTAL_CNT,R1      ;from present posn to the rack.
0CD8  80 0A        .R..                SJMP   TESTCW
0CDA  C9                 CCWABS:       XCH    A,R1              ;To get ABS value, add METER_1REV
0CDB  24 E8                            ADD    A,#LOW(METER_1REV)        ;count.
0CDD  F5 43        .D..                MOV    TOTAL_CNT,A
0CDF  E9                               MOV    A,R1
0CE0  34 03                            ADDC   A,#HIGH(METER_1REV)
0CE2  F5 44        .D..                MOV    TOTAL_CNT+1,A
0CE4  BE 00 02     ..R.  TESTCW:       CJNE   R6,#00,$+5        ;Check the CW side.
0CE7  7E 05                            MOV    R6,#NO_OF_RACKS
0CE9  EE                               MOV    A,R6
0CEA  B1 F6        .C..                ACALL  INTERPOL
0CEC  C9                               XCH    A,R1

ER  LINE  ADDR  OBJECT     TYPE

0CED  F4                               CPL    A
0CEE  24 01                            ADD    A,#01
0CF0  C9                               XCH    A,R1
0CF1  F4                               CPL    A
0CF2  34 00                            ADDC   A,#00
0CF4  30 E7 06     .BR.                JNB    ACC.7,CHK_NEAREST
0CF7  C9                               XCH    A,R1
0CF8  24 E8                            ADD    A,#LOW(METER_1REV)
0CFA  C9                               XCH    A,R1
0CFB  34 03                            ADDC   A,#HIGH(METER_1REV)
0CFD  FA                 CHK_NEAREST:  MOV    R2,A              ;Find the smaller of the two
0CFE  C3                               CLR    C                 ;found absolute posns.
0CFF  E9                               MOV    A,R1
0D00  95 43        .D..                SUBB   A,TOTAL_CNT
0D02  EA                               MOV    A,R2
0D03  95 44        .D..                SUBB   A,TOTAL_CNT+1
0D05  40 0D        .R..                JC     RACK_CW

                                    ;---------------------------------------------------
                                    ;Get distance and direction convention of the rack.
                                    ;---------------------------------------------------
0D07  C2 1F        .B..  RACK_CCW:     CLR    SAVE_DIR          ;SAVE_DIR = rack dir.
0D09  0F                               INC    R7                ;Advance CCW tab pointer.
0D0A  85 40 47     .DD.                MOV    BOFFS,AUX1        ;Get rack abs posn.
```

```
2709  0000  85 45 48    .DD.                  MOV    BOFFS+1,AUX2
2710  0010  E5 49       .D..                  MOV    A,AUX3           ;Get high byte entry from table.
2711  0012  80 08       .R..                  SJMP   TEST_DIGIT        ;Saved in AUX3 if from CCW pointer (R7).
2712  0014  D2 1F       .B..    RACK_CW:      SETB   SAVE_DIR
2713  0016  1E                                DEC    R6               ;Advance CW tab pointer.
2714  0017  89 43       .D..                  MOV    TOTAL_CNT,R1
2715  0019  8A 44       .D..                  MOV    TOTAL_CNT+1,R2
2716  001B  EB                                MOV    A,R3              ;From R3_RB1 if from CW pointer (R6).

2838                            ;--------------------------------
2839                            ;Move rack at full setting speed.
2840                            ;--------------------------------
2841  0DDD  12 05 7C    ..C.    FULL_SPEED:   LCALL  MPOSN_MOVE       ;Move at full speed ahead.
2842  0DE0  20 38 DE    .BR.                  JB     STAT_FLG,EX_DGTMOVE
2843  0DE3  D1 CC       .C..                  ACALL  DG_TO_8          ;Slide selector back to rack drv.
2844  0DE5  20 38 D9    .BR.                  JB     STAT_FLG,EX_DGIMOVE
2845  0DE8  D2 09       .B..                  SETB   METER_FLG        ;Re-enable meter tracking.
2846  0DEA  81 B8       .C..                  AJMP   NEXT_RACK        ;Iterate for all racks.

ER  LINE  ADDR  OBJECT      TYPE

2848                            ;*****************************************************
2849                            ;************** METER_MODE SUB-ROUTINES *************
2850                            ;*****************************************************

2852                            ;----------------------------------------------------------------------
2853                            ;Rack table entries are in                DIGIT UP    RACK    ABSOLUTE
2854                            ; packed format.                           DIR        NO.     POSITION
2855                            ;-------------------------                --------    -----   --------
2856  0040                      CONVN4        EQU    40H              ;CCW=00H      4       RACK4
2857  0030                      CONVN3        EQU    30H              ;CCW          3       RACK3
2858  0000                      CONVN5        EQU    000H             ;CW= 10H      5       RACK5
2859  0090                      CONVN1        EQU    90H              ;CW           1       RACK1
2860  00A0                      CONVN2        EQU    0A0H             ;CW           2       RACK2
2861  0DEC  C2 40               RACKTAB       DB     LOW(RACK4),HIGH(RACK4) OR CONVN4
2862  0DEE  FA 30                             DB     LOW(RACK3),HIGH(RACK3) OR CONVN3
2863  0DF0  32 D1                             DB     LOW(RACK5),HIGH(RACK5) OR CONVN5
2864  0DF2  B6 92                             DB     LOW(RACK1),HIGH(RACK1) OR CONVN1
2865  0DF4  EE A2                             DB     LOW(RACK2),HIGH(RACK2) OR CONVN2
2866                            ;----------------------------------------------------------------------

2868                            ;*****************************************
2869                            ;             INTERPOLATE SUBRTN
2870                            ;*****************************************
2871  0DF6  90 0D EA    ..C.    INTERPOL:     MOV    DPTR,#RACKTAB-2
2872  0DF9  C3                                CLR    C
2873  0DFA  33                                RLC    A                ;Table index in accum x 2.
2874  0DFB  F9                                MOV    R1,A
2875  0DFC  93                                MOVC   A,@A+DPTR
2876  0DFD  F5 47       .D..                  MOV    BOFFS,A          ;Save abs posn low byte to BOFFS.
2877  0DFF  95 33       .D..                  SUBB   A,METER_INDEX
2878  0E01  C9                                XCH    A,R1             ;Remainder low byte in R1.
2879  0E02  04                                INC    A
```

```
2880  0E03  93                                MOVC   A,@A+DPTR
2881  0E04  F8                                MOV    R3,A              ;Save entry high byte to R3.
2882  0E05  54 0F                             ANL    A,#0FH
2883  0E07  F5 48       .D..                  MOV    BOFFS+1,A         ;Save abs posn high byte to BOFFS+1.
2884  0E09  95 34       .D..                  SUBB   A,METER_INDEX+1   ;Remainder high byte in accum.
2885  0E0B  22                                RET

ER  LINE  ADDR  OBJECT      TYPE

2932                        ;*****************************************************************
2933                        ;                 HOME SIGNAL SEARCH RTN
2934                        ;*****************************************************************
2935  0E5B  75 42 0C  .D..  HOME_SRCH:    MOV    RETRY_CTR,#12
2936  0E5E  92 1F     .B..                MOV    SAVE_DIR,C         ;Carry bit= dir of motion.
2937  0E60  A2 1F     .B..  SRCHRTRY:     MOV    C,SAVE_DIR
2938  0E62  92 08     .B..                MOV    DCMDIR_FLG,C
2939  0E64  D1 B0     .C..                ACALL  RSTORE_FLGS                  ;Reset error flags.
2940  0E66  12 05 54  ..C.                LCALL  HUNT_MOVE                    ;Move to look for home signal.
2941  0E69  20 38 32  .BR.                JB     STAT_FLG,HOME_RTRY           ;Retry if error or
2942  0E6C  20 14 2F  .BR.  CHKCNT:       JB     HOME_FLG,HOME_RTRY           ; did not find home.
2943  0E6F  30 97 02  .BR.                JNB    P1.7,MHOME_SRCH              ;P1.7 =1 base initial'n.
2944  0E72  E4              BHOME_SRCH:   CLR    A                            ;      =0 meter
2945  0E73  22                            RET

2947  0E74  E5 10     .D..  MHOME_SRCH:   MOV    A,COMP_CNT
2948  0E76  C3                            CLR    C
2949  0E77  95 16     .D..                SUBB   A,SAVE_LATCH
2950  0E79  30 E7 04  .BR.                JNB    ACC.7,FRWRD
2951  0E7C  F4                            CPL    A
2952  0E7D  04                            INC    A
2953  0E7E  B2 08     .B..                CPL    DCMDIR_FLG
2954  0E80  F5 43     .D..  FRWRD:        MOV    TOTAL_CNT,A
2955  0E82  12 05 7C  ..C.                LCALL  MPOSN_MOVE                   ;Move to seen home posn.
2956  0E85  20 38 16  .BR.                JB     STAT_FLG,HOME_RTRY
2957  0E88  D1 A6     .C..                ACALL  HOME_CHK
2958  0E8A  70 12     .R..                JNZ    HOME_RTRY
2959  0E8C  B2 08     .B..                CPL    DCMDIR_FLG
2960  0E8E  75 43 E8  .D..                MOV    TOTAL_CNT,#LOW(METER_1REV)   ;Make one complete
2961  0E91  75 44 03  .D..                MOV    TOTAL_CNT+1,#HIGH(METER_1REV) ;rotation and verify
2962  0E94  12 05 7C  ..C.                LCALL  MPOSN_MOVE                   ;home again.
2963  0E97  20 38 04  .BR.                JB     STAT_FLG,HOME_RTRY
2964  0E9A  D1 A6     .C..                ACALL  HOME_CHK
2965  0E9C  60 05     .R..                JZ     EX_HOMESRCH
2966  0E9E  D5 42 BF  .DR.  HOME_RTRY:    DJNZ   RETRY_CTR,SRCHRTRY           ;Count no. of retries.
2967  0EA1  D2 38     .B..                SETB   STAT_FLG
2968  0EA3  D2 05     .B..  EX_HOMESRCH:  SETB   BITMODE_FLG                  ;Indicate bit mode communication.
2969  0EA5  22                            RET
```

```
ER   LINE  ADDR  OBJECT         TYPE

     2971                                  ;**************************************************
     2972                                  :                  READ HOME SIGNAL
     2973                                  ;**************************************************
     2974  0EA6  12 07 10        ..C.      HOME_CHK:         LCALL    DEL20MS
     2975  0EA9  90 B8 01                                    MOV      DPTR,#PORTA
     2976  0EAC  E0                                          MOVX     A,@DPTR
     2977  0EAD  54 04                                       ANL      A,#04
     2978  0EAF  22                                          RET

     2980                                  ;********************************************
     2981                                  :                  RESET ERROR FLAGS
     2982                                  ;********************************************
     2983  0EB0  D2 3A           .B..      RSTORE_FLGS:      SETB     SYS_ENABLE          ;Restore bind-detect flags, and
     2984  0EB2  53 27 B5        .D..                        ANL      MSG1_STAT,#10110101B    ;associated control flags.
     2985  0EB5  22                                          RET

     2987                                  ;*******************************************************
     2988                                  :                  RETURNS TO PREVIOUS POSITION
     2989                                  ;*******************************************************
     2990  0EB6  B2 08           .B..      GOBACK2:          CPL      DCMDIR_FLG
     2991  0EB8  85 2F 43        .DD.                        MOV      TOTAL_CNT,POSN_ACC
     2992  0EBB  85 30 44        .DD.                        MOV      TOTAL_CNT+1,POSN_ACC+1
     2993  0EBE  75 45 59        .D..                        MOV      ACCELK,#INITZ_ACCEL
     2994  0EC1  12 05 7F        ..C.                        LCALL    MPOSN2
     2995  0EC4  22                        JRET:             RET

     2997                                  ;********************************************
     2998                                  :                  STEP MOTOR #2 MOVES
     2999                                  ;********************************************
     3000  0EC5  C2 08           .B..      B_TO_DG:          CLR      STMDIR_FLG          ;Rack to digit move.
     3001  0EC7  75 3F 02        .D..                        MOV      MASK,#02
     3002  0ECA  80 05           .R..                        SJMP     STEP2_DRV
     3003  0ECC  D2 08           .B..      DG_TO_B:          SETB     STMDIR_FLG          ;Digit to rack move.
     3004  0ECE  75 3F 01        .D..                        MOV      MASK,#01
     3005  0ED1  7D 08                     STEP2_DRV:        MOV      R5,#08
     3006  0ED3  79 3D           .D..                        MOV      R1,#STEP2
     3007  0ED5  75 3E 04        .D..                        MOV      STEP,#TC2_STEP
     3008  0ED8  12 04 8E        ..C.                        LCALL    MOVE_STEPPER
     3009  0EDB  30 0F 04        .BR.                        JNB      INITZ_FLG,WVALID_POSN
     3010  0EDE  12 04 AE        ..C.                        LCALL    STEP_SETTLE
     3011  0EE1  22                                          RET
     3012  0EE2  12 04 B0        ..C.      WVALID_POSN:      LCALL    CHK_POSN
     3013  0EE5  22                                          RET

ER   LINE  ADDR  OBJECT         TYPE

     3015                                  ;**************************************
     3016                                  :        SWITCH DCMOTOR DRIVE
     3017                                  ;**************************************
     3018  0EE6  C0 D0           .D..      SWITCH:           PUSH     PSW                 ;To save carry bit, ie.,
     3019  0EE8  7B 00                                       MOV      R3,#00              ;C =0 switch fr base to meter drv;
     3020  0EEA  12 07 10        ..C.      SWLOOP:           CALL     DEL20MS
```

```
3021  0EED  12 0F 1D   ..C.                   CALL   CHKZDC           ;Check servo output of last sampling
3022  0EF0  70 0A      .R..                   JNZ    SWAIT            ;instant (in K2 registers) for zero.
3023  0EF2  12 07 10   ..C.                   CALL   DEL20MS
3024  0EF5  12 0F 1D   ..C.                   CALL   CHKZDC
3025  0EF8  70 02      .R..                   JNZ    SWAIT
3026  0EFA  80 03      .R..                   SJMP   SWITCH_DRV
3027  0EFC  B8 08 EB   ..R.    SWAIT:         CJNE   R3,#08,SWLOOP
3028  0EFF  D0 D0      .D..    SWITCH_DRV:    POP    PSW              ;Restore carry bit
3029  0F01  92 96      .B..                   MOV    P1.6,C           ;Output select control.
3030  0F03  90 88 03                          MOV    DPTR,#PORTC
3031  0F06  E0                                MOVX   A,@DPTR          ;Select corresponding passive
3032  0F07  92 E5      .B..                   MOV    ACC.5,C          ;encoder buffer.
3033  0F09  B2 E4      .B..                   CPL    ACC.4            ;Reset ext ctr.
3034  0F0B  F0                                MOVX   @DPTR,A
3035  0F0C  75 37 00   .D..                   MOV    OLD_READ,#00     ;Clear ctr buffer.
3036  0F0F  E0                                MOVX   A,@DPTR
3037  0F10  B2 E4      .B..                   CPL    ACC.4
3038  0F12  F0                                MOVX   @DPTR,A          ;Enable ext ctr.
3039  0F13  E5 10      .D..                   MOV    A,COMP_CNT       ;Condition and exchange position
3040  0F15  C3                                CLR    C                ;tracking registers.
3041  0F16  95 15      .D..                   SUBB   A,R5_RB2          ;Subtract last sampled actual readng.
3042  0F18  C5 2E      .D..                   XCH    A,CNT_OFFSET      ;Save offset of last active and
3043  0F1A  F5 10      .D..                   MOV    COMP_CNT,A          ;restore offset of last passive.
3044  0F1C  22                                RET

3046                           ;@@@@@@@@@@@@@@@@@@@@@@@@@@@@@@@@@@@@@@@@@
3047                           ;       CHECK FOR ZERO DUTY CYCLE
3048                           ;@@@@@@@@@@@@@@@@@@@@@@@@@@@@@@@@@@@@@@@@@
3049  0F1D  E5 2C      .D..    CHKZDC:        MOV    A,K2L
3050  0F1F  70 02      .R..                   JNZ    EX_CHKZDC
3051  0F21  65 28      .D..                   XRL    A,K2H
3052  0F23  22                 EX_CHKZDC:     RET                     ;Returns zero in acc if 0 duty cycle.
3053                           $INCLUDE(ENTERAMT.OMS)

ER  LINE  ADDR  OBJECT     TYPE

3057                           ;**************************************************************
3058        0073               SET            EQU    73H              ;S key.
3059        001B               ESC            EQU    1BH              ;ESC key.

3061  0F24  C2 8E      .B..    ENTER_AMOUNT:  CLR    TR1              ;Stop servo control.
3062  0F26  12 E0 0F                          LCALL  CLRDSP           ;Clear SDK display.
3063  0F29  7A 0F      .C..                   MOV    R2,#HIGH(ENTER_MSG) ;Display "Enter Postage= " msg.
3064  0F2B  7B A6      .C..                   MOV    R3,#LOW(ENTER_MSG)
3065  0F2D  12 E0 1E                          LCALL  DSPMSG
3066  0F30  12 06 C9   ..C.                   CALL   START_SERVO      ;Start servo control.
3067  0F33  79 4D      .D..                   MOV    R1,#NEWBANK      ;R1 = starting addrs new postage array.
3068  0F35  11 08      .C..    SCAN_KEYBD:    CALL   UPDTE_SERVO      ;Scan keyboard loop (1ms/pass).
3069  0F37  30 1C 04   .BR.                   JNB    AUTO_FLG,JSCAN
3070  0F3A  F1 89      .C..                   ACALL  RANDOM
3071  0F3C  80 0E      .R..                   SJMP   SAVEKEY
3072  0F3E  12 07 66   ..C.    JSCAN:         LCALL  CHKKBD
3073  0F41  40 05      .R..                   JC     GETKEY           ;C =1 key is pressed.
3074  0F43  BB 4E EF   ..R.                   CJNE   R3,#78,SCAN_KEYBD ;Else, check for timeout.
```

```
3075  0F46  80 09       .R..                SJMP   ABORT_MODE
3076  0F48  78 00                GETKEY:    MOV    R3,#00            ;Reset timeout counter.
3077  0F4A  51 AD       .C..                CALL   RECV_KCODE        ;Get key code.
3078  0F4C  FC                   SAVEKEY:   MOV    R4,A              ;Save to R4.
3079  0F4D  B4 1B 03    ..R.                CJNE   A,#ESC,NOTAB      ;Escape command key?
3080  0F50  D2 38       .B..     ABORT_MODE: SETB  STAT_FLG
3081  0F52  22                              RET
3082  0F53  B9 52 07    .DR.     NOTAB:     CJNE   R1,#NEWBANK+5,TESTO1  ;Check if 5 nos. had been entered alr
3083  0F56  10 1C 23    .BR.                JBC    AUTO_FLG,TENS
3084  0F59  BC 73 D9    ..R.     CHKSET:    CJNE   R4,#SET,SCAN_KEYBD  ;Wait for Set Postage command key if
3085  0F5C  22                              RET

3087  0F5D  BC 39 01    ..R.     TESTO1:    CJNE   R4,#'9',$+4       ;Else, check if key is a valid numeral 0-9.
3088  0F60  D3                              SETB   C
3089  0F61  50 F6       .R..                JNC    CHKSET
3090  0F63  EC                              MOV    A,R4
3091  0F64  54 F0                           ANL    A,#0F0H
3092  0F66  B4 30 CC    ..R.                CJNE   A,#30H,SCAN_KEYBD
3093  0F69  B9 4F 04    .DR.                CJNE   R1,#NEWBANK+2,DISPNO ;Display decimal point after 2 nos.
3094  0F6C  7A 2E                           MOV    R2,#'.'
3095  0F6E  F1 9E       .C..                ACALL  CDSPCHR
3096  0F70  AA 04                DISPNO:    MOV    R2,R4_RB0         ;Display numeral character.
3097  0F72  F1 9E       .C..                ACALL  CDSPCHR
3098  0F74  53 04 0F                        ANL    R4_RB0,#0FH       ;Convert character to hex.
3099  0F77  A7 04                           MOV    @R1,R4_RB0        ;Save to new postage array.
3100  0F79  09                              INC    R1                ;Increment array pointer.
3101  0F7A  E1 35       .C..                AJMP   SCAN_KEYBD

ER  LINE  ADDR  OBJECT        TYPE

    3142  0F80                              END
M51 assembly errors =      0
```

What is claimed is:

1. Apparatus for controlling the velocity of a portion of a load in accordance with a trapazoidal-shaped velocity versus time profile, comprising:

(a) a d.c. motor including an output shaft for driving the load;

(b) means for sensing angular displacement of the motor output shaft;

(c) microprocessor comprising i. clock means for generating successive sampling time periods, ii. means for providing first counts respectively representative of successive desired angular displacements of the motor output shaft during successive sampling time periods to cause the load portion to be moved in accordance with a predetermined trapezoidal-shaped velocity versus time profile, iii. means responsive to the sensing means for providing second counts respectively representative of actual angular displacements of the motor output shaft during successive sampling time periods, and iv. means for compensating for the difference between the first and second counts during each successive sampling time period and generating a pulse width modulated control signal for controlling the d.c. motor, the motor control signal causing the actual angular displacement of the motor output shaft to substantially match the desired angular displacement of the motor output shaft during successive sampling time periods, whereby the load portion is moved substantially in accordance with the predetermined trapezoidal-shaped velocity versus time profile; and (d) signal amplifying means for operably coupling the motor control signal to the d.c. motor.

2. The apparatus according to claim 1, wherein the sensing means comprises analog to digital signal converting means coupled to the motor output shaft.

3. The apparatus according to claim 1, wherein the sensing means comprises means for sensing the direction of angular displacement of the motor output shaft.

4. The apparatus according to claim 1, including counting means for coupling the sensing means to the microprocessor.

5. The apparatus according to claim 1, including the microprocessor programmed for responding to an input signal representative of desired linear displacements of the load portion during successive sampling time periods.

6. The apparatus according to claim 1, wherein the microprocessor includes means for comparing first and second counts and generating an error signal representative of the difference, said motor control signal comprising a function of the error signal and a previous error signal, and said motor control signal comprising a function of a previously generated motor control signal.

7. The apparatus according to claim 1, wherein the compensation means includes means for implementing calculation of a regressive mathematical expression.

8. The apparatus according to claim 1, wherein the microprocessor includes counting means for generating the motor control signal.

9. The apparatus according to claim 1, wherein the compensation means includes means for compensating for the d.c. motor start-up torque due to a load.

10. The apparatus according to claim 1, wherein the compensation means includes means for calculating in advance of each sampling time period a portion of the motor control signal for use in generating the motor control signal during the sampling time period, whereby the motor control signal may be generated in a lesser time interval during the sampling time period.

11. The combination according to claim 1, wherein each of the first counts comprises an amount representative of a desired increment of linear displacement of the load portion during a sampling time period.

12. The apparatus according to claim 1, wherein the sensing means comprises quadrature encoder means coupled to the motor output shaft.

13. The apparatus according to claim 1, wherein the means for providing first counts includes means for calculating respective first counts, and said calculating means including acceleration and deceleration and constant velocity constants stored in the microprocessor.

14. The apparatus according to claim 1, wherein the microprocessor includes a plurality of groups of amounts, each group being representative of a different desired trapezoidal-shaped velocity versus time profile of cyclical motion of the load portion.

15. The apparatus according to claim 1, wherein the microprocessor is an eight-bit microprocessor.

16. A process for controlling the velocity of a portion of a load in accordance with a trapezoidal-shaped velocity versus time profile, the process comprising:

(a) providing a d.c. motor having an output shaft for driving a load;

(b) providing amounts representative of respective desired angular displacements of the shaft during successive sampling time periods to cause a portion of the load to be moved in accordance with a predetermined trapezoidal-shaped velocity versus time profile;

(c) sensing angular displacement of the shaft and in response thereto providing amounts representative of respective actual angular displacements of the shaft during successive sampling time periods; and (d) digitally compensating for the difference between desired and actual angular displacements and generating a motor control signal for controlling rotation of the shaft to cause the actual angular displacement of the shaft to substantially match the desired displacement thereof, whereby the load portion is moved substantially in accordance with the desired trapezoidal-shapred velocity versus time profile.

17. The process according to claim 16, wherein step (b) includes the step of computing said amounts.

18. The process according to claim 16, wherein step (c) includes the step of sensing the direction of angular displacement of the d.c. motor.

19. The process according to claim 16, wherein step (d) includes the steps of:

1. comparing amounts representative of respective desired and actual angular displacements,
2. generating an error signal representative of the difference between respective desired and actual angular displacements and in response thereto generating a motor control signal which compensates for the difference between said desired and actual angular displacements.

20. The process according to claim 16, wherein step (c) includes the step of calculating an amount representative of the total desired displacement of the shaft for causing the load portion to follow the desired trapezoidal-shaped profile.

21. The process according to claim 20, wherein step (b) includes the step of calculating a first plurality of counts respectively representative of successive desired increments of angular displacement of the shaft during successive sampling time periods, step (c) includes the step of calculating a second plurality of counts respectively representative of successive actual increments of angular displacement of the shaft during successive sampling time periods, and step (d) includes the step of digitally compensating for the difference between the corresponding first and second counts during successive sampling time periods.

22. The process according to claim 16, wherein step (d) includes the step of calculating the motor control signal from a function of a regressive mathematical expression.

23. The process according to claim 16, wherein step (b) includes the step of generating respective counts representative of desired angular displacements of the shaft.

24. The process according to claim 16, wherein step (d) includes the step of generating respective counts representative of actual angular displacements of the shaft.

25. The process according to claim 16, wherein step (d) includes the steps of:

1. generating a pulse width modulated motor control signal,
2. amplifying said pulse width modulated control signal, and
3. applying the amplified pulse width modulated control signal to said D.C. motor.

* * * * *